United States Patent
Markus et al.

(10) Patent No.: US 12,487,915 B2
(45) Date of Patent: Dec. 2, 2025

(54) READ PERFORMANCE FROM DISAGGREGATED STORAGE USING DISTRIBUTED STORAGE AGENTS

(71) Applicant: NeuroBlade Ltd., Tel Aviv (IL)

(72) Inventors: Yoav Markus, Tel-Aviv (IL); Eliad Hillel, Herzliya (IL); Ilan Mayer-Wolf, Tel Aviv (IL); Yaron Kittner, Pardes Hanna-Karkur (IL)

(73) Assignee: NeuroBlade Ltd., Tel Aviv (IL)

( * ) Notice: Subject to any disclaimer, the term of this patent is extended or adjusted under 35 U.S.C. 154(b) by 0 days.

(21) Appl. No.: 18/451,183

(22) Filed: Aug. 17, 2023

(65) Prior Publication Data
US 2023/0393971 A1    Dec. 7, 2023

Related U.S. Application Data

(63) Continuation of application No. PCT/IB2023/000303, filed on May 25, 2023.

(60) Provisional application No. 63/431,140, filed on Dec. 8, 2022, provisional application No. 63/355,763, filed on Jun. 27, 2022, provisional application No. 63/345,545, filed on May 25, 2022.

(51) Int. Cl.
*G06F 12/02*    (2006.01)

(52) U.S. Cl.
CPC ...... *G06F 12/023* (2013.01); *G06F 2212/305* (2013.01)

(58) Field of Classification Search
CPC ...... G06F 12/023; G06F 3/0604; G06F 3/067; G06F 3/0647; G06F 11/3404; G06F 2009/4557; G06F 12/0868; G06F 2212/154; G06F 2212/284

USPC .............. 711/105, 165, 154, 12.002, 135
See application file for complete search history.

(56) References Cited

U.S. PATENT DOCUMENTS

| 6,574,683 | B1 * | 6/2003 | Comisky ............ G06F 13/28 710/24 |
| 11,102,323 | B1 | 8/2021 | Peterson et al. |
| 11,302,385 | B2 * | 4/2022 | Kim .............. G06F 12/0882 |
| 2006/0090049 | A1 * | 4/2006 | Saika .............. G06F 3/0605 711/165 |
| 2007/0106710 | A1 * | 5/2007 | Haustein ........... G06F 3/0605 |

(Continued)

FOREIGN PATENT DOCUMENTS

| WO | WO 02/061737 A2 | 8/2002 |
| WO | WO 2021/028723 A2 | 2/2021 |

OTHER PUBLICATIONS

Wei Cao et al., "PolarDB-X: An Elastic Distributed Relational Database for Cloud-Native Applications", 2022 IEEE 38th International Conference on Data Engineering (ICDE), IEEE, May 9, 2022, pp. 2859-2872.

(Continued)

*Primary Examiner* — Jared I Rutz
*Assistant Examiner* — Edward Waddy, Jr.
(74) *Attorney, Agent, or Firm* — Finnegan, Henderson, Farabow, Garrett & Dunner LLP

(57) ABSTRACT

A system for distributed storage agents includes at least one memory and at least one compute node comprising at least one agent module. The at least one agent module is configured to cause at least a portion of data stored in the at least one memory to be pushed to a destination in accordance with an agent access plan.

21 Claims, 28 Drawing Sheets

(56) References Cited

U.S. PATENT DOCUMENTS

| | | | |
|---|---|---|---|
| 2012/0166748 A1* | 6/2012 | Satoyama | G06F 3/0685 |
| | | | 711/E12.002 |
| 2015/0212944 A1* | 7/2015 | Chen | G06F 12/0862 |
| | | | 711/137 |
| 2017/0054786 A1* | 2/2017 | Szilagyi | H04L 67/06 |
| 2018/0373656 A1* | 12/2018 | Kuwabara | G06F 13/28 |
| 2020/0004685 A1 | 1/2020 | Guim Bernat et al. | |
| 2021/0048956 A1* | 2/2021 | Wang | G06F 3/0604 |
| 2021/0096996 A1 | 4/2021 | Jalaparti et al. | |

OTHER PUBLICATIONS

International Search Report and Written Opinion issued in counterpart International Application No. PCT/IB2023/000303 dated Sep. 15, 2023, 10 pages.

* cited by examiner

OVERALL SYSTEM ARCHITECTURE

SOFTWARE LAYER

HARDWARE LAYER

SYSTEM FOR QUICK IN-MEMORY COMPUTATION

| | LARGE RANDOM NUMBER | | | | | | | |
|---|---|---|---|---|---|---|---|---|
| BIT: | 0 | 1 | 2 | 3 | 4 | 5 | 6 | 7 |
| ALLOCATION: | LOCATION | | | | LOCATION EXT. | | | |
| BIT: | 8 | 9 | 10 | 11 | 12 | 13 | 14 | 15 |
| ALLOCATION: | SUB-LOCATION | | | SUB-LOCATION EXTENSION | | | | |
| BIT: | 16 | 17 | 18 | 19 | 20 | 21 | 22 | 23 |
| ALLOCATION: | STORAGE | | | | | | | |
| BIT: | 24 | 25 | 26 | 27 | 28 | 29 | 30 | 31 |
| ALLOCATION: | STORAGE (CONT.) | | | STORAGE EXTENSION | | | | |

FIG. 26

READ PERFORMANCE FROM DISAGGREGATED STORAGE USING DISTRIBUTED STORAGE AGENTS

CROSS REFERENCES TO RELATED APPLICATIONS

This application is a continuation of International Application No. PCT/IB2023/000303 filed on May 25, 2023 which claims the benefit of priority of U.S. Provisional Patent Application No. 63/345,545, filed on May 25, 2022; U.S. Provisional Patent Application No. 63/355,763, filed on Jun. 27, 2022; U.S. Provisional Patent Application No. 63/431,140, filed on Dec. 8, 2022. The foregoing applications are incorporated herein by reference in their entirety.

BACKGROUND

Technical Field

The present disclosure generally relates to improvements to processing systems and methods.

Background Information

Details of memory processing modules and related technologies can be found in PCT/IB2018/000995 filed 30 Jul. 2018, PCT/IB2019/001005 filed 6 Sep. 2019, PCT/IB2020/000665 filed 13 Aug. 2020, and PCT/US2021/055472 filed 18 Oct. 2021. Exemplary elements such as XRAM, XDIMM, XSC, and IMPU are available from NeuroBlade Ltd., Tel Aviv, Israel.

SUMMARY

In an embodiment, an apparatus may include a memory array; at least one row buffer configured to latch at least a portion of a row of the memory array; a configurable register configured to store a predicate comprising one or more bits; a control bit interface configured to latch the predicate in the configurable register; and one or more comparators configured to execute at least one function to generate an output. The at least one function may be configured to operate on the one or more bits latched in the at least one row buffer, and the at least one function is also configured to operate on the predicate latched in the configurable register. The apparatus may further include an output interface configured to transfer the output generated by the one or more comparators to at least one processor.

In an embodiment, an apparatus may include a memory array and at least one row buffer associated with the memory array. The row buffer may be configured to latch at least a portion of a row of the memory array. The apparatus may further include at least one row-buffer processing module associated with the at least one row buffer. The at least one row-buffer processing module may be configured to execute at least one function to generate an output, and the at least one function may be configured to operate on the one or more bits latched in the at least one row buffer.

In an embodiment, a system may include at least one processing unit configured to determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number. The shifted number may be greater than or equal to zero and less than the predetermined number.

In an embodiment, a system may include at least one processing unit configured to determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number In an embodiment, a system may comprise at least one memory and at least one compute node comprising at least one agent module. The at least one agent module may be configured to cause at least a portion of data stored in the at least one memory to be pushed to a destination in accordance with an agent access plan.

Consistent with other disclosed embodiments, non-transitory computer readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 26 is an example of a large random number used to generate a plurality of shifted numbers, consistent with the disclosed embodiments.

DETAILED DESCRIPTION

Figure 1:
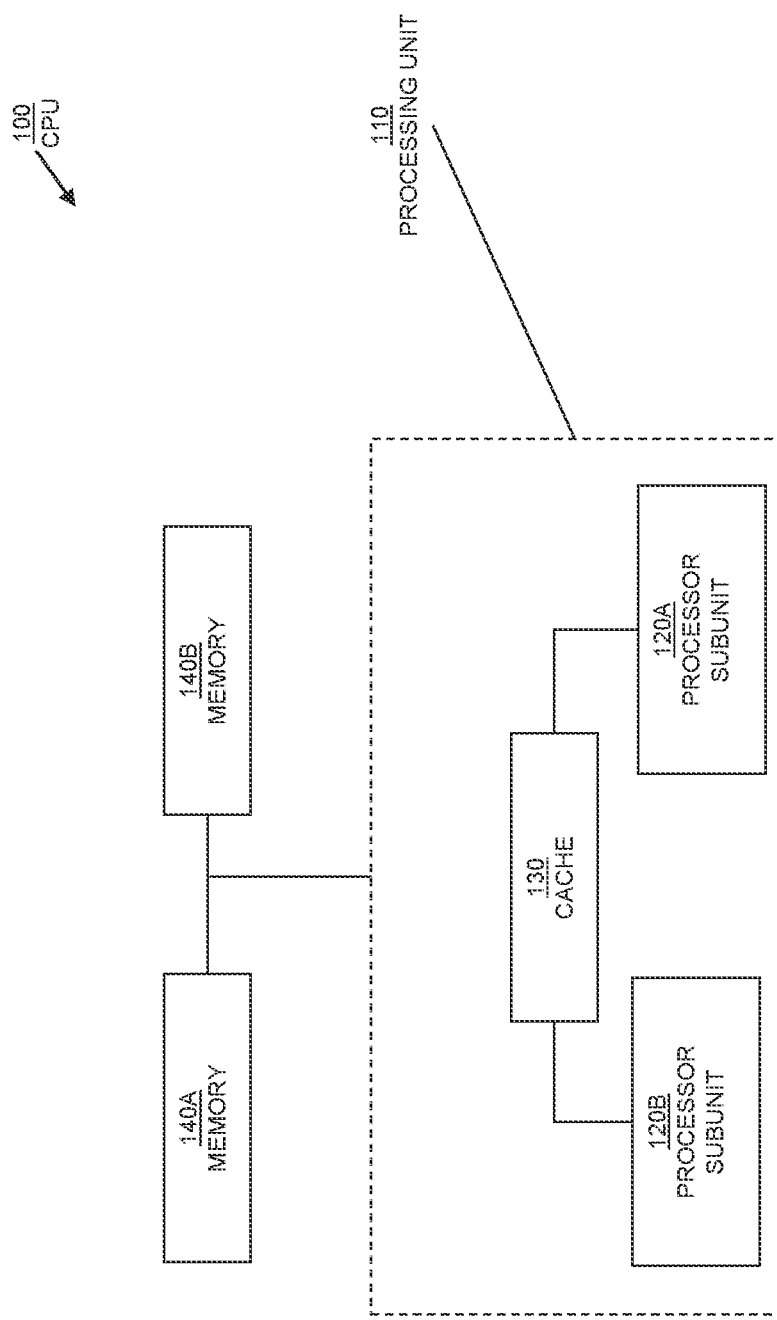
FIG. 1 is an example of a computer (CPU) architecture.

The following detailed description refers to the accompanying drawings. Wherever convenient, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Example Architecture

FIG. 1 is an example of a computer (CPU) architecture. A CPU 100 may comprise a processing unit 110 that includes one or more processor subunits, such as processor subunit 120a and processor subunit 120b. Although not depicted in the current figure, each processor subunit may comprise a plurality of processing elements. Moreover, the processing unit 110 may include one or more levels of on-chip cache. Such cache elements are generally formed on the same semiconductor die as processing unit 110 rather than being connected to processor subunits 120a and 120b via one or more buses formed in the substrate containing processor subunits 120a and 120b and the cache elements. An arrangement directly on the same die, rather than being connected via buses, may be used for both first-level (L1) and second-level (L2) caches in processors. Alternatively, in older processors, L2 caches were shared amongst processor subunits using back-side buses between the subunits and the L2 caches. Back-side buses are generally larger than front-side buses, described below. Accordingly, because cache is to be shared with all processor subunits on the die, cache 130 may be formed on the same die as processor subunits 120a and 120b or communicatively coupled to processor subunits 120a and 120b via one or more back-side buses. In both embodiments without buses (e.g., cache is formed directly on-die) as well as embodiments using back-side buses, the caches are shared between processor subunits of the CPU.

Moreover, processing unit 110 may communicate with shared memory 140a and memory 140b. For example, memories 140a and 140b may represent memory banks of shared dynamic random-access memory (DRAM). Although depicted with two banks, memory chips may include between eight and sixteen memory banks. Accordingly, processor subunits 120a and 120b may use shared memories 140a and 140b to store data that is then operated upon by processor subunits 120a and 120b. This arrangement, however, results in the buses between memories 140a and 140b and processing unit 110 acting as a bottleneck when the clock speeds of processing unit 110 exceed data transfer speeds of the buses. This is generally true for processors, resulting in lower effective processing speeds than the stated processing speeds based on clock rate and number of transistors.

Figure 2:
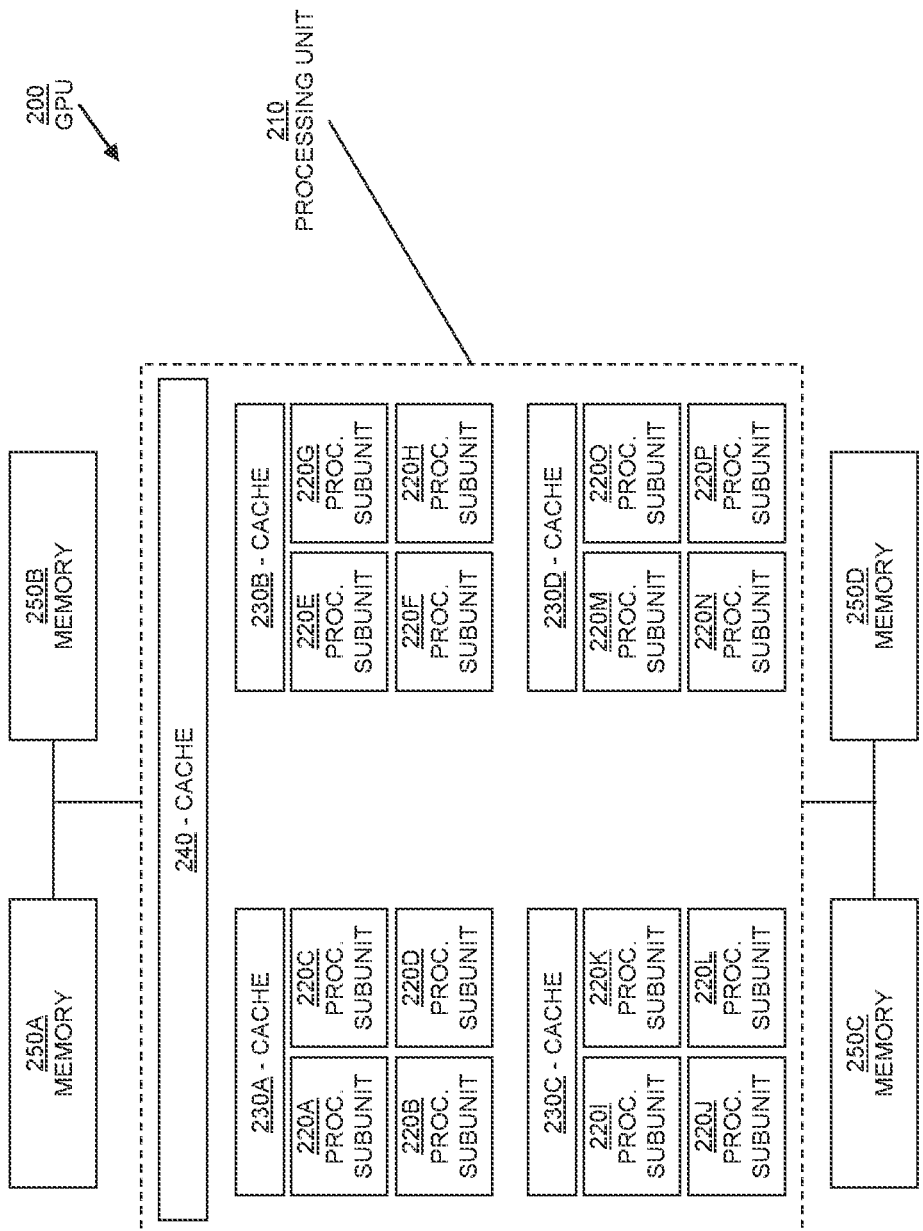
FIG. 2 is an example of a graphics processing unit (GPU) architecture.

FIG. 2 is an example of a graphics processing unit (GPU) architecture. Deficiencies of the CPU architecture similarly persist in GPUs. A GPU 200 may comprise a processing unit 210 that includes one or more processor subunits (e.g., subunits 220a, 220b, 220c, 220d, 220e, 220f, 220g, 220h, 220i, 220j, 220k, 220l, 220m, 220n, 220o, and 220p). Moreover, the processing unit 210 may include one or more levels of on-chip cache and/or register files. Such cache elements are generally formed on the same semiconductor die as processing unit 210. Indeed, in the example of the current figure, cache 210 is formed on the same die as processing unit 210 and shared amongst all of the processor subunits, while caches 230a, 230b, 230c, and 230d are formed on a subset of the processor subunits, respectively, and dedicated thereto.

Moreover, processing unit 210 communicates with shared memories 250a, 250b, 250c, and 250d. For example, memories 250a, 250b, 250c, and 250d may represent memory banks of shared DRAM. Accordingly, the processor subunits of processing unit 210 may use shared memories 250a, 250b, 250c, and 250d to store data that is then operated upon by the processor subunits. This arrangement, however, results in the buses between memories 250a, 250b, 250c, and 250d and processing unit 210 acting as a bottleneck, similar to the bottleneck described above for CPUs.

Figure 3:
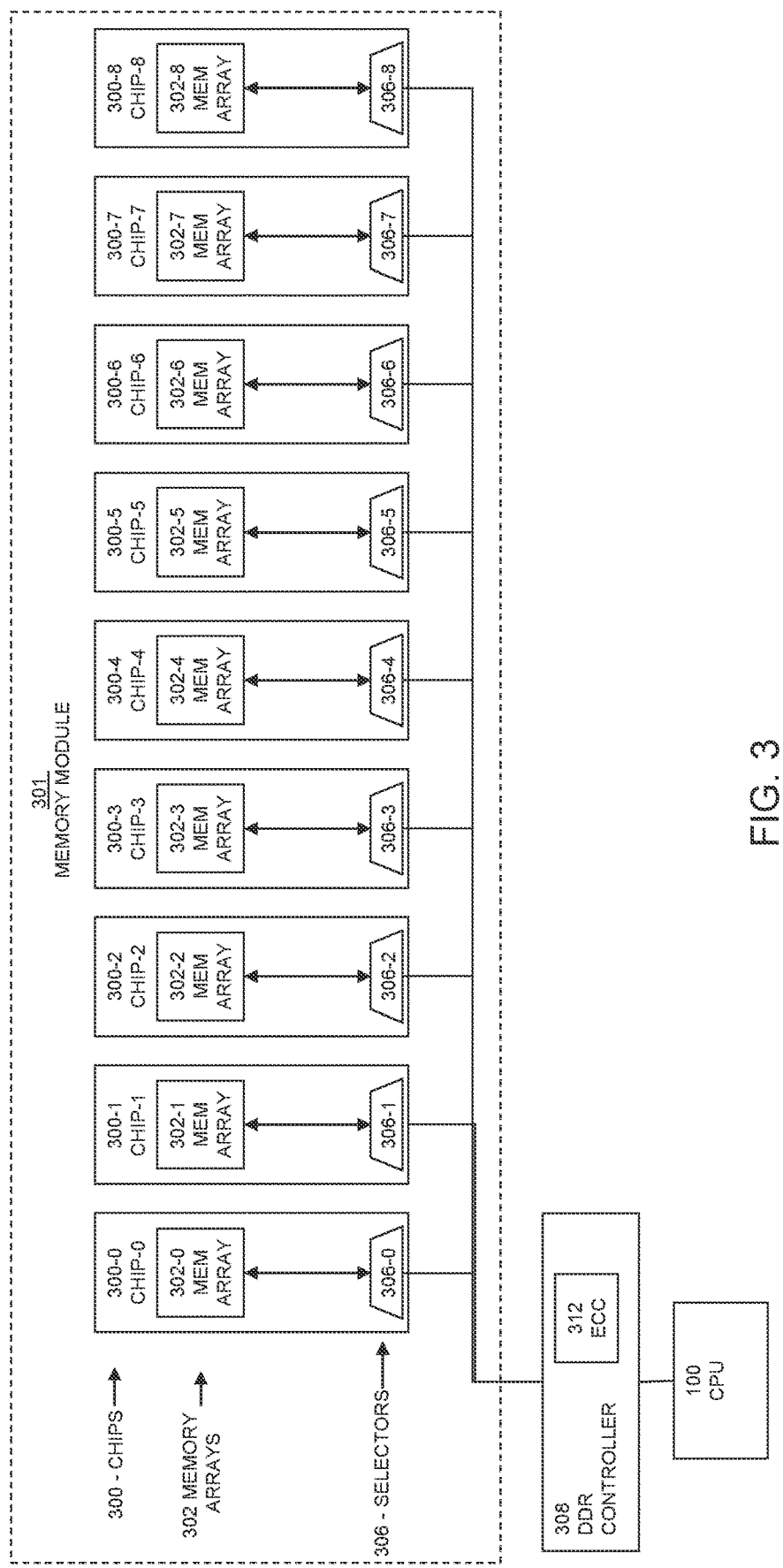
FIG. 3 is a diagrammatic representation of a computer memory with an error correction code (ECC) capability.

FIG. 3 is a diagrammatic representation of a computer memory with an error correction code (ECC) capability. As shown in the current figure, a memory module 301 includes an array of memory chips 300, shown as nine chips (i.e., chip-0, 100-0 through chip-8, 100-8, respectively). Each memory chip has respective memory arrays 302 (e.g., elements labelled 302-0 through 302-8) and corresponding address selectors 306 (shown as respective selector-0 106-0 through selector-8 106-8). Controller 308 is shown as a DDR controller. The DDR controller 308 is operationally connected to CPU 100 (processing unit 110), receiving data from the CPU 100 for writing to memory, and retrieving data from the memory to send to the CPU 100. The DDR controller 308 also includes an error correction code (ECC) module that generates error correction codes that may be used in identifying and correcting errors in data transmissions between CPU 100 and components of memory module 301.

Figure 4:
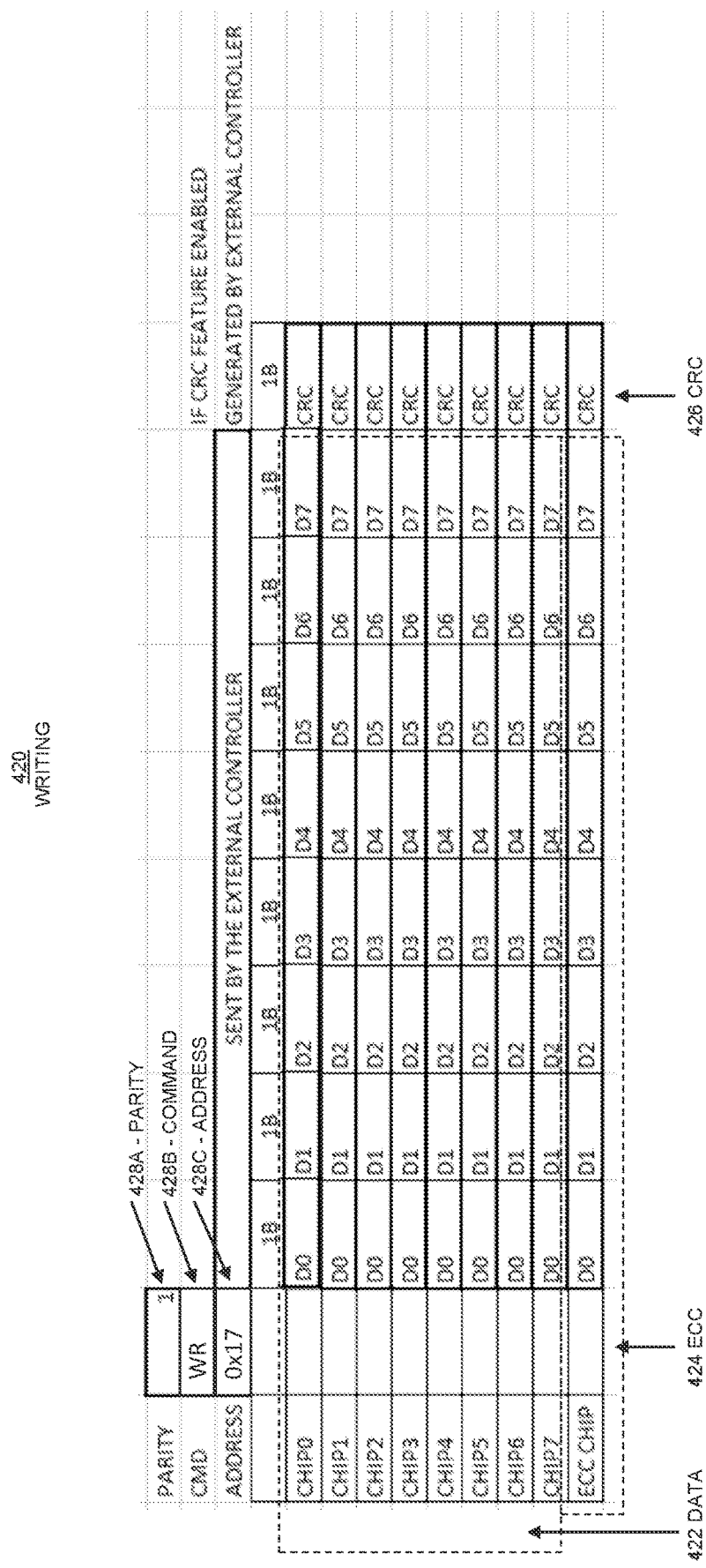
FIG. 4 is a diagrammatic representation of a process for writing data to a memory module.

FIG. 4 is a diagrammatic representation of a process for writing data to the memory module 301. Specifically, the process 420 of writing to the memory module 301 can include writing data 422 in bursts, each burst including 8 bytes for each chip being written to (in the current example, 8 of the memory chips 300, including chip-0, 100-0 to chip-7, 100-7). In some implementations, an original error correction code (ECC) 424 may be calculated in the ECC module 312 in the DDR controller 308. The ECC 424 is calculated across each of the chip's 8 bytes of data, resulting in an additional, original, 1-byte ECC for each byte of the burst across the 8 chips. The 8-byte (8×1-byte) ECC is written with the burst to a ninth memory chip serving as an ECC chip in the memory module 301, such as chip-8, 100-8.

The memory module 301 can activate a cyclic redundancy check (CRC) check for each chip's burst of data, to protect the chip interface. A cyclic redundancy check is an error-detecting code commonly used in digital networks and storage devices to detect accidental changes to raw data. Blocks of data get a short check value attached, based on the remainder of a polynomial division of the block's contents. In this case, an original CRC 426 is calculated by the DDR controller 308 over the 8 bytes of data 422 in a chip's burst (one row in the current figure) and sent with each data burst (each row/to a corresponding chip) as a ninth byte in the chip's burst transmission. When each chip 300 receives data, each chip 300 calculates a new CRC over the data and compares the new CRC to the received original CRC. If the CRCs match, the received data is written to the chip's memory 302. If the CRCs do not match, the received data is discarded, and an alert signal is activated. An alert signal may include an ALERT_N signal.

Additionally, when writing data to a memory module 301, an original parity 428A is normally calculated over the (exemplary) transmitted command 428B and address 428C. Each chip 300 receives the command 428B and address 428C, calculates a new parity, and compares the original parity to the new parity. If the parities match, the received command 428B and address 428C are used to write the corresponding data 422 to the memory module 301. If the parities do not match, the received data 422 is discarded, and an alert signal (e.g., ALERT_N) is activated.

Figure 5:
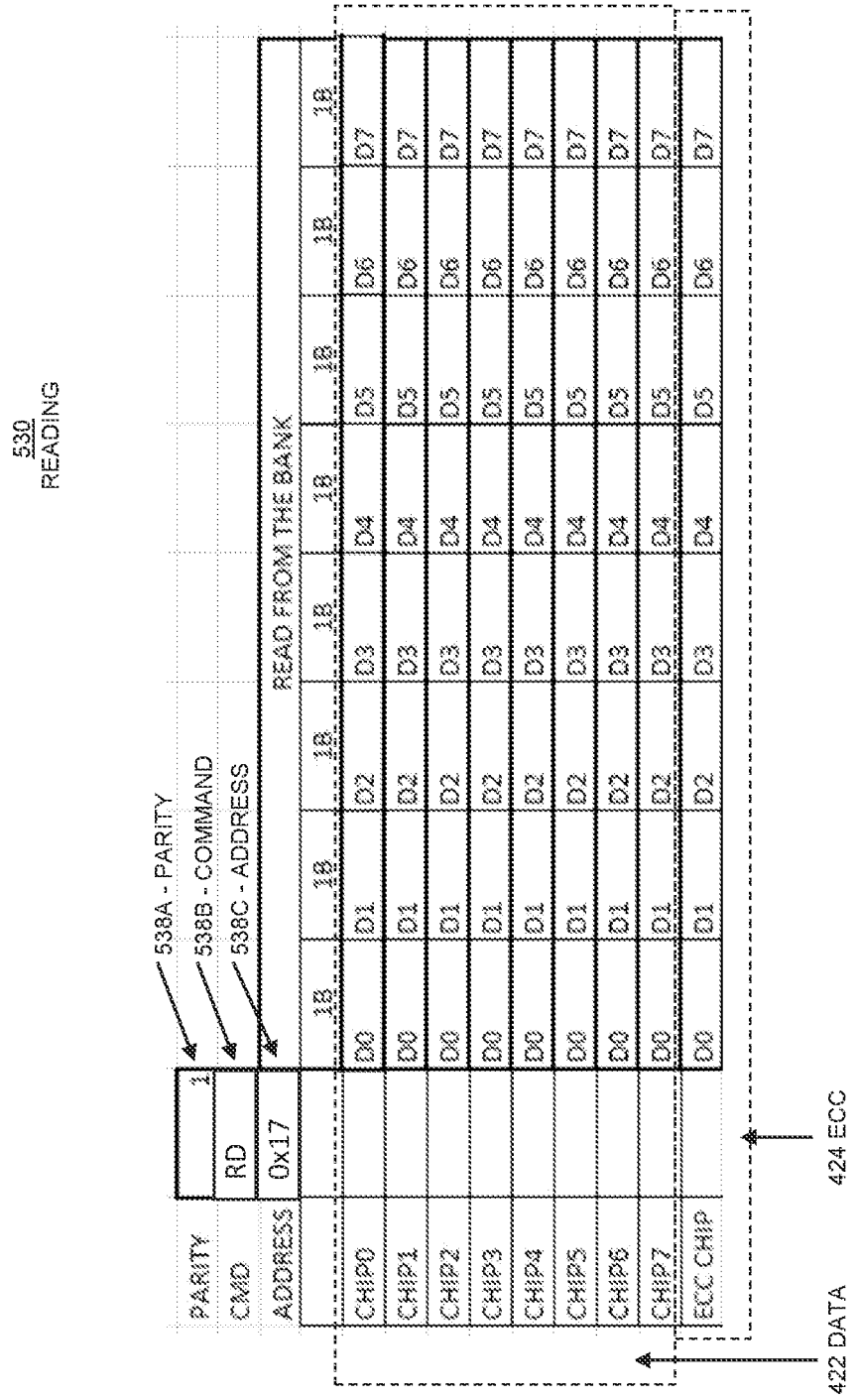
FIG. 5 is a diagrammatic representation of a process for reading from memory.

FIG. 5 is a diagrammatic representation of a process 530 for reading from memory. When reading from the memory module 301, the original ECC 424 is read from the memory and sent with the data 422 to the ECC module 312. The ECC module 312 calculates a new ECC across each of the chips' 8 bytes of data. The new ECC is compared to the original ECC to determine (detect, correct) if an error has occurred in the data (transmission, storage). In addition, when reading data from memory module 301, an original parity 538A is normally calculated over the (exemplary) transmitted command 538B and address 538C (transmitted to the memory module 301 to tell the memory module 301 to read and from which address to read). Each chip 300 receives the command 538B and address 538C, calculates a new parity, and compares the original parity to the new parity. If the parities match, the received command 538B and address 538C are used to read the corresponding data 422 from the memory module 301. If the parities do not match, the received command 538B and address 538C are discarded and an alert signal (e.g., ALERT_N) is activated.

Overview of Memory Processing Modules and Associated Appliances

Figure 6:
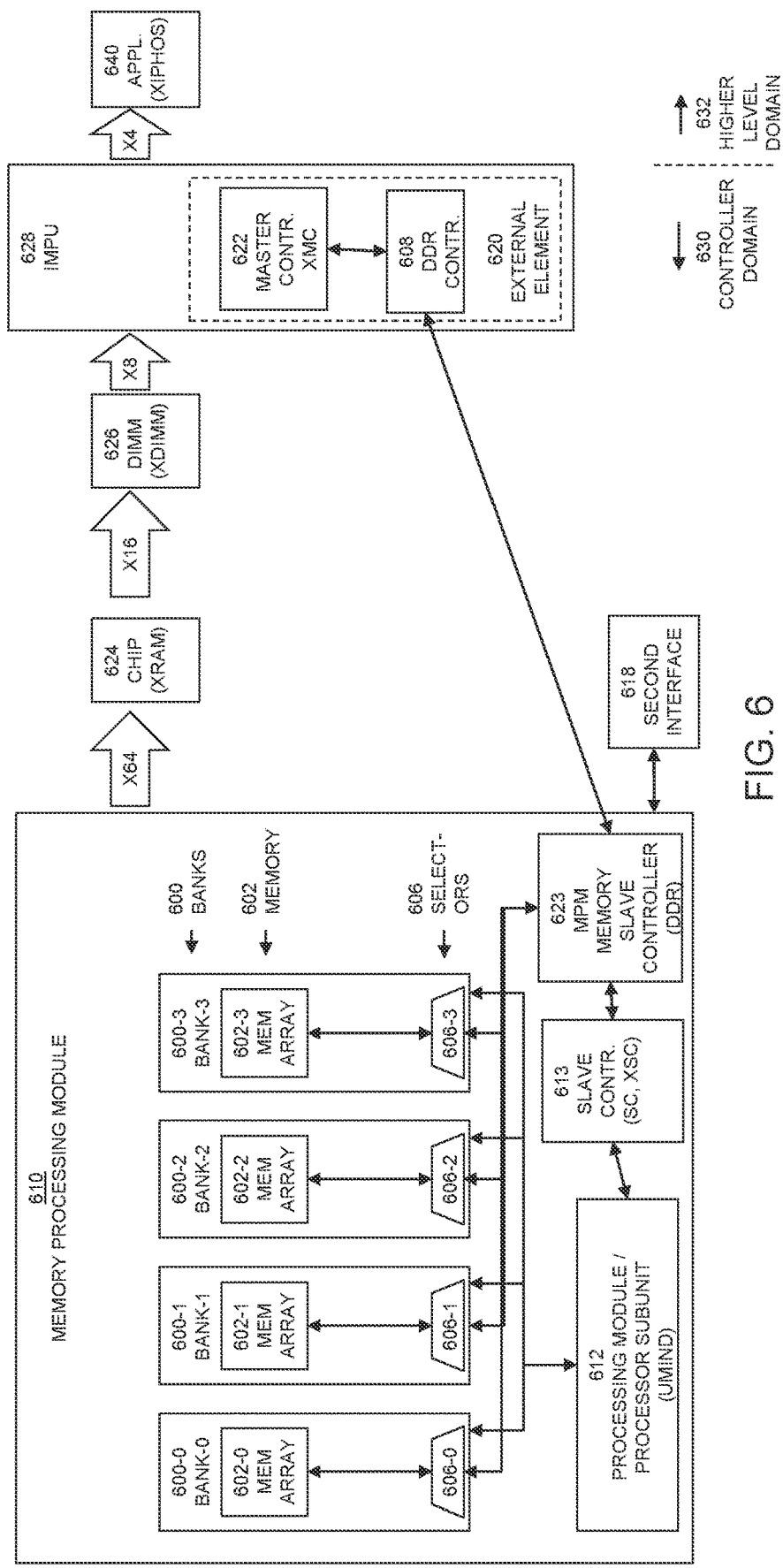
FIG. 6 is a diagrammatic representation of an architecture including memory processing modules.

FIG. 6 is a diagrammatic representation of an architecture including memory processing modules. For example, a memory processing module (MPM) 610, as described above, may be implemented on a chip to include at least one processing element (e.g., a processor subunit) local to associated memory elements formed on the chip. In some cases, an MPM 610 may include a plurality of processing elements spatially distributed on a common substrate among their associated memory elements within the MPM 610.

In the example of FIG. 6, the memory processing module 610 includes a processing module 612 coupled with four, dedicated memory banks 600 (shown as respective bank-0, 600-0 through bank-3, 600-3). Each bank includes a corresponding memory array 602 (shown as respective memory array-0, 602-0 through memory array-3, 602-3) along with selectors 606 (shown as selector-0 606-0 to selector-3 606-3). The memory arrays 602 may include memory elements similar to those described above relative to memory arrays 302. Local processing, including arithmetic operations, other logic-based operations, etc. can be performed by processing module 612 (also referred to in the context of this document as a "processing subunit," "processor subunit," "logic," "micro mind," or "UMIND") using data stored in the memory arrays 602, or provided from other sources, for example, from other of the processing modules 612. In some cases, one or more processing modules 612 of one or more MPMs 610 may include at least one arithmetic logic units (ALU). Processing module 612 is operationally connected to each of the memory banks 600.

A DDR controller 608 may also be operationally connected to each of the memory banks 600, e.g., via an MPM slave controller 623. Alternatively, and/or in addition to the DDR controller 608, a master controller 622 can be operationally connected to each of the memory banks 600, e.g., via the DDR controller 608 and memory controller 623. The DDR controller 608 and the master controller 622 may be implemented in an external element 620. Additionally, and/or alternatively, a second memory interface 618 may be provided for operational communication with the MPM 610.

While the MPM 610 of FIG. 6 pairs one processing module 612 with four, dedicated memory banks 600, more or fewer memory banks can be paired with a corresponding processing module to provide a memory processing module. For example, in some cases, the processing module 612 of MPM 610 may be paired with a single, dedicated memory bank 600. In other cases, the processing module 612 of MPM 610 may be paired with two or more dedicated memory banks 600, four or more dedicated memory banks 600, etc. Various MPMs 610, including those formed together on a common substrate or chip, may include different numbers of memory banks relative to one another. In some cases, an MPM 610 may include one memory bank 600. In other cases, an MPM may include two, four, eight, sixteen, or more memory banks 600. As a result, the number of memory banks 600 per processing module 612 may be the same throughout an entire MPM 610 or across MPMs. One or more MPMs 610 may be included in a chip. In a non-limiting example, included in an XRAM chip 624. Alternatively, at least one processing module 612 may control more memory banks 600 than another processing module 612 included within an MPM 610 or within an alternative or larger structure, such as the XRAM chip 624.

Each MPM 610 may include one processing module 612 or more than one processing module 610. In the example of FIG. 6, one processing module 612 is associated with four dedicated memory banks 600. In other cases, however, one or more memory banks of an MPM may be associated with two or more processing modules 612.

Each memory bank 600 may be configured with any suitable number of memory arrays 602. In some cases, a bank 600 may include only a single array. In other cases, a bank 600 may include two or more memory arrays 602, four or more memory arrays 602, etc. Each of the banks 600 may have the same number of memory arrays 602. Alternatively, different banks 600 may have different numbers of memory arrays 602.

Various numbers of MPMs 610 may be formed together on a single hardware chip. In some cases, a hardware chip may include just one MPM 610. In other cases, however, a single hardware chip may include two, four, eight, sixteen, 32, 64, etc. MPMs 610. In the particular non-limiting example represented in the current figure, 64 MPMs 610 are combined together on a common substrate of a hardware chip to provide the XRAM chip 624, which may also be referred to as a memory processing chip or a computational memory chip. In some embodiments, each MPM 610 may include a slave controller 613 (e.g., an eXtreme/Xele or XSC slave controller (SC)) configured to communicate with a DDR controller 608 (e.g., via MPM slave controller 623), and/or a master controller 622. Alternately, fewer than all of the MPMs onboard an XRAM chip 624 may include a slave controller 613. In some cases, multiple MPMs (e.g., 64 MPMs) 610 may share a single slave controller 613 disposed on XRAM chip 624. Slave controller 613 can communicate data, commands, information, etc. to one or more processing modules 612 on XRAM chip 624 to cause various operations to be performed by the one or more processing modules 612.

One or more XRAM chips 624, which may include a plurality of XRAM chips 624, such as sixteen XRAM chips 624, may be configured together to provide a dual in-line memory module (DIMM) 626. Traditional DIMMs may be referred to as a RAM stick, which may include eight or nine, etc., dynamic random-access memory chips (integrated circuits) constructed as/on a printed circuit board (PCB) and having a 64-bit data path. In contrast to traditional memory, the disclosed memory processing modules 610 include at least one computational component (e.g., processing module 612) coupled with local memory elements (e.g., memory banks 600). As multiple MPMs may be included on an XRAM chip 624, each XRAM chip 624 may include a plurality of processing modules 612 spatially distributed among associated memory banks 600. To acknowledge the inclusion of computational capabilities (together with memory) within the XRAM chip 624, each DIMM 626 including one or more XRAM chips (e.g., sixteen XRAM chips, as in the FIG. 6 example) on a single PCB may be referred to as an XDIMM (or eXtremeDIMM or XeleDIMM). Each XDIMM 626 may include any number of XRAM chips 624, and each XDIMM 624 may have the same or a different number of XRAM chips 624 as other XDIMMs 626. In the FIG. 6 example, each XDIMM 626 includes sixteen XRAM chips 624.

As shown in FIG. 6, the architecture may further include one or more memory processing units, such as an intense memory processing unit (IMPU) 628. Each IMPU 628 may include one or more XDIMMs 626. In the FIG. 6 example, each IMPU 628 includes four XDIMMs 626. In other cases, each IMPU 628 may include the same or a different number of XDIMMs as other IMPUs. The one or more XDIMMs included in IMPU 628 can be packaged together with or otherwise integrated with one or more DDR controllers 608 and/or one or more master controllers 622. For example, in some cases, each XDIMM included in IMPU 628 may include a dedicated DDR controller 608 and/or a dedicated master controller 622. In other cases, multiple XDIMMs included in IMPU 628 may share a DDR controller 608 and/or a master controller 622. In one particular example, IMPU 628 includes four XDIMMs 626 along with four master controllers 622 (each master controller 622 including a DDR controller 608), where each of the master controllers 622 is configured to control one associated XDIMM 626, including the MPMs 610 of the XRAM chips 624 included in the associated XDIMM 626.

The DDR controller 608 and the master controller 622 are examples of controllers in a controller domain 630. A higher-level domain 632 may contain one or more additional devices, user applications, host computers, other devices, protocol layer entities, and the like. The controller domain 630 and related features are described in the sections below. In a case where multiple controllers and/or multiple levels of controllers are used, the controller domain 630 may serve as at least a portion of a multi-layered module domain, which is also further described in the sections below.

In the architecture represented by FIG. 6, one or more IMPUs 628 may be used to provide a memory appliance 640, which may be referred to as an XIPHOS appliance. In the example of FIG. 6, memory appliance 640 includes four IMPUs 628.

The location of processing elements 612 among memory banks 600 within the XRAM chips 624 (which are incorporated into XDIMMs 626 that are incorporated into IMPUs 628 that are incorporated into memory appliance 640) may significantly relieve the bottlenecks associated with CPUs, GPUs, and other processors that operate using a shared memory. For example, a processor subunit 612 may be tasked to perform a series of instructions using data stored in memory banks 600. The proximity of the processing subunit 612 to the memory banks 600 can significantly reduce the time required to perform the prescribed instructions using the relevant data.

Figure 7:
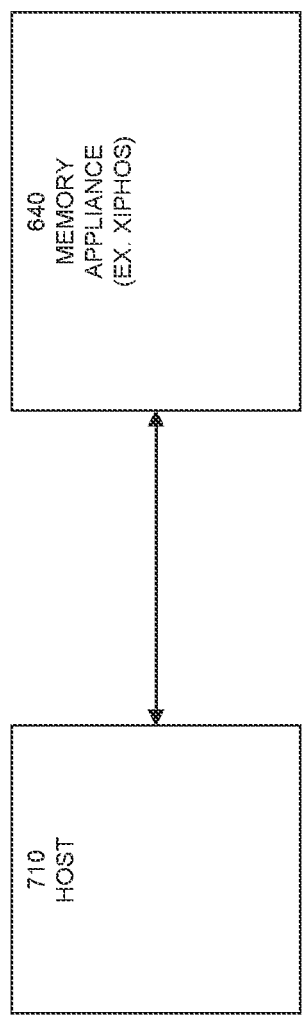
FIG. 7 shows a host provide instructions, data, and/or other input to a memory appliance and read output from the same.

As shown in FIG. 7, a host 710 may provide instructions, data, and/or other input to memory appliance 640 and read output from the same. Rather than requiring the host to access a shared memory and perform calculations/functions relative to data retrieved from the shared memory, in the disclosed embodiments, the memory appliance 640 can perform the processing associated with a received input from host 710 within the memory appliance (e.g., within processing modules 612 of one or more MPMs 610 of one or more XRAM chips 624 of one or more XDIMMs 626 of one or more IMPUs). Such functionality is made possible by the distribution of processing modules 612 among and on the same hardware chips as the memory banks 600 where relevant data needed to perform various calculations/functions/etc. is stored.

The architecture described in FIG. 6 may be configured for execution of code. For example, each processor subunit 612 may individually execute code (defining a set of instructions) apart from other processor subunits in an XRAM chip 624 within memory appliance 640. Accordingly, rather than relying on an operating system to manage multithreading or using multitasking (which is concurrency rather than parallelism), the XRAM chips of the present disclosure may allow for processor subunits to operate fully in parallel.

In addition to a fully parallel implementation, at least some of the instructions assigned to each processor subunit may be overlapping. For example, a plurality of processor subunits 612 on an XRAM chip 624 (or within an XDIMM 626 or IMPU 628) may execute overlapping instructions as, for example, an implementation of an operating system or other management software, while executing non-overlapping instructions in order to perform parallel tasks within the context of the operating system or other management software.

For purposes of various structures discussed in this description, the Joint Electron Device Engineering Council (JEDEC) Standard No. 79-4C defines the DDR4 SDRAM specification, including features, functionalities, AC and DC characteristics, packages, and ball/signal assignments. The latest version at the time of this application is January 2020, available from JEDEC Solid State Technology Association, 3103 North 10th Street, Suite 240 South, Arlington, VA 22201-2107, www.jedec.org, and is incorporated by reference in its entirety herein.

Exemplary elements such as XRAM, XDIMM, XSC, and IMPU are available from NeuroBlade Ltd., Tel Aviv, Israel. Details of memory processing modules and related technologies can be found in PCT/IB2018/000995 filed 30 Jul. 2018, PCT/IB2019/001005 filed 6 Sep. 2019, PCT/IB2020/000665 filed 13 Aug. 2020, and PCT/US2021/055472 filed 18 Oct. 2021. Exemplary implementations using XRAM, XDIMM, XSC, IMPU, etc. elements are not limiting, and based on this description one skilled in the art will be able to design and implement configurations for a variety of applications using alternative elements.

Data Analytics Processor

Figure 8:
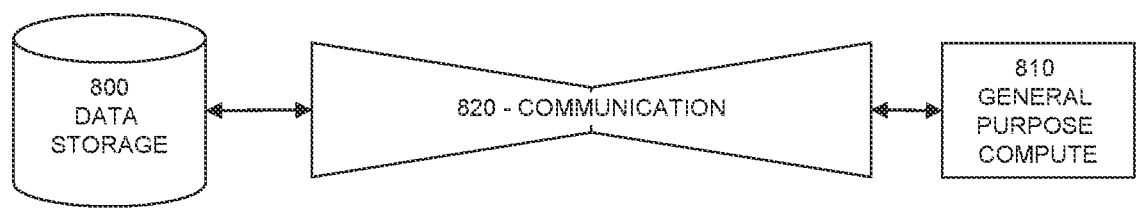
FIG. 8 is an example of implementations of processing systems and, in particular, for data analytics.

FIG. 8 is an example of implementations of processing systems and, in particular, processing systems for data analytics. Many modern applications are limited by data communication 820 between storage 800 and processing (shown as general-purpose compute 810). Current solutions include adding levels of data cache and re-layout of hardware components. For example, current solutions for data analytics applications have limitations including: (1) Network bandwidth (BW) between storage and processing, (2) network bandwidth between CPUs, (3) memory size of CPUs, (4) inefficient data processing methods, and (5) access rate to CPU memory.

In addition, data analytics solutions have significant challenges in scaling up. For example, when trying to add more processing power or memory, more processing nodes are required, therefore more network bandwidth between processors and between processors and storage is required, leading to network congestion.

Figure 9:
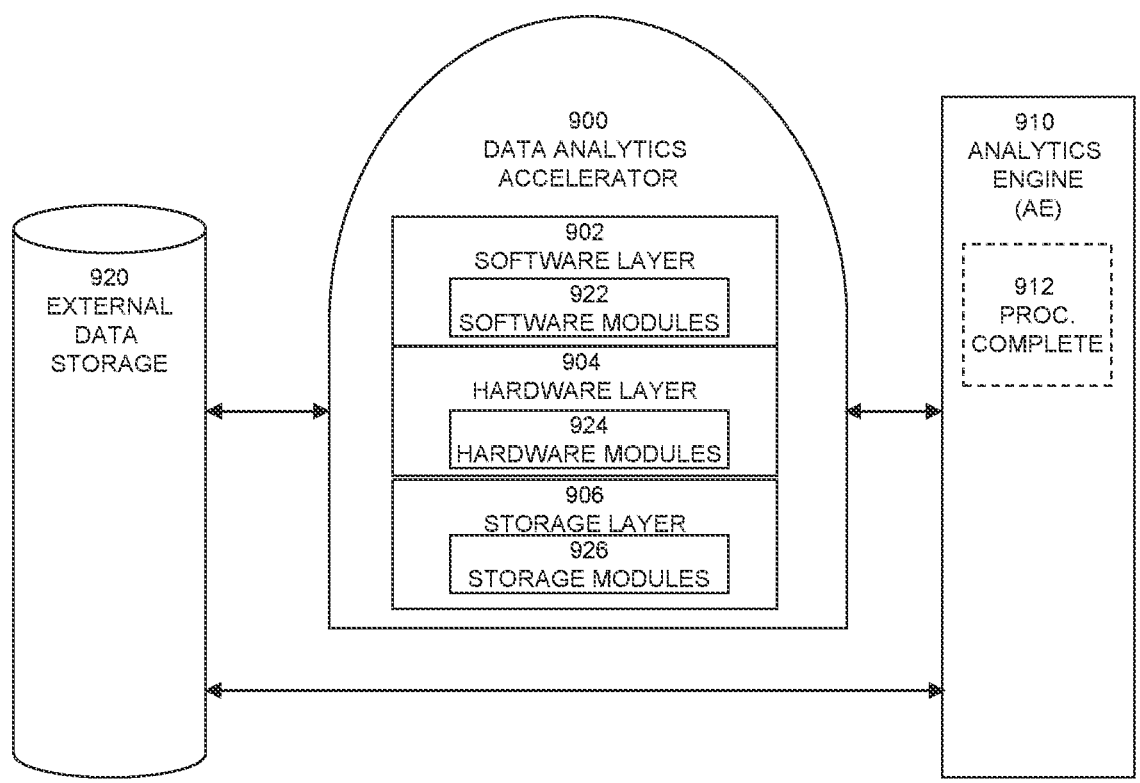
FIG. 9 is an example of a high-level architecture for a data analytics accelerator.

FIG. 9 is an example of a high-level architecture for a data analytics accelerator. A data analytics accelerator 900 is configured between an external data storage 920 and an analytics engine (AE) 910 optionally followed by completion processing 912, for example, on the analytics engine 910. The external data storage 920 may be deployed external to the data analytics accelerator 900, with access via an external computer network. The analytics engine (AE) 910 may be deployed on a general-purpose computer. The accelerator may include a software layer 902, a hardware layer 904, a storage layer 906, and networking (not shown). Each layer may include modules such as software modules 922, hardware modules 924, and storage modules 926. The layers and modules are connected within, between, and external to each of the layers. Acceleration may be done at least in part by applying one or more innovative operations, data reduction, and partial processing operations between the external data storage 920 and the analytics engine 910 (or general-purpose compute 810). Implementations of our solutions may include, but are not limited to, features such as, in-line, high parallelism computation, and data reduction. In an alternative operation, (only) a portion of data is processed by the data analytics accelerator 900 and a portion of the data bypasses the data analytics accelerator 900.

The data analytics accelerator 900 may provide at least in part a streaming processor, and is particularly suited, but not limited to, accelerating data analytics. The data analytics accelerator 900 may drastically reduce (for example, by several orders of magnitude) the amount of data which is transferred over the network to the analytics engine 910 (and/or the general-purpose compute 810), reduces the workload of the CPU, and reduces the required memory which the CPU needs to use. The accelerator 900 may include one or more data analytics processing engines which are tailor-made for data analytics tasks, such as scan, join, filter, aggregate etc., doing these tasks much more efficiently than analytics engine 910 (and/or the general-purpose compute 810). An implementation of the data analytics accelerator 900 is the Hardware Enhanced Query System (HEQS), which may include a Xiphos Data Analytics Accelerator (available from NeuroBlade Ltd., Tel Aviv, Israel).

Figure 10:
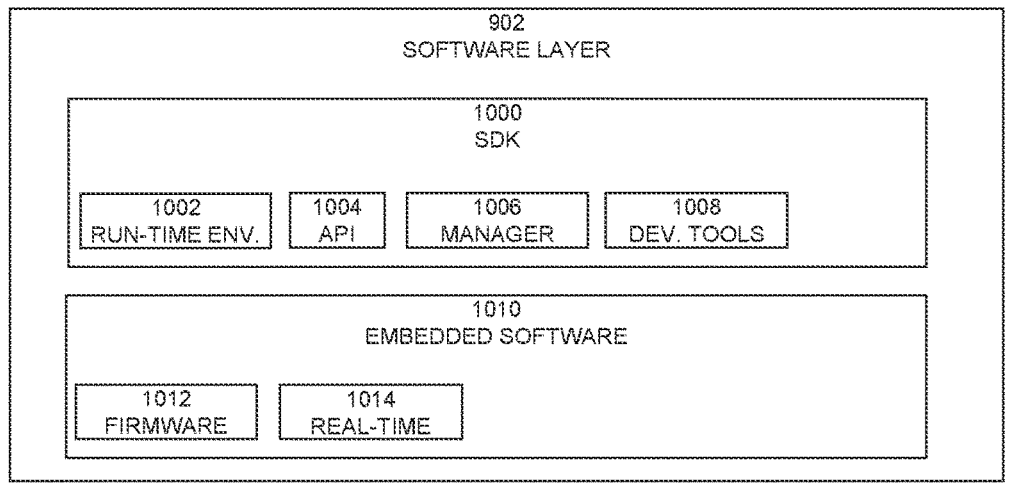
FIG. 10 is an example of a software layer for a data analytics accelerator.

FIG. 10 is an example of the software layer for the data analytics accelerator. The software layer 902 may include, but is not limited to, two main components: a software development kit (SDK) 1000 and embedded software 1010. The SDK provides abstraction of the accelerator capabilities through well-defined and easy to use data-analytics oriented software APIs for the data analytics accelerator. A feature of the SDK is enabling users of the data analytics accelerator to maintain the users' own DBMS, while adding the data analytics accelerator capabilities, for example, as part of the users' DBMS's planner optimization. The SDK may include modules such as:

A run-time environment 1002 may expose hardware capabilities to above layers. The run-time environment may manage the programming, execution, synchronization, and monitoring of underlying hardware engines and processing elements.

A Fast Data I/O providing an efficient API 1004 for injection of data into the data analytics accelerator hardware and storage layers, such as an NVMe array and memories, and for interaction with the data. The Fast Data I/O may also be responsible for forwarding data from the data analytics accelerator to another device (such as the analytics engine 910, an external host, or server) for processing and/or completion processing 912.

A manager 1006 (data analytics accelerator manager) may handle administration of the data analytics accelerator.

A toolchain may include development tools 1008, for example, to help developers enhance the performance of the data analytics accelerator, eliminate bottlenecks, and optimize query execution. The toolchain may include a simulator and profiler, as well as a LLVM compiler.

Embedded software component 1010 may include code running on the data analytics accelerator itself. Embedded software component 1010 may include firmware 1012 that controls the operation of the accelerator's various components, as well as real-time software 1014 that runs on the processing elements. At least a portion of the embedded software component code may be generated, such as auto generated, by the (data analytics accelerator) SDK.

Figure 11:
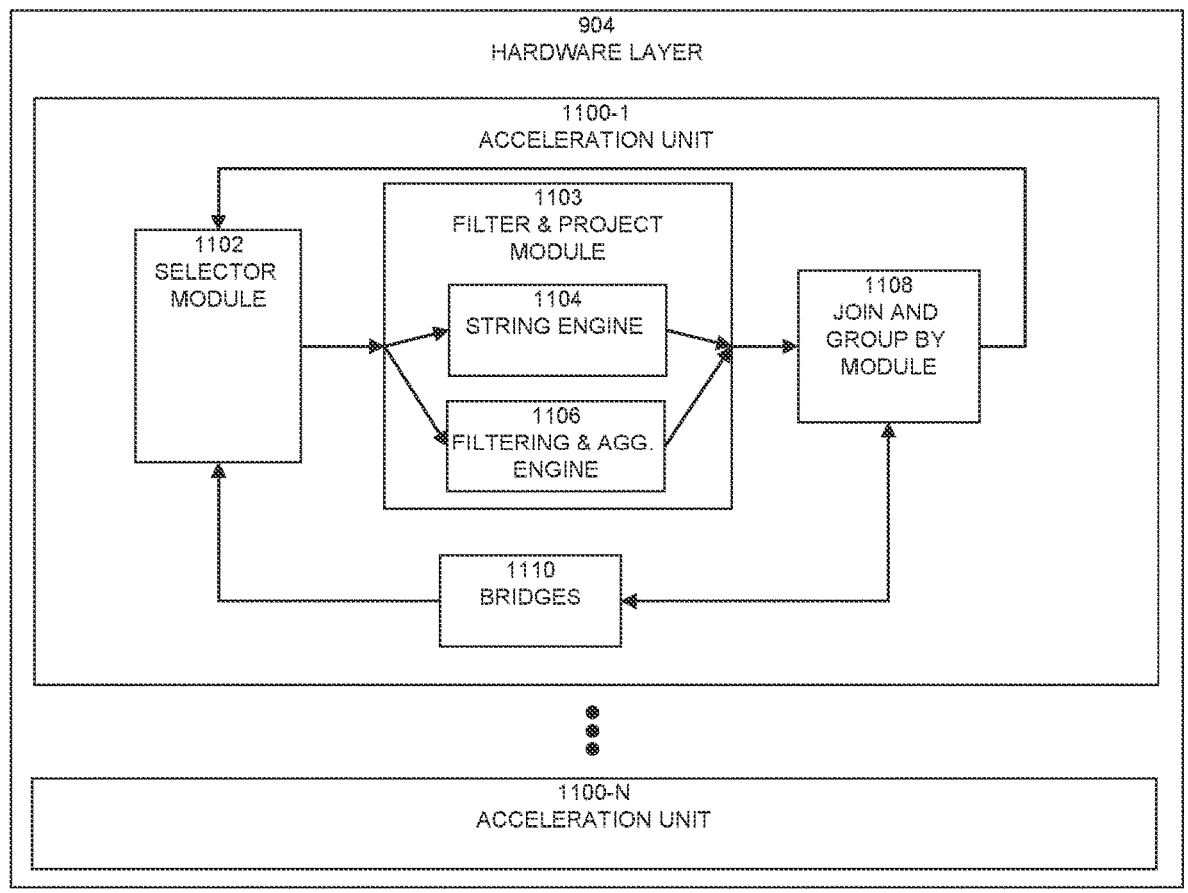
FIG. 11 is an example of the hardware layer for a data analytics accelerator.

FIG. 11 is an example of the hardware layer for the data analytics accelerator. The hardware layer 904 includes one or more acceleration units 1100. Each acceleration unit 1100 includes one or more of a variety of elements (modules), which may include a selector module 1102, filter and projection module (FPE) 1103, JOIN and Group By (JaGB) module 1108, and bridges 1110. Each module may contain one or more sub-modules, for example, the FPE 1103 which may include a string engine (SE) 1104 and a filtering and aggregation engine (FAE) 1106.

In FIG. 11, a plurality of acceleration units 1100 are shown as first acceleration unit 1100-1 to $n^{th}$ acceleration unit 1100-N. In the context of this description, the element number suffix "-N", where "N" is an integer, generally refers to an exemplary one of the elements, and the element number without a suffix refers to the element in general or the group of elements. One or more acceleration units 1100, individually or in combination, may be implemented using one or more individual or combination of FPGAs, ASICs, PCBs, and similar. Acceleration units 1100 may have the same or similar hardware configurations. However, this is not limiting, and modules may vary from one to another of the acceleration units 1100.

An example of element configuration will be used in this description. As noted above, element configuration may vary. Similarly, an example of networking and communication will be used. However, alternative and additional connections between elements, feed forward, and feedback data may be used. Input and output from elements may include data and alternatively or additionally includes signaling and similar information.

The selector module 1102 is configured to receive input from any of the other acceleration elements, such as, for example, from at least from the bridges 1110 and the JOIN and Group By engine (JaGB) 1108 (shown in the current figure), and optionally/alternatively/in addition from the filtering and projection module (FPE) 1103, the string engine (SE) 1104, and the filtering and aggregation engine (FAE) 1106. Similarly, the selector module 1102 can be configured to output to any of the other acceleration elements, such as, for example, to the FPE 1103.

The FPE 1103 may include a variety of elements (sub-elements). Input and output from the FPE 1103 may be to the FPE 1103 for distribution to sub-elements, or directly to and from one or more of the sub-elements. The FPE 1103 is configured to receive input from any of the other acceleration elements, such as, for example, from the selector module 1102. FPE input may be communicated to one or more of the string engine 1104 and FAE 1106. Similarly, the FPE 1103 is configured to output from any of the sub-elements to any of the other acceleration elements, such as, for example, to the JaGB 1108.

The JOIN and Group By (JaGB) engine 1108 may be configured to receive input from any of the other acceleration elements, such as, for example, from the FPE 1103 and the bridges 1110. The JaGB 1108 may be configured to output to any of the acceleration unit elements, for example, to the selector module 1102 and the bridges 1110.

Figure 12:
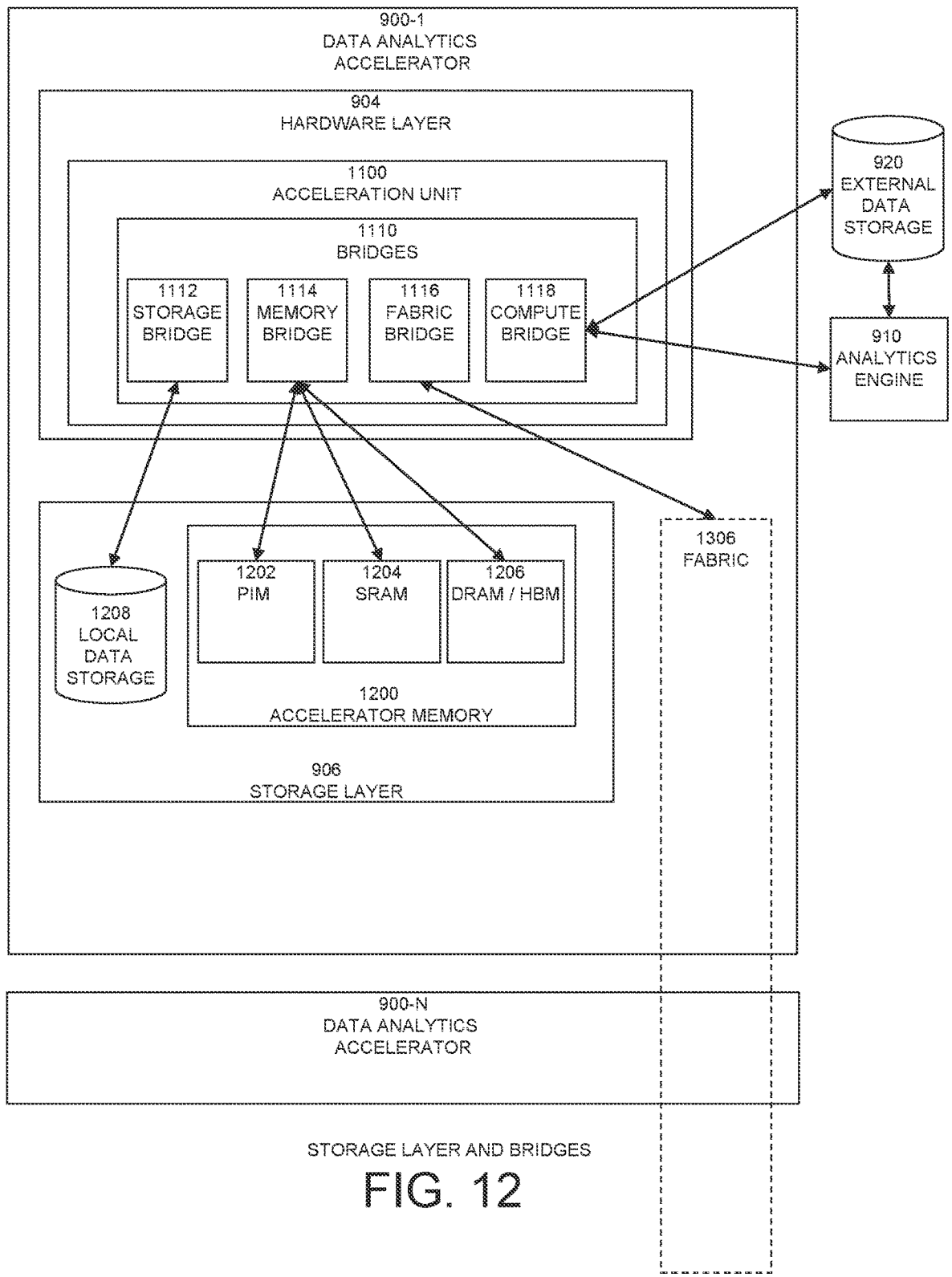
FIG. 12 is an example of the storage layer and bridges for a data analytics accelerator.

FIG. 12 is an example of the storage layer and bridges for the data analytics accelerator. The storage layer 906 may include one or more types of storage deployed locally, remotely, or distributed within and/or external to one or more of the acceleration units 1100 and one or more of the data analytics accelerators 900. The storage layer 906 may include non-volatile memory (such as local data storage 1208) and volatile memory (such as an accelerator memory 1200) deployed local to the hardware layer 904. Non-limiting examples of the local data storage 1208 include, but are not limited to solid state drives (SSD) deployed local and internal to the data analytics accelerator 900. Non-limiting examples of the accelerator memory 1200 include, but are not limited to FPGA memory (for example, of the hardware layer 904 implementation of the acceleration unit 1100 using an FPGA), processing in memory (PIM) 1202 memory for example, banks 600 of memory 602 in a memory processing module 610, and SRAM, DRAM, and HBM (for example, deployed on a PCB with the acceleration unit 1100). The storage layer 906 may also use and/or distribute memory and data via the bridges 1110 (such as, for example, the memory bridge 1114) via a fabric 1306 (described below in reference to FIG. 13), for example, to other acceleration units 1100 and/or other acceleration processors 900. In some embodiments, storage elements may be implemented by one or more elements or sub-elements.

One or more bridges 1110 provide interfaces to and from the hardware layer 904. Each of the bridges 1110 may send and/or receive data directly or indirectly to/from elements of the acceleration unit 1100. Bridges 1110 may include storage 1112, memory 1114, fabric 1116, and compute 1118.

Bridges configuration may include the storage bridge 1112 interfaces with the local data storage 1208. The memory bridge interfaces with memory elements, for example the PIM 1202, SRAM 1204, and DRAM/HBM 1206. The fabric bridge 116 interfaces with the fabric 1306. The compute bridge 1118 may interface with the external data storage 920 and the analytics engine 910. A data input bridge (not shown) may be configured to receive input from any of the other acceleration elements, including from other bridges, and to output to any of the acceleration unit elements, such as, for example, to the selector module 1102.

Figure 13:
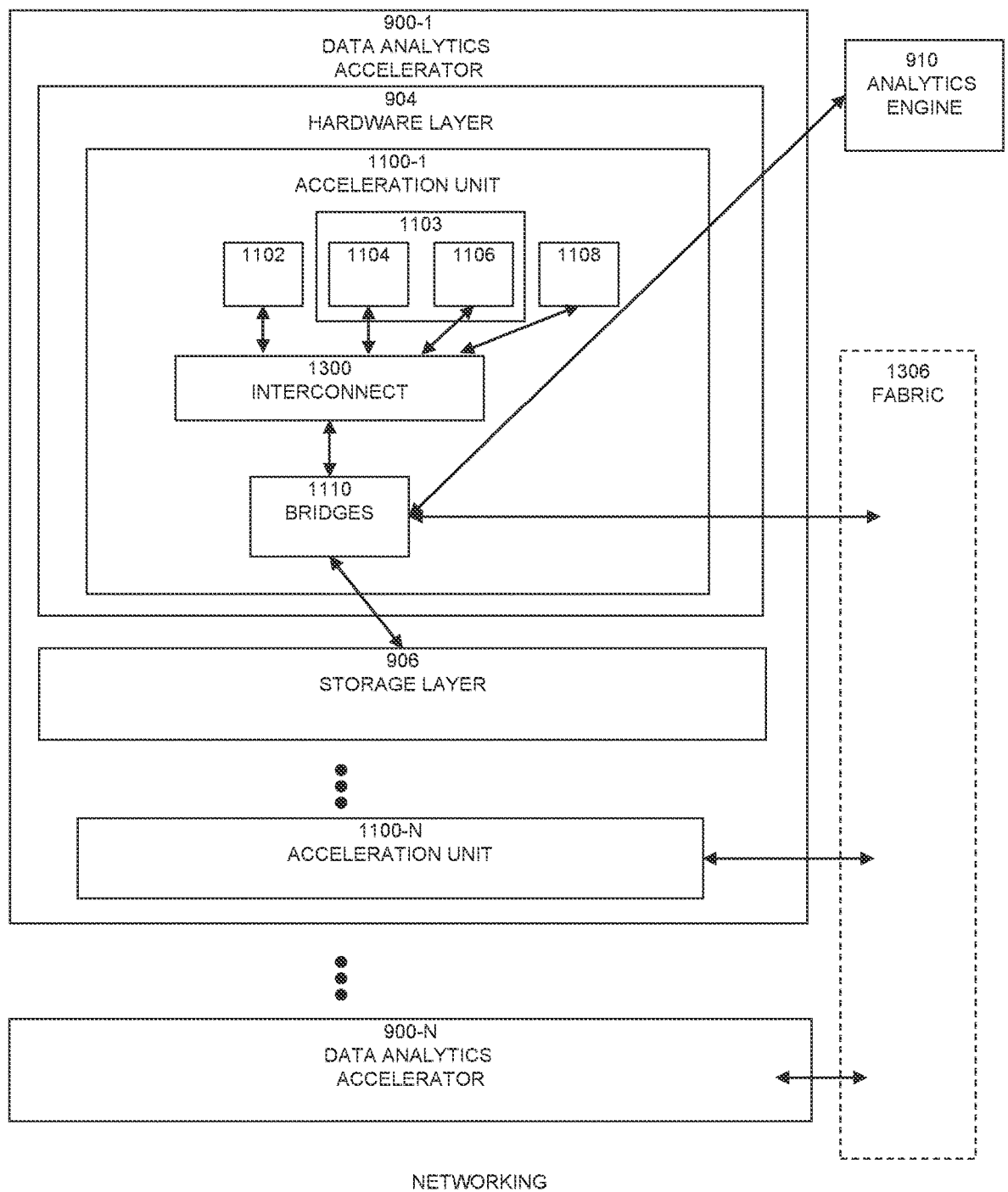
FIG. 13 is an example of networking for a data analytics accelerator.

FIG. 13 is an example of networking for the data analytics accelerator. An interconnect 1300 may include an element deployed within each of the acceleration units 1100. The interconnect 1300 may be operationally connected to elements within the acceleration unit 1100, providing communications within the acceleration unit 1100 between elements. In FIG. 13, exemplary elements (1102, 1104, 1106, 1108, 1110) are shown connected to the interconnect 1300. The interconnect 1300 may be implemented using one or more sub-connection systems using one or more of a variety of networking connections and protocols between two or more of the elements, including, but not limited to, dedicated circuits and PCI switching. The interconnect 1300 may facilitate alternative and additional connections feed forward, and feedback between elements, including but not limited to looping, multi-pass processing, and bypassing one or more elements. The interconnect can be configured for communication of data, signaling, and other information.

Bridges 1110 may be deployed and configured to provide connectivity from the acceleration unit 1100-1 (from the interconnect 1300) to external layers and elements. For example, connectivity may be provided as described above via the memory bridge 1114 with the storage layer 906, via the fabric bridge 1116 with the fabric 1306, and via the compute bridge 1118 with the external data storage 920 and the analytics engine 910. Other bridges (not shown) may include NVME, PCIe, high-speed, low-speed, high-bandwidth, low-bandwidth, and so forth. The fabric 1306 may provide connectivity internal to the data analytics accelerator 900-1 and, for example, between layers like hardware 904 and storage 906, and between acceleration units, for example between a first acceleration unit 1100-1 to additional acceleration units 1100-N. The fabric 1306 may also provide external connectivity from the data analytics accelerator 900, for example between the first data analytics accelerator 900-1 to additional data analytics accelerators 900-N.

The data analytics accelerator 900 may use a columnar data structure. The columnar data structure can be provided as input and received as output from elements of the data analytics accelerator 900. In particular, elements of the acceleration units 1100 can be configured to receive input data in the columnar data structure format and generate output data in the columnar data structure format. For example, the selector module 1102 may generate output data in the columnar data structure format that is input by the FPE 1103. Similarly, the interconnect 1300 may receive and transfer columnar data between elements, and the fabric 1306 between acceleration units 1100 and accelerators 900.

Streaming processing avoids memory bounded operations which can limit communication bandwidth of memory mapped systems. The accelerator processing may include techniques such as columnar processing, that is, processing data while in columnar format to improve processing efficiency and reduce context switching as compared to row-based processing. The accelerator processing may also include techniques such as single instruction multiple data (SIMD) to apply the same processing on multiple data elements, increasing processing speed, facilitating "real-time" or "line-speed" processing of data. The fabric 1306 may facilitate large scale systems implementation.

Accelerator memory 1200, such as PIM 1202 and HBM 1206 may provide support for high bandwidth random access to memory. Partial processing may produce data output from the data analytics accelerator 900 that may be orders of magnitude less than the original data from storage 920. Thus, facilitating the completion of processing on analytics engine 910 or general-purpose compute with a significantly reduced data scale. Thus, computer performance is improved, for example, increasing processing speeds, decreasing latency, decreasing variation of latency, and reducing power consumption.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a join and group module configured to combine data from one or more third data sets into a combined data set; and a communications fabric configured to transfer data between any of the selector module, the filter and project module, and the join and group module. The modules may correspond to the modules discussed above in connection with, for example, FIGS. 8-13.

In some embodiments, the first set of data has a columnar structure. For example, the first set of data may include one or more data tables. In some embodiments, the second set of data has a columnar structure. For example, the second set of data may include one or more data tables. In some embodiments, the one or more third data sets have a columnar structure. For example, the one or more data sets may include one or more data tables.

In some embodiments, the second set of data includes the first subset. In some embodiments, the one or more third data sets include the updated second set of data. In some embodiments, the first subset includes a number of values equal to or less than the number of values in the first set of data.

In some embodiments, the one more third data sets include structured data. For example, the structured data may include table data in column and row format. In some embodiments, the one or more third data sets include one or more tables and the combined data set includes at least one table based on combining columns from the one or more tables. In some embodiments, the one or more third data sets include one or more tables, and the combined data set includes at least one table based on combining rows from the one or more tables.

In some embodiments, the selection indicator is based on a previous filter value. In some embodiments, the selection indicator may specify a memory address associated with at least a portion of the first set of data. In some embodiments, the selector module is configured to input the first set of data as a block of data in parallel and use SIMD processing of the block of data to generate the first subset.

In some embodiments, the filter and project module includes at least one function configured to modify the second set of data. In some embodiments, the filter and projection module is configured to input the second set of data as a block of data in parallel and execute a SIMD processing function of the block of data to generate the second set of data.

In some embodiments, the join and group module is configured to combine columns from one or more tables. In some embodiments, the join and group module is configured to combine rows from one or more tables. In some embodiments, the modules are configured for line rate processing.

In some embodiments, the communications fabric is configured to transfer data by streaming the data between modules. Streaming (or stream processing or distributed stream processing) of data may facilitate parallel processing of data transferred to/from any of the modules discussed herein.

In some embodiments, the programmable data analytics processor is configured to perform at least one of SIMD processing, context switching, and streaming processing. Context switching may include switching from one thread to another thread and may include storing the context of the current thread and restoring the context of another thread.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a filter and project module configured to input a second set of data and, based on a function, output an updated second set of data; a communications fabric configured to transfer data between any of the modules. The modules may correspond to the modules discussed above in connection with, for example, FIGS. 8-13.

Consistent with the examples described in this disclosure, in an embodiment, a system includes a hardware based, programmable data analytics processor configured to reside between a data storage unit and one or more hosts, wherein the programmable data analytics processor includes: a selector module configured to input a first set of data and, based on a selection indicator, output a first subset of the first set of data; a join and group module configured to combine data from one or more third data sets into a combined data set; and a communications fabric configured to transfer data between any of the modules. The modules may correspond to the modules discussed above in connection with, for example, FIGS. 8-13.

Consistent with the examples described in this disclosure, in an embodiment, a system includes a hardware based, programmable data analytics processor configured to reside between a data storage unit and one or more hosts, wherein the programmable data analytics processor includes: a filter and project module configured to input a second set of data and, based on a function, output an updated second set of data; a join and group module configured to combine data from one or more third data sets into a combined data set; and a communications fabric configured to transfer data between any of the modules. The modules may correspond to the modules discussed above in connection with, for example, FIGS. 8-13.

Data Analytics Architecture for Quick-In-Memory Computation

In-memory computation or processing refers to the processing of data within a storage memory, such as addressable memory, for example, random access memory (RAM). Data are accessed much more quickly when stored in RAM and, accordingly, this approach provides faster data access and processing speeds as compared to the relatively slower data access relying on data transferred from a computer's memory, making it an ideal choice for applications that rely on real-time data processing or analysis. In-memory computing may be used for a variety of tasks, including data analysis, machine learning and high-performance computing. Additionally, in-memory computation may be particularly useful for applications that need to process large amounts of data quickly, such as artificial intelligence, scientific simulations, and data analytics.

In-memory computation may take the form of a middleware or intermediary hardware enabling data to be stored in RAM and processed without the need to transfer the data from memory to an external processor. For example, a computer may filter a large amount of data stored in a database by using an intermediary between the database and the computer to transfer the required data to an internal RAM, perform some operations on the data, and transfer the results to the computer. This process is faster than waiting for the data to be transferred by a normal bus and processing the data in the computer as the size of the results transferred by the device is reduced. In addition, if the computer performs an additional operation on the same data, there is no need to query the database again, which further reduces the processing time. Therefore, by providing additional pieces of processing logic to a RAM unit, quick-in-memory computation may be performed. In-memory computing may improve operational efficiency and reduce costs, qualities that are particularly appealing to entities that have moved to big data platforms.

Figure 14:
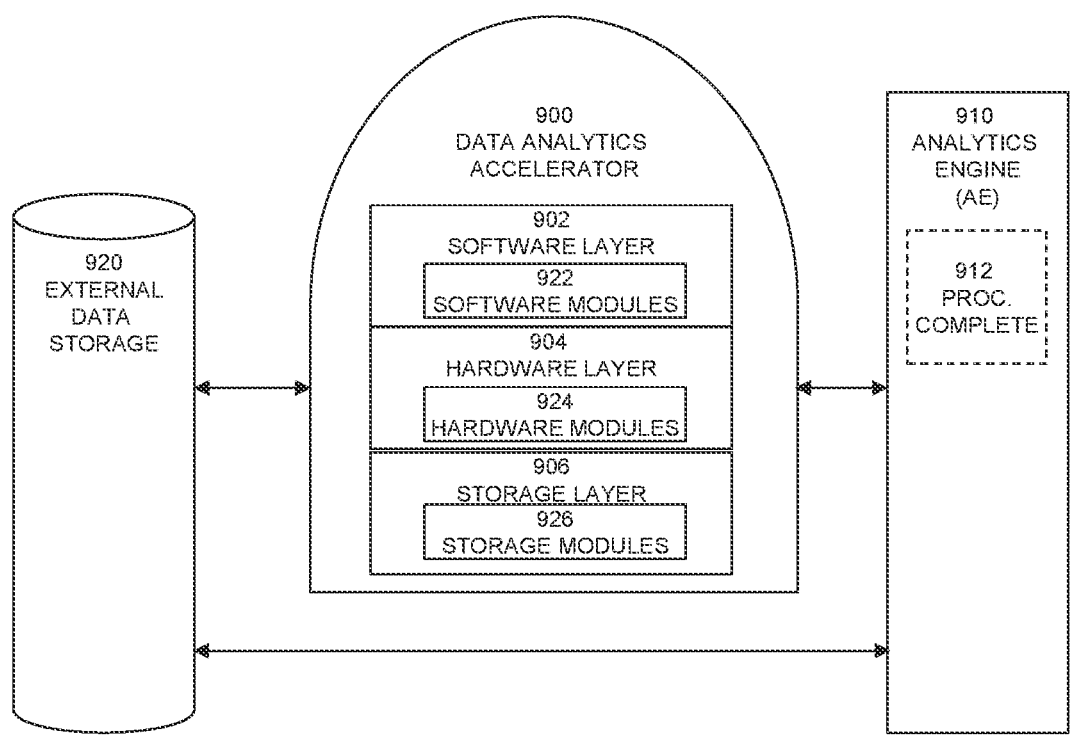
FIG. 14 is an example of a data analytics architecture, consistent with the disclosed embodiments.

FIG. 14 is an example of a data analytics architecture, consistent with the disclosed embodiments. Acceleration, such as by the data analytics accelerator 900, may be done at least in part by applying innovative operations between the external data storage 920 and the analytics engine 910 (e.g., a CPU of a general-purpose computer), optionally followed by completion processing 912. A quick in-memory computation module enables efficient operations and may correspondingly speed up various processes. For example, a quick-in-memory module may reduce (for example, by several orders of magnitude) the amount of data which is transferred from the external database 920 to the analytics engine 910, by acting as an intermediary and performing processing operations on data from the external data base 920 and sending only the result to the analytics engine 910. The quick in-memory computation module may be implemented as a portion of one or more of the hardware modules 924 in the hardware layer 904. Common computing models may involve extracting data from disk, transferring it to the processor, performing calculations, and then storing the results on disk. This process can be time consuming and resource intensive, especially when dealing with large data sets or complex analytical tasks. Current embodiments improve the functioning of computational devices, reducing power consumption (for example, by not needing to transfer data from memory to an external processor), decreasing processing time, and increasing efficiency.

Figure 15:
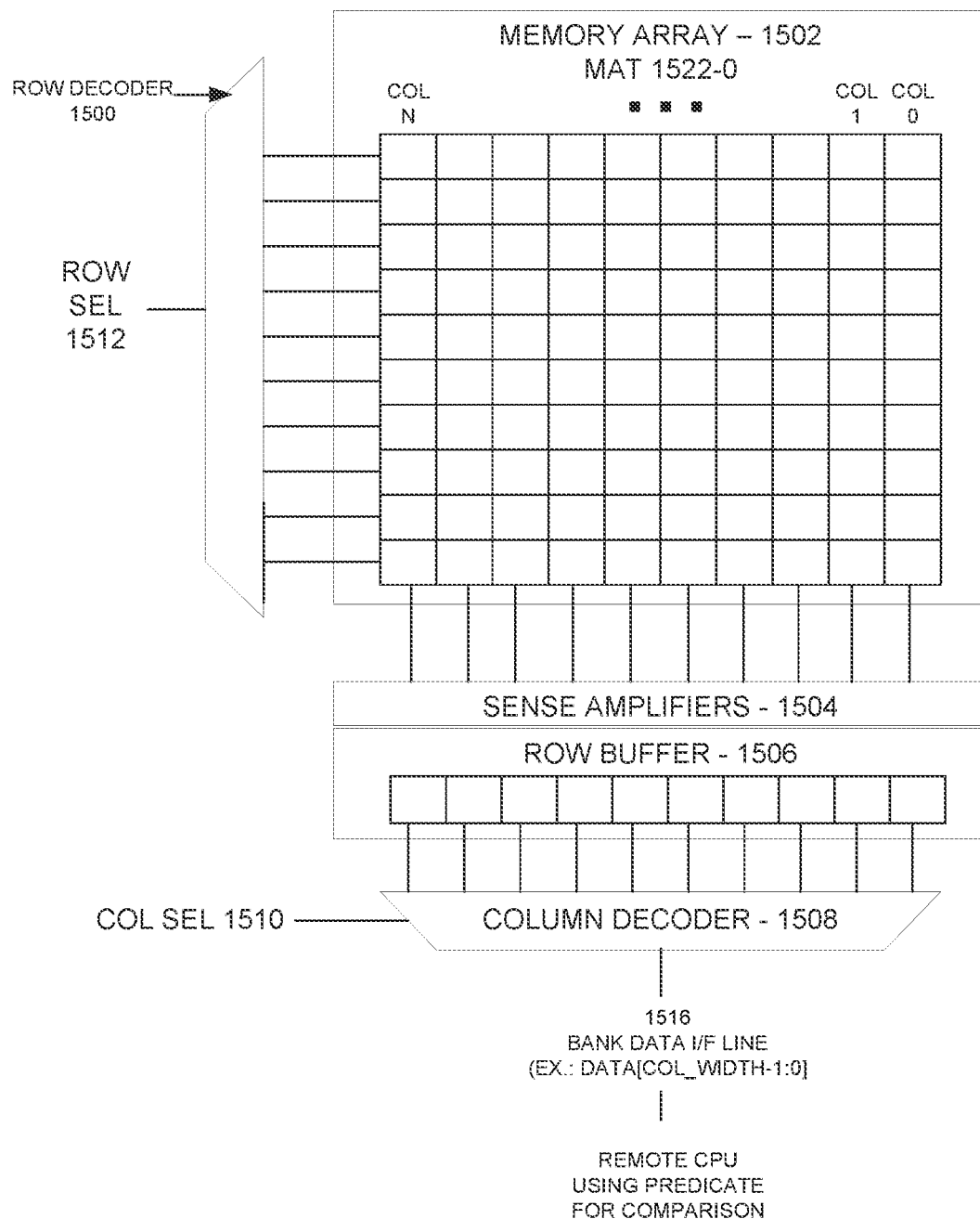
FIG. 15 is an example of a Dynamic-Random Access Memory (DRAM) structure.

FIG. 15 is an example of a DRAM (dynamic random-access memory) bank structure. A DRAM bank structure may include the following elements: Row decoder 1500; Bit cells array/memory array/processing memory array 1502; Sense amplifiers 1504; Row buffer 1506, configured to store the last row used; and Column decoder 1508 with a bank data interface (I/F) 1516.

In the present non-limiting example, memory array 1502 is drawn showing a single mat 1522-0 of bit cells. For the purposes of this description, a mat having 32000 (32 K) rows (pages), each row having 128 columns (N=127) and each column having a 64 bits-width is used as an example. To read the memory contents (bit cells of memory array 1502), the following steps may occur: 1) Pre-charging the bit lines; 2) Activating the required row based on the row selection signal 1512— row is latched inside the row buffer; and 3) Reading the required column using the column decoder from the row buffer.

Column data (rows from pages) may be connected to a column decoder 1508 that selects which row to output (on bank data OF line 1516). In the current example, 64 bits from each of the 128 columns are connected to respective inputs of the column decoder 1508 and, based on the column selection signal 1510, one column from the inputs is output on bank data I/F line 1516. In the current example, column decoder 1508 has 128 inputs of 64 bits each and outputs an output of 64 bits on the OF line 1516.

Under certain circumstances, data stored in a memory may need to be filtered. Processing, including filtering, includes reading data from memory, transferring the data from memory to a processor, and then the processor performing a logical test such as filtering, for example, to produce an output such as a bit vector. Filtering may be based on a predicate, such as an expression (e.g., an instantiation) of one or more variables defined on a particular domain. In the current non-limiting example, the variables may be expressed as an array of ones and zeros. One way of filtering is to obtain a bit vector where, for example, 1 means that the data in the memory cell matches a particular predicate and 0 means that the data in the memory cell does not match the predicate. To perform the filtering the following procedure may be followed:

```
For r in rows:
    For c in cols:
        return (mem_array[r, c] == <predicate>)
```

Example Method:
Predicate: 64'h000 . . . 0cafe
Memory Content:

| ROW | COLN | . . . | COL1 | COL0 |
|---|---|---|---|---|
| 0 | 64'h000 . . . 0beef | | 64'h000 . . . 0cafe | 64'h000 . . . 0cafe |
| 1 | 64'h000 . . . 0cafe | | 64'h000 . . . 0cafe | 64'h000 . . . 0beef |

Expected Result:
  Row0: [0, . . . , 1,1]
  Row1: [1, . . . , 1,0]
  Given timing numbers for a DDR4-2400 device:
  Rows in bank=32 K
  Columns in bank=128
  Activation+read to pre-charge delay+pre-charge duration=48 ns
  Column to column delay long (tccd_1)=3.75 ns to 6.66 ns
  Column size=64 bit The minimum estimated time to generate a bit vector for a single row is: (Activation+read to pre-charge delay+pre-charge duration)+COLS*tccd_1=48 ns+128*3.75 ns=528 ns, plus latency time to transfer the data from memory to a processor, plus time for the processor to execute a logical test to produce an output bit vector.

Quick-In-Memory Computation Apparatus

Filtering is one example of a function to be performed on a piece of data extracted from a memory such as the memory array 1502. Other functions may be more complex and take more time to process.

Figure 16:
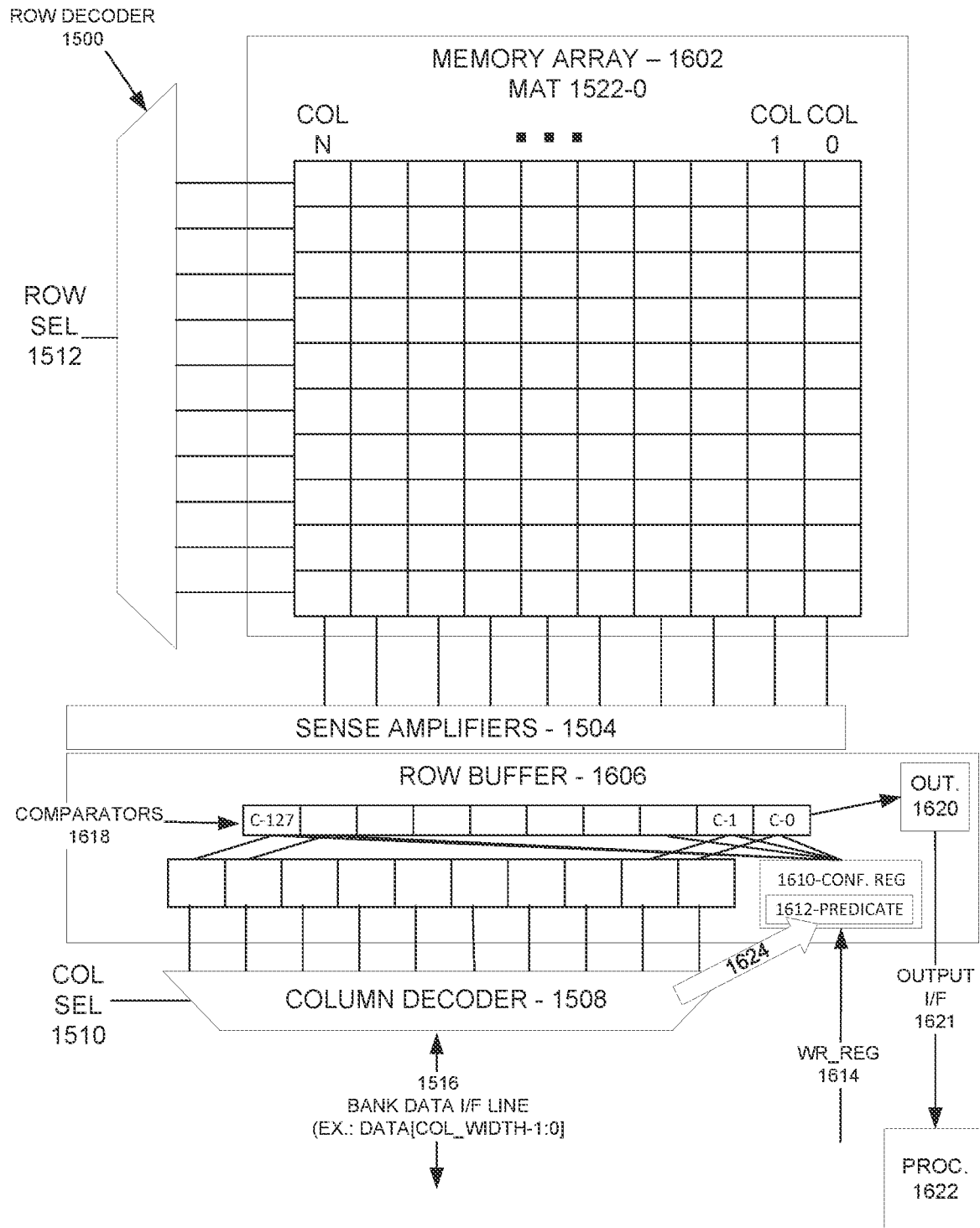
FIG. 16 is an example of an apparatus for performing quick-in-memory computation, consistent with the disclosed embodiments.

FIG. 16 is an example of an apparatus performing quick-in-memory computation, consistent with the disclosed embodiments. In some embodiments, the system may comprise a memory array 1602 and at least one row buffer 1606 associated with memory array 1602, wherein the at least one row buffer 1606 is configured to latch at least a portion of a row of memory array 1602. In the context of this disclosure, a row buffer may refer to any hardware device capable of holding the data, or a copy of the data, of an activated row. As a result, data that was transferred from an activated row to row buffer 1606 was latched in the row buffer 1606. In the system and example illustrated in FIG. 16, an entire row of memory array 1602 is latched inside row buffer 1606 when the row is read from memory array 1602. In some embodiments, memory array 1602 may be a DRAM memory, as shown in FIG. 16.

By adding a relatively small number of cells (e.g., relative to the large number of cells used for memory and memory control) as additional logic within memory array 1602, the speed of at least one function may be increased and correspondingly reduce the execution time of the implemented function(s) without affecting the operations of the memory array 1602. In some embodiments, the at least one function includes at least a comparison function. In some other embodiments, the at least one function may include includes at least one of a comparison function, a summing function, a calculating parity function, or an averaging function. A comparison function may refer to a function used to compare data elements and determine matches and scores, the result of which may be a logical value, e.g., "1==2" produces "0". Summing ("SUM") and averaging ("AVG") functions may refer to functions that add values or calculate the average value of a plurality of data pieces, e.g. "SUM (4,6,22)=32", AVG("3,6,9")=6. A parity function may refer to a function whose output is a logical one if and only if a representation of the input has an odd number of ones.

In the following description, comparison functions are discussed in further detail. In accordance with some embodiments, the additional logic to memory array 1602 may include one or more of the elements described below:

A configurable register 1610 may be configured to store a predicate 1612 comprising one or more bits. In the context of the present disclosure, a configurable register may refer to any memory hardware capable of accepting, storing, and transferring a data element. In some embodiments, configurable register 1610 may be included in the at least one row buffer 1606 as shown in FIG. 16. This configuration is not limiting, and the configurable register may be in another location, and still be associated with at least one row buffer 1606. For example, in some other embodiments, configurable register 1610 may be external to at least one row buffer 1606. In some embodiments, configurable register 1610 may be further configured to receive predicate 1612 from a memory array data interface, such as bank data I/F 1516. In the context of the present disclosure, a predicate may refer to an assertion including one or more variables, for example, predicate 1612 may correspond, in some embodiments to an instantiation of one or more variables defined on a specific domain.

A control bit interface (I/F) (WR_REG, 1614) may be configured to latch predicate 1612 in configurable register 1610. For example, as shown in FIG. 16, control bit interface 1614 may be configured to latch predicate 1612 from (1624) the memory array interface (bank data I/F 1516) to the configurable register 1610.

One or more comparators 1618 may be configured to execute at least one function to generate an output 1620, wherein the at least one function is configured to operate on the portion of the row latched in the at least one row buffer 1606, and wherein the at least one function is also configured to operate on the predicate 1612 latched in configurable register 1610. In the context of the present disclosure, a comparator may refer to any combination of logic gates used to compare two or more binary inputs. In some embodiments, the one or more comparators 1618 may be included in the at least one row buffer 1606. For example, in the apparatus shown in FIG. 16, 128 comparators (C-0 through C-127), one for each column, perform a comparison function on a portion of row latched in row buffer 1606 and on predicate 1612 latched in configurable register 1610 and output bit vector 1620. Example implementations of comparators may include XOR gates between each column bit in row buffer 1606 and the corresponding bit in predicate register 1610, with a NOR gate on the XOR results. In some other embodiments, the one or more comparators 1618 may be external to the at least one row buffer 1606. Additionally, in some embodiments, each of the plurality of comparators may be further configured to input a column latched in the at least one row buffer 1606.

An output interface 1621 may be configured to transfer the output 1620 generated by the plurality of comparators 1618 to at least one processor 1622. In some embodiments, the output interface 1621 may include a bit vector interface and the output 1620 generated by the one or more comparators may comprise a bit vector. The size of the output 1620 (such as a length of a bit vector) may be related to the number of columns and the column width. For example, using the current exemplary numbers, the 128 comparators 1618 may each produce a single bit, thus the output 1620 may be a 128 bit long bit vector. Output interface 1621 connects the apparatus to an external module such as a processor 1622 to transfer at least a portion of the output 1620. For example, the output interface 1621 may transfer one, a portion, or all of the exemplary 128 bits of the bit vector to the processor 1622.

With this additional logic, output 1620 may be generated immediately after the DRAM row (page) is latched in the row buffer 1606.

Alternatively, in some embodiments, the apparatus may comprise at least one row-buffer processing module associated with the at least one row buffer 1606, wherein the at least one row-buffer processing module is configured to execute at least one function to generate an output 1620, and the at least one function is configured to operate on at least a portion of the portion of the row latched in the at least one row buffer 1606. Additionally, at least one of the configurable register 1610, the control bit interface (WR_REG, 1614), the plurality of comparators 1618, the output interface 1621, or a combination thereof may be included in the row-buffer processing module. Further, in some embodiments, the row-buffer processing module may be included in or external to the at least one row buffer 1606. Alternatively, in some other embodiments, the row-buffer processing module may be included in or external to memory array 1602.

In the example illustrated in FIG. 16, processor 1622 (for example, a processing subunit 612) may scan the DRAM bank (memory array 1602) and generate an output 1620 for each row by activating and pre-charging the rows—i.e., without needing to read the columns one by one. Using DDR4-2400 DRAM numbers, an estimated time for the apparatus illustrated in FIG. 16 to generate a bit vector for a single row is 48 ns (possibly plus time for the comparators to execute). In this example, the present embodiment provides an 11:1 performance increase over the standard comparison mode described above, which takes 528 ns. In some embodiments, the at least one processor may be included in the apparatus. In some other embodiments, the at least one processor may be external to the apparatus.

In some embodiments, the apparatus may further include a plurality of sense amplifiers 1504. In the context of this disclosure, a sense amplifier may refer to any circuitry configured to sense and amplify low (difference) voltage signals associated with the portion of a row of memory array 1602 before being latched to the at least one row buffer 1606 and optionally refresh the portion of the row of memory array 1602. Additionally, or alternatively, the apparatus may further include a row decoder 1500 configured to select a row on the memory array 1502.

In some embodiments, the apparatus may further include a column decoder 1508 associated with the at least one row buffer 1606. In the context of this disclosure, a decoder may refer to any circuitry configured to select a particular memory location of a memory array based on an address or selection signal. For example, as illustrated in FIG. 16 column decoder 1508 is associated with row buffer 1606. Column decoder 1508 may be configured to execute a variety of tasks. In some embodiments, column decoder 1508 may be configured to access a column of memory array 1602 based on the portion of the row latched in the at least one row buffer 1606. Additionally, in some other embodiments, column decoder 1508 may be further configured to output the column via a memory array data interface 1516. In the context of the present disclosure, a memory array interface means may refer to an interface, or part thereof, between a logic-integrated circuit and a memory-integrated circuit, such as an electrical bus or other similar information paths. For example, as illustrated in FIG. 16, column decoder 1508 is configured to output the column via bank data interface 1516. Alternatively, in some embodiments, the column decoder 1508 may be associated with a memory array data interface 1516, and the configurable register 1610 may be further configured to receive the predicate 1612 from the memory array data interface 1516. For example, as shown in FIG. 16, column decoder 1508 may be associated with bank data interface 1516 (e.g., a memory array data interface), and the configurable register 1610 may receive predicate 1612 via the bank data interface 1516 and optionally via the column decoder 1508.

In some embodiments, the apparatus may be an integrated circuit and optionally the memory array 1602, the at least one row buffer 1606, the configurable register 1610, the control bit interface 1614, the one or more comparators 1618, and the output interface 1621 may be included on a common substrate of the integrated circuit. For example, referring to FIG. 16, memory array 1602, row buffer 1606, configurable register 1610, control bit interface 1614, comparators 1618, and output interface 1621 may be integrated on a common substrate of an integrated circuit. In addition, in some other embodiments, the at least one processor 1622 may also be included on the common substrate. For example, with reference to FIG. 16, processor 1622 may be integrated on the common substrate. The above-mentioned implementations are not limiting, and other components may optionally be integrated on the common substrate, such as row decoder 1500, column decoder 1508, and/or sense amplifier 1504.

In the example shown in FIG. 16, there are 128 of the comparators 1618. Each of the comparators 1618 (shown as C-0 to C-N, where N is an integer designating a particular comparator, here equal to 127) may correspond to a pre-defined number of bits. The predefined number of bits may be, for example equal to the column width, in this case 64 bits wide. In this case, predicate 1612 includes comparing information (bits) for each of the pages (rows) and is 128 columns×64 bits=8192 bits wide. Each of the comparators (C-N) inputs a column (64 bits from a corresponding row in the memory array 1602 that is latched in the row buffer 1606) and outputs a single bit indicating a result of comparing each of the columns of the input row with a corresponding portion of the predicate 1612. Accordingly, in this case, output 1620 is a 128 bits wide bit vector.

In another example, instead of 128 comparators of 64 bits each, 256 comparators of 32 bits each can be used, and the output interface 1621 (which handles the output 1620) may be increased from 128 bits to 256 bits wide. In yet another example, data types that are smaller than the column size of the memory array, for example, two 32-bit integers stored together in a 64-bit column, may be compared by using two 32-bit comparators. Alternative embodiments may support other numbers and sizes of mats, columns, rows, comparators 1618, comparator widths, column decoder 1508 inputs and widths, column decoder 1508 outputs and widths, bank data OF line 1516 width, output 1620 width, etc. other than those used in the example shown in FIG. 16 or described above. In this case, as will be apparent to one skilled in the art, an adjustment may be made to the comparators and the interface.

In general, the number of comparators may be equal to NUM_OF_COLS*RESOLUTION, the comparator width is equal to COL_WIDTH/RESOLUTION, and the output interface width may be equal to NUM_OF_COLS*RESOLUTION, where RESOLUTION is the smallest amount of data that may be transferred.

Comparators 1618 may be implemented in different ways. For example, in the above example of expected row results, match comparators are used. In alternative embodiments, inequality comparators may be used, for example, to evaluate whether the row data is greater than (>), less than (<), or within a range of the given predicate. Comparators 1618 may be configured to implement the various types of comparisons.

Controllable Multiplexer

Figure 17:
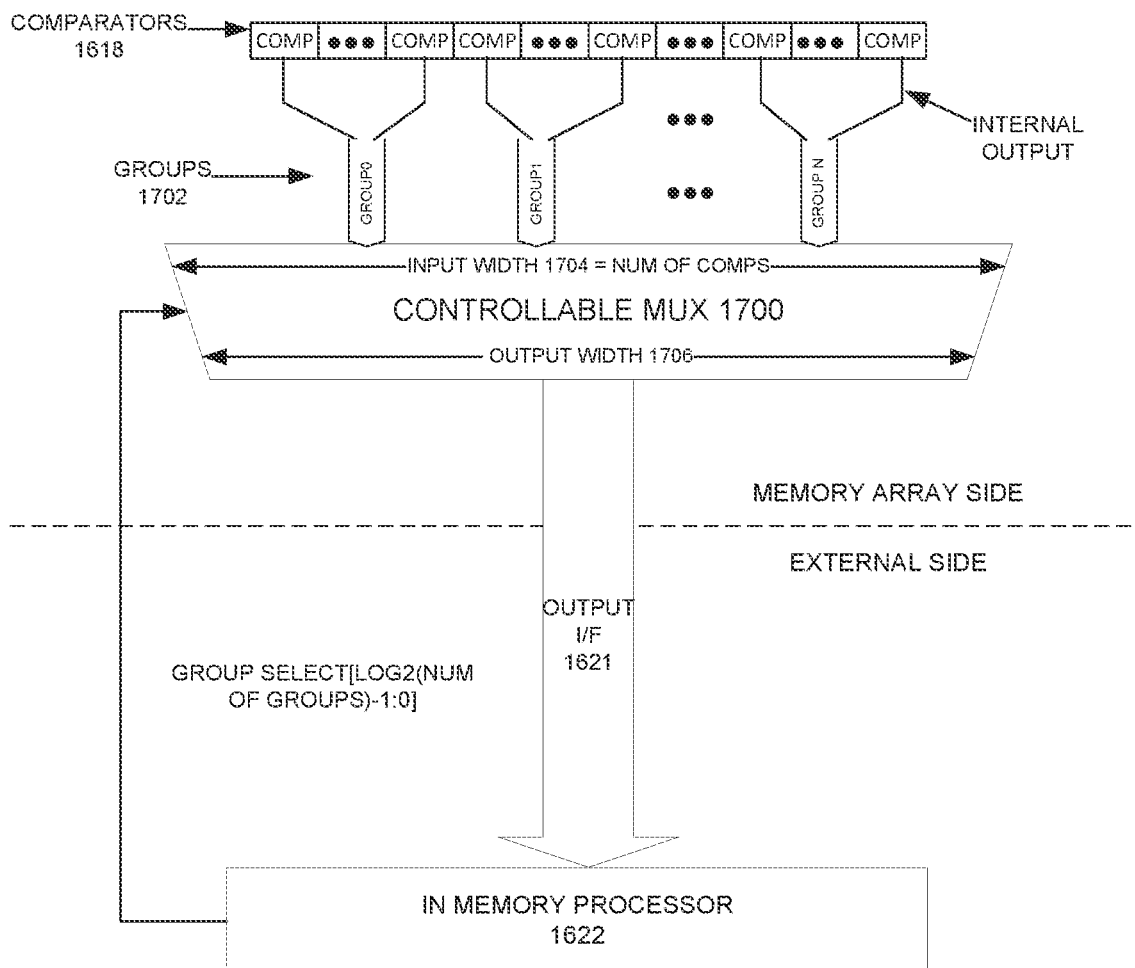
FIG. 17 is an example a controllable multiplexer, consistent with the disclosed embodiments.

FIG. 17 shows an example of a controllable mux. By adding a controllable mux 1700 to the output I/F 1621, the output I/F 1621 size may be reduced by cycling the output 1620 results (for example, reading MSBs (Most Significant Bits) in the first clock and LSBs (Least Significant Bits) in the second clock).

In some embodiments, the apparatus may further comprise a controllable multiplexer (mux) 1700 associated with output interface 1621. Additionally, in some other embodiments, controllable mux 1700 may be associated with the one or more comparators 1618. In the context of this disclosure, a multiplexer may refer to any circuitry or device configured to allow one or more input signals (analogue or digital) to travel together over a same communications path. Accordingly, controllable mux 1700 may be configured to: receive one or more inputs from the one or more comparators 1618, operate on the one or more inputs to generate one or more outputs, and provide the one or more outputs to the output interface 1621.

In some embodiments, controllable mux 1700 may include an input width 1704 and an output width 1706. Input width 1704 may correspond to a quantity of the one or more comparators, and output width 1706 may correspond to the quantity of the one or more comparators divided by a quantity of input groups 1702 of the one or more comparators. In the example shown in FIG. 17, comparators 1618 are divided into a number of groups 1702. Controllable mux 1700 has an input width 1704 and an output width 1706. Input width 1704 is equal to the number of comparators 1618, and output width 1706 equal to the number of comparators 1618 divided by the number of input groups 1702.

Alternative configurations are contemplated. The width of the data output bank data I/F 1516 may be the same as each column and in the present example is 64 bits. In an alternative embodiment, the bank data I/F 1516 may be used to output bit vector 1620, in which case the widths of the bank data I/F 1516 and the bit vector 1620 may match (be the same width, be the same number of bits), or a multiplexing scheme may be used if the width of the bit vector 1620 is greater than the width of the bank data I/F 1516. Based on this description, a person skilled in the art will be able to implement a suitable solution.

Memory Array with a Plurality of Memory Mats

Figure 18:
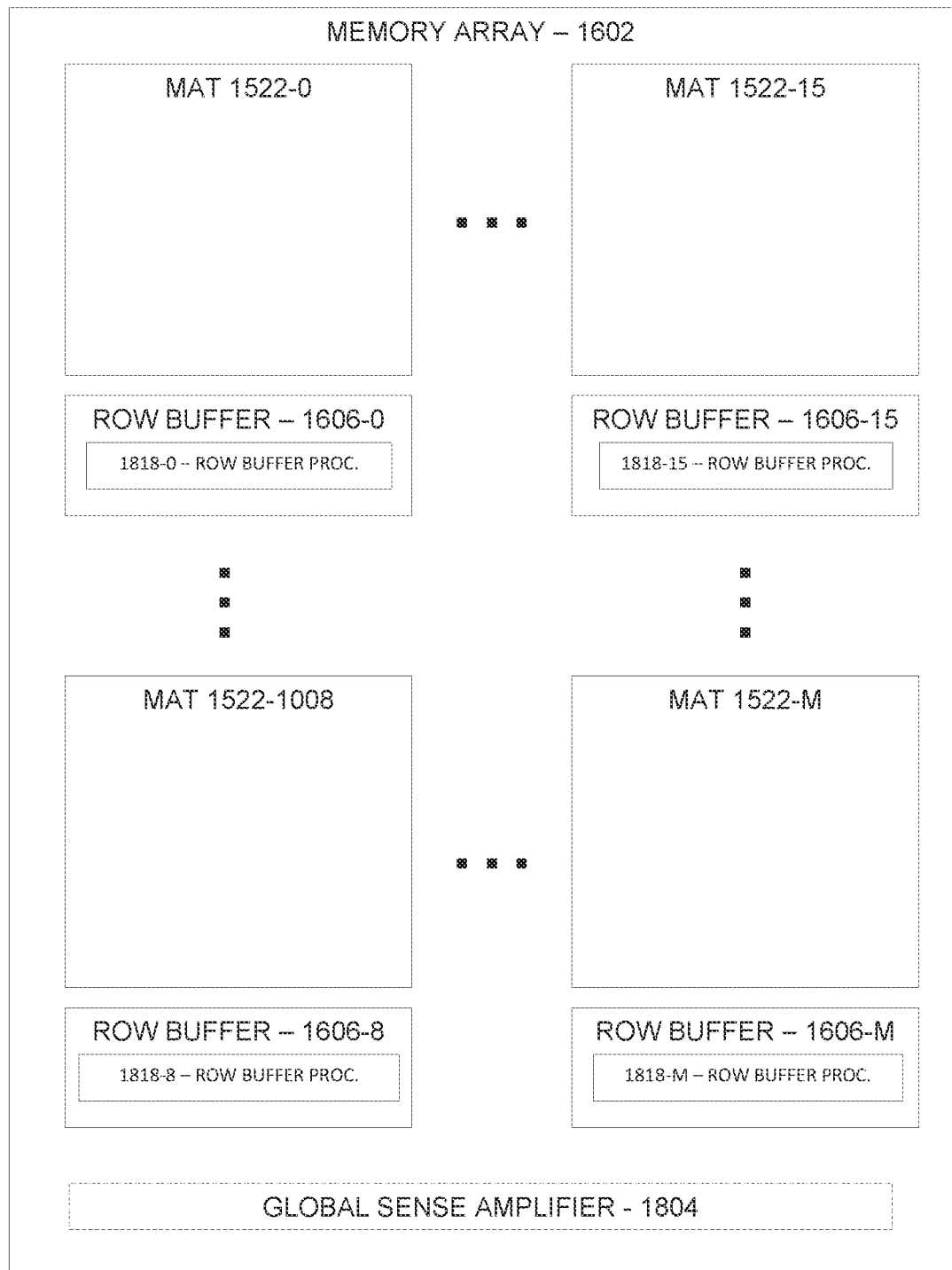
FIG. 18 is an example of an apparatus for performing quick-in-memory computation that includes a memory array including a plurality of memory mats, consistent with the disclosed embodiments.

FIG. 18 is an example of an apparatus performing quick-in-memory computation that includes a memory array including a plurality of memory mats 1522 (examples 1522-0, 1522-15, 1522-1008, 1522-M shown), where M is an integer designating a particular memory mat. In some embodiments, memory array 1602 may include a plurality of memory mats 1522. In the context of the present disclosure, a memory mat may refer to a two-dimensional memory sub-array included in a larger two- or three-dimensional array. Memory array 1602 is three-dimensional, i.e., three addresses/number are required to locate a storage location (M, row address and column address). An exemplary implementation may include 1024 memory mats in the memory array (M=1023). As described above, each memory mat may have 32 K rows of data, each row having 128 columns×64 bits=8192 bits. In an alternative implementation, each memory mat 1522 may have 512 rows of data, each row having 512 bits. Other implementations are possible.

Additionally, in some embodiments, the at least one row buffer may include a plurality of row buffers, and each of the plurality of memory mats is associated with a corresponding one of the plurality of row buffers. For example, as shown in FIG. 18, each memory mat 1522-M has a corresponding row buffer 1606-M. Although not represented in FIG. 18, for the sake of clarity, other elements such as a plurality of configurable resisters, a plurality of bit interface, a plurality of comparators, a plurality of output interface, or a plurality of local sense amplifiers may be similarly associated with each of the plurality of memory mats. Alternatively, in some other embodiments, wherein the at least one row buffer includes a plurality of row buffers, the at least one row-buffer processing module may include a plurality of row-buffer processing modules, and each of the plurality of row buffers may be associated with a corresponding one of the plurality of row-buffer processing modules. As illustrated in FIG. 18, each memory mat 1522-M has a corresponding row-buffer processing module 1818-M Optionally, in some embodiments, a memory array 1602 with a plurality of sub-memories (for example, the memory mats 1522) may include a global sense amplifier 1804. Global sense amplifier 1804 may be configured to perform functions similar to local sense amplifiers but across the plurality of mats 1522. For example, when a row is activated in any one of the plurality of mats 1522-M, row data are transferred in the corresponding row buffer 1606-M via global sense amplifier 1804. Alternatively, two levels of amplification (sense amplifier) may be implemented, one local to any memory mats and one global across the plurality of mats, optionally these two sense amplifiers may be of different type e.g., one voltage mode sense amplifier and the other current mode sense amplifier. Based on this description, one skilled in the art will be able to implement configurations for a variety of applications.

The row buffer processing module 1818 has been described above in the example of a comparator. This implementation is not limiting, and the row-buffer processing module may be configured to perform other functions, including but not limited to summation, parity calculation, averaging, and the like. Similarly, the row buffer processing module 1818 has been described above as being implemented as part of the row buffer 1606. This implementation is not limiting, and the row buffer processing module may be configured in various locations, including, but not limited to, internal to the row buffer, external to the row buffer 1606, internal to the memory array 1602, and in a location associated with each of the memory mats 1522-M.

In an embodiment, an apparatus comprises a memory array; at least one row buffer configured to latch at least a portion of a row of the memory array; a configurable register configured to store a predicate comprising one or more bits; a control bit interface configured to latch the predicate in the configurable register; one or more comparators configured to execute at least one function to generate an output, wherein the at least one function is configured to operate on the portion of the row latched in the at least one row buffer, and wherein the at least one function is also configured to operate on the predicate latched in the configurable register; and an output interface configured to transfer the output generated by the one or more comparators to at least one processor.

In some embodiments, the memory array includes a plurality of memory mats. In some embodiments, the at least one row buffer includes a plurality of row buffers, and each of the plurality of memory mats is associated with a corresponding one of the plurality of row buffers. In some embodiments, the apparatus further comprises a plurality of local sense amplifiers, wherein each of the plurality of local sense amplifiers is associated with a corresponding one of the plurality of memory mats.

In some embodiments, the configurable register is included in the at least one row buffer. In some embodiments, the configurable register is external to the at least one row buffer. In some embodiments, the configurable register is further configured to receive the predicate from a memory array data interface. In some embodiments, the one or more comparators is included in the at least one row buffer. In some embodiments, the one or more comparators is external to the at least one row buffer. In some embodiments, each of the one or more comparators are further configured to input a column latched in the at least one row buffer. In some embodiments, the output interface includes a bit vector interface, and the output generated by the one or more comparators comprises a bit vector. In some embodiments, the at least one processor is included in the apparatus. In some embodiments, the at least one processor is external to the apparatus. In some embodiments, the predicate is an instantiation of one or more variables defined on a specific domain.

In some embodiments, the apparatus further comprises a global sense amplifier associated with the memory array. In some embodiments, the apparatus further comprises a column decoder associated with the at least one row buffer. In some embodiments, the column decoder is configured to access a column of the memory array based on the portion of the row latched in the at least one row buffer. In some embodiments, the column decoder is further configured to output the column via a memory array data interface. In some embodiments, the column decoder is associated with a memory array data interface, and the configurable register is further configured to receive the predicate from the memory array data interface.

In some embodiments, the at least one function includes at least a comparison function. In some embodiments, the at least one function includes at least one of a comparison function, a summing function, a calculating parity function, or an averaging function.

In some embodiments, the apparatus further comprises a controllable multiplexer associated with the output interface. In some embodiments, the controllable multiplexer is associated with the one or more comparators. In some embodiments, the controllable multiplexer includes an input width and an output width, and wherein the input width corresponds to a quantity of the one or more comparators, and the output width corresponds to the quantity of the one or more comparators divided by a quantity of input groups of the one or more comparators. In some embodiments, the controllable multiplexer is configured to: receive one or more inputs from the one or more comparators, operate on the one or more inputs to generate one or more outputs, and provide the one or more outputs to the output interface.

In some embodiments, the apparatus is an integrated circuit. In some embodiments, the memory array, the at least one row buffer, the configurable register, the control bit interface, the one or more comparators, and the output interface are included on a common substrate of the integrated circuit. In some embodiments, the at least one processor is included on the common substrate.

In an embodiment, an apparatus comprises a memory array; at least one row buffer associated with the memory array, wherein the row buffer is configured to latch at least a portion of a row of the memory array; and at least one row-buffer processing module associated with the at least one row buffer, wherein the at least one row-buffer processing module is configured to execute at least one function to generate an output, and the at least one function is configured to operate on the portion of the row latched in the at least one row buffer.

In some embodiments, the at least one row-buffer processing module includes a configurable register configured to store a predicate comprising one or more bits. In some embodiments, the at least one row-buffer processing module further includes a control bit interface configured to latch the predicate in the configurable register. In some embodiments, the at least one row-buffer processing module further includes one or more comparators configured to execute the at least one function, and wherein the at least one function is further configured to operate on the predicate latched in the configurable register. In some embodiments, the at least one row-buffer processing module further includes an output interface configured to transfer the output to at least one processor.

In some embodiments, the apparatus further comprises a controllable multiplexer associated with the output interface. In some embodiments, the at least one row-buffer processing module further includes one or more comparators configured to execute the at least one function, and wherein the at least one function is further configured to operate on the predicate latched in the configurable register and the controllable multiplexer is associated with the one or more comparators. In some embodiments, the controllable multiplexer includes an input width and an output width, and wherein the input width corresponds to a quantity of the one or more comparators, and the output width corresponds to the quantity of the one or more comparators divided by a quantity of input groups of the one or more comparators. In some embodiments, the controllable multiplexer is configured to: receive one or more inputs from the one or more comparators, operate on the one or more inputs to generate one or more outputs, and provide the one or more outputs to the output interface.

In some embodiments, the at least one processor is included in the apparatus. In some embodiments, the at least one processor is external to the apparatus. In some embodiments, the memory array includes a plurality of memory mats. In some embodiments, the at least one row buffer includes a plurality of row buffers, and each of the plurality of memory mats is associated with a corresponding one of the plurality of row buffers.

In some embodiments, the apparatus further comprises a plurality of local sense amplifiers, wherein each of the plurality of local sense amplifiers is associated with a corresponding one of the plurality of memory mats.

In some embodiments, the at least one row buffer includes a plurality of row buffers and the at least one row-buffer processing module includes a plurality of row-buffer processing modules, and wherein each of the plurality of row buffers is associated with a corresponding one of the plurality of row-buffer processing modules.

In some embodiments, the memory array includes a global sense amplifier associated with the memory array.

In some embodiments, the at least one function includes at least a comparison function.

In some embodiments, the at least one function includes at least one of a comparison function, a summing function, a calculating parity function, or an averaging function.

In some embodiments, the row-buffer processing module is included in the at least one row buffer. In some embodiments, the row-buffer processing module is external to the at least one row buffer. In some embodiments, the row-buffer processing module is included in the memory array. In some embodiments, the row-buffer processing module is external to the memory array.

In some embodiments, the apparatus further comprises a column decoder. In some embodiments, the column decoder is configured to access a column of the memory array based on the portion of the row latched in the at least one row buffer. In some embodiments, the column decoder is further configured to output the column via a memory array data interface.

Data Analytics Architecture for Adaptive Mapping

Adaptive mapping for memory storage refers to techniques used to efficiently organize and map data to memory resources. It may be particularly relevant in situations where there are multiple memory modules or hierarchies. One of the goals of adaptive memory mapping is to minimize access latency and maximize memory bandwidth by optimizing the placement of data in memory by considering factors such as data locality, access patterns, and memory hierarchies. Different adaptive mapping strategies exist, among which include allocating data to a random storage location, (e.g., randomly assigning data to storage locations without considering any criteria or optimization goals). Randomly assigning data to different storage locations may allow the computing workload to be evenly distributed throughout the system, which may improve the operation of computer systems by reducing processing time, increasing efficiency, and saving energy.

Figures 19, 20, 21:
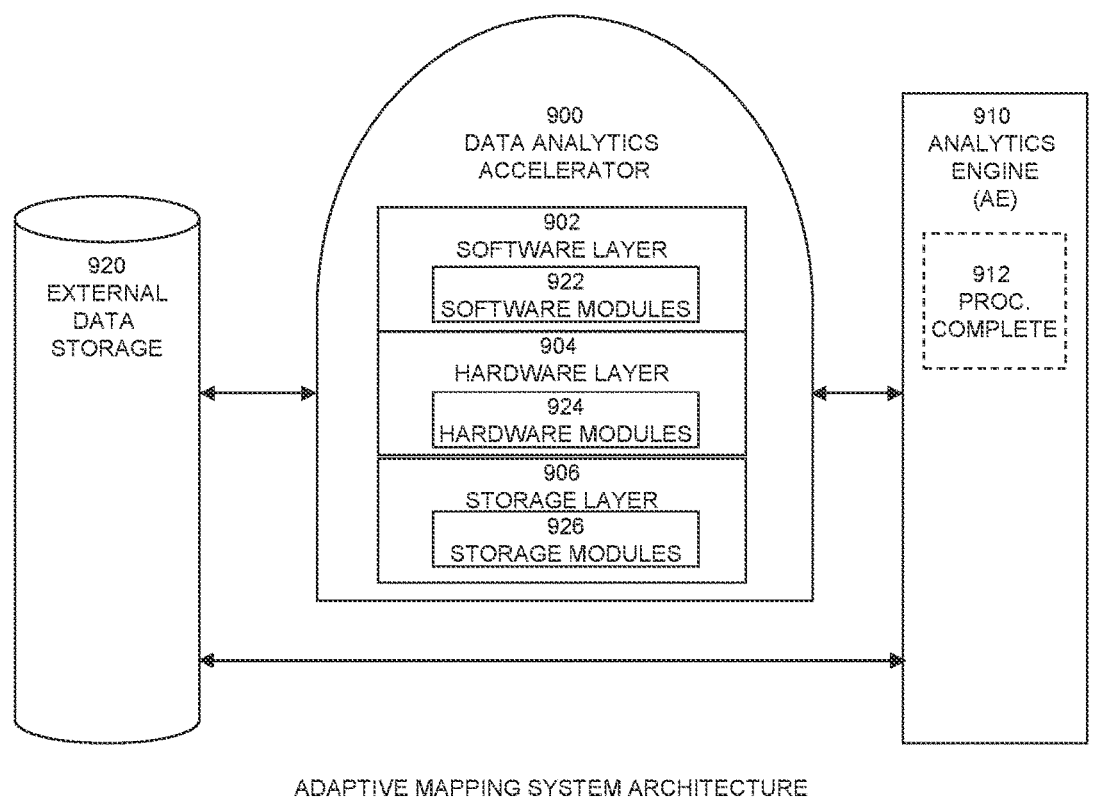
FIG. 19 is a high-level example of a data analytics architecture, consistent with the disclosed embodiments.
FIG. 20 is an example of a desired range of numbers consistent with the disclosed embodiments.
FIG. 21 is an example of bias occurring in generating random numbers.

FIG. 19 is a high-level example of a data analytics architecture including an adaptive mapping system architecture. The adaptive mapping may be implemented as a portion of one or more of the software layer 902 software modules 922 and hardware layer 904 hardware modules 924 interacting with the storage layer 906 and the storage modules 926. Implementations may be particularly useful in the hardware layer 904. In accordance with the disclosed embodiments, values may be processed in the hardware layer 904 using hardware modules 924 and optionally using one or more software modules 922. Values may be from, and stored in, locations including, for example, the external data storage 920, the accelerator memory 1200 shown in FIG. 12, the analytics engine 910, or a general-purpose computer. The values may be distributed to an arbitrary sized storage at each of an arbitrary number of locations. In the context of this disclosure, the term "value" refers to pieces of data to be stored.

Modulo Bias Problem

In order to randomly assign values to an arbitrary number of locations of an arbitrary-sized storage, a process of generating random numbers is needed. In the context of the present disclosure, a random number refers to a number generated using a mathematical algorithm that selects a number from a range of numbers with a given distribution. If that distribution is uniform, a true random number is generated.

FIG. 20 illustrates an example of a desired range of numbers (integers) {0 . . . 4} to be generated randomly and FIG. 21 illustrates an example of bias occurring in generating random numbers. In these examples, n=5 numbers are desired. One of the methods used by computers to generate a random number in a desired range of n numbers consists in using a certain minimum number of bits equal to $\lfloor \log_2 n \rfloor + 1$ (binary logarithm of n). In the illustrated examples 3 bits=8 numbers are necessary, the range of all possible numbers generated by these 3 bits is {0 . . . 7}. The process used to fold the range of all possible numbers into the desired range of numbers is to calculate the modulo n of all possible numbers in the desired range of numbers. In the example of FIG. 21, 0=0 mod 5 and 5 mod 5, 1=1 mod 5 and 6 mod 5, 2=2 mod 5 and 7 mod 5, 3=3 mod 5 and 4=4 mod 5. This process results in the more frequent appearance (higher number of occurrences) of lower numbers {0 . . . 2} than higher numbers {3 . . . 4}. In other words, the probability of obtaining lower numbers {0 . . . 2} is greater than the probability of obtaining higher numbers {3 . . . 4}. Therefore, when using this process, the probability distribution of the desired number range is not uniform. The generation of a number using this process is therefore not truly random, as lower numbers are more likely to be generated. This bias towards lower numbers is called modulo bias. For a true random number generator in a desired range, it is expected that the probability distribution is uniform. Different measures or variability criteria may be used to characterize the variability of a range of numbers and possibly estimate the distance between the distribution of that range of numbers and a corresponding uniform distribution. An example of a variability criterion might include calculating the percentage change between the lowest and highest probability of obtaining a number in a range. Using this definition, a uniform distribution would have a variability criterion equal to 0%. For the range of numbers illustrated in FIG. 21, the variability criterion is equal to 100%, i.e. the probability of obtaining higher numbers {3 . . . 4} would need to increase by 100% to reach the probability of obtaining lower numbers {0 . . . 2}.

Different methods for solving the modulo bias are known in the art. These methods use more complicated software functions based on at least one call to a rand( ) function, modulo function, and several arithmetic operations. One such solution is discussed at stackoverflow.com, discussing an answer to the question, "What is the optimal algorithm for generating an unbiased random integer within a range?"

Ranges of Numbers with a Desired Variability Criterion

Figure 22:
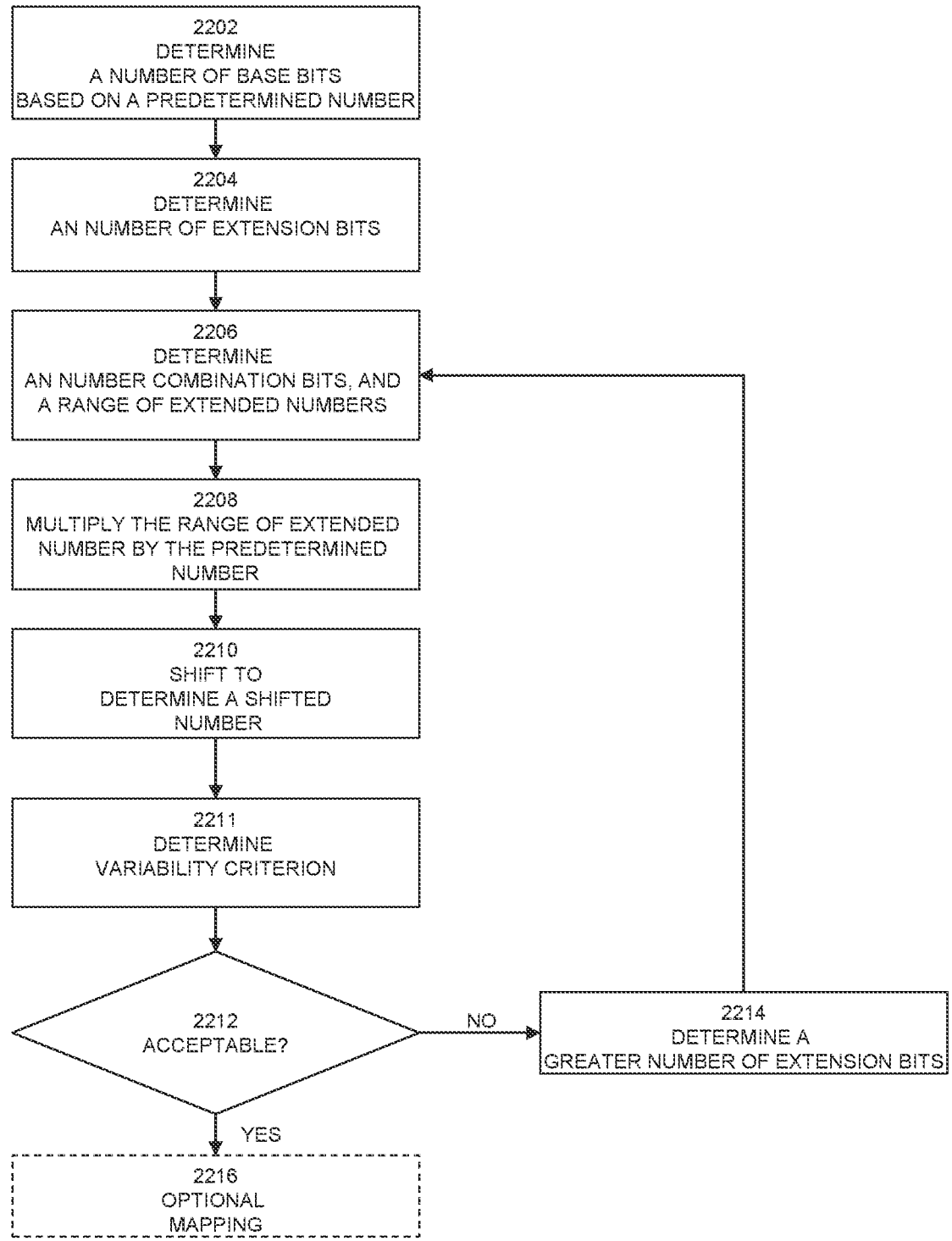
FIG. 22 is a flowchart of an exemplary process for providing a range of numbers with a desired variability criterion, consistent with the disclosed embodiments.
Figure 23:
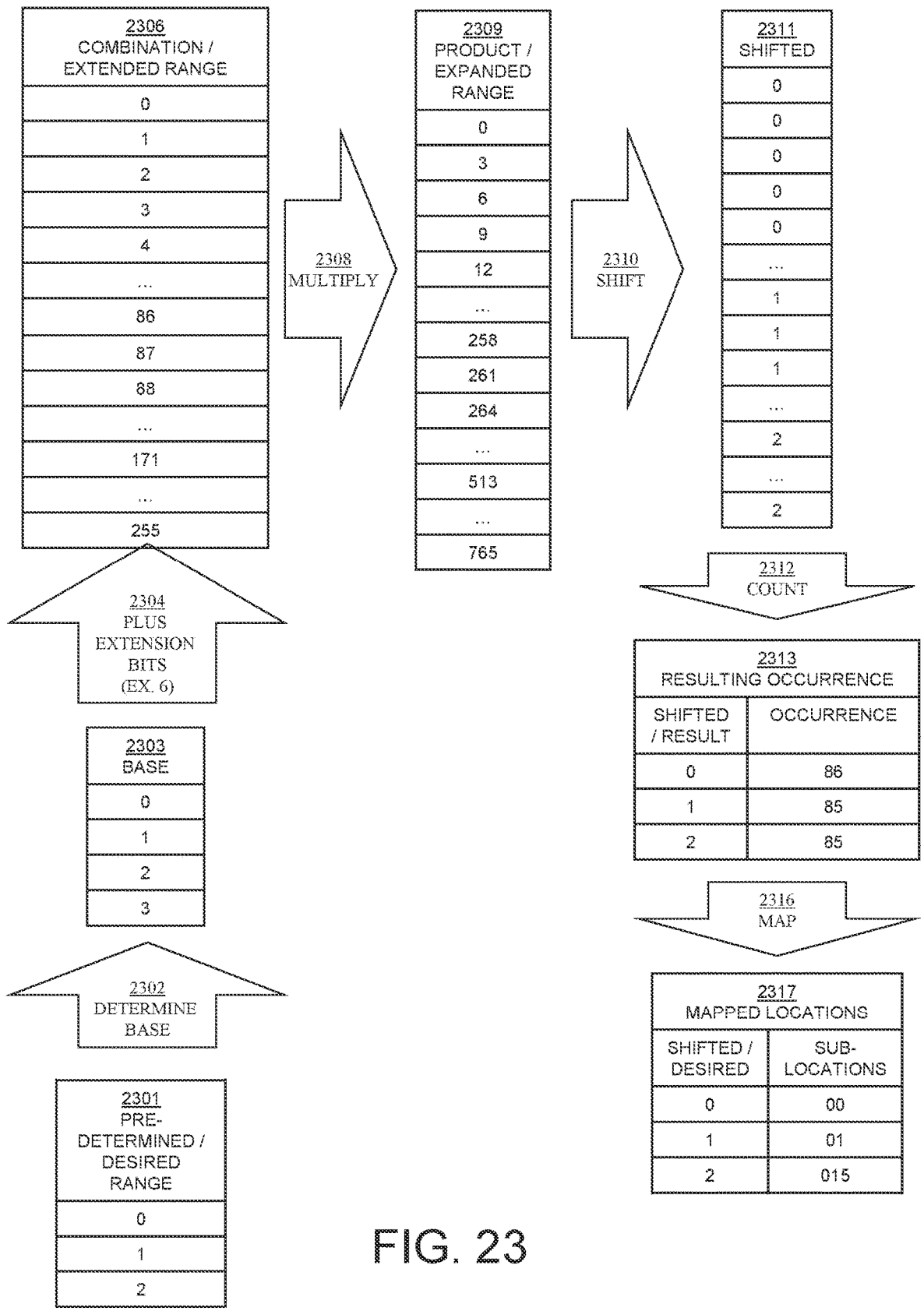
FIG. 23 is an example of ranges generated during the execution of the process of FIG. 22, consistent with the disclosed embodiments.

FIG. 22 is a flowchart of an exemplary process 2200 for providing a range of numbers with a desired variability criterion and FIG. 23 is an example of ranges generated during the execution of process 2200. In accordance with some embodiments, process 2200 may be executed by a system comprising at least one processing unit. Process 2200 may be used to provide a plurality of ranges of numbers with a desired variability criterion, for simplicity process 2200 and the example shown in FIG. 23 will be described for a single range.

At step 2202, the at least one processing unit may determine a number of base bits based on a predetermined number 2301. The predetermined number 2301 may have a corresponding desired range (for example, of storage locations) and may therefore correspond to a natural number. For example, as illustrated in FIG. 23 desired range 2301 comprises 3 numbers {0,1,2}, accordingly the predetermined number is equal to 3. Desired range 2301 in this example includes all integers from zero through the predetermined number minus one. In order to generate this desired range, a minimum number of bits (number of base bits) is determined 2202. As 3 numbers are desired, the number of base bits is: $\lfloor \log_2(3) \rfloor + 1 = 2$ bits. For clarity, the range of base bits 2303 is shown in FIG. 23 in decimal format, with {00, 01, 10, 11} respectively shown as {0, 1, 2, 3}. Note that this display and format is used in other tables, such as for the combination bits 2306.

At step 2204, the at least one processing unit may determine a number of extension bits. In the example illustrated in FIG. 23 the number of extension bits is equal to 6. The number of extension bits may be determined based on a lookup, or calculation of a variability criterion.

At step 2206, the at least one processing unit may determine a number of combination bits 2306, and based on the combination bits, determine an extended range of numbers. In some embodiments, the number of combination bits may be determined by concatenating the number of base bits with the number of extension bits. In the example of FIG. 23, the number of combination bits is equal to 8. In the current example, the 8 combination bits are obtained by concatenating the 2 base bits with the 6 extension bits (2304). The extended range of numbers shown as combination 2306 corresponds to all integers formable with the 8 combination bits, i.e. {0 . . . 255}.

At step 2208, the at least one processing unit may multiply each number in the extended range of numbers by the predetermined number to determine an expanded range of numbers. In FIG. 23, the extended range of numbers 2306 is multiplied (2308) by the predetermined number 3 to generate the expanded range of numbers (shown as product/expanded range 2309, numbers {0 . . . 765}) including all integers from 0 to 765 by step of 3.

At step 2210, the at least one processing unit may shift 2310 the expanded range of numbers by the number of combination bits to determine a shifted range of numbers. In the context of this disclosure shifting may refer to performing a logical shift operation on a given set of bits. In the example illustrated in FIG. 23 a logical 8-bit right shift (2310) is performed. In a logical right shift, the least significant bit is lost and a 0 (zero) is inserted at the other end, i.e., for a natural number, a right shift of 1 bit transforms the natural number into the remainder of its division by 2. By extension, for a natural number, an 8-bit right shift transforms the natural into the remainder of its division by $2^8=256$. Accordingly, in this example, the shifted range of numbers 2311 comprises all integers from zero through the predetermined number minus one {0, 1, 2}, i.e., numbers identical to the numbers in the desired range 2301.

At step 2211, the at least one processing unit may determine a variability criterion for the shifted range of numbers and, at step 2212, determine if the variability criterion is acceptable. For example, the at least processing may evaluate whether or not the variability criterion is less than a variability target. In some embodiments, the variability target is equal or below a predetermined percentage. For example, the variability target may be equal to 1, 1.5, 2, 6, 10, or 15%. In some embodiments, the variability criterion may be determined by calculating a percentage change between the lowest and highest probability of obtaining a number in the shifted range of numbers. As illustrated in FIG. 23, to calculate the percentage change, numbers included in the shifted range 2311 may be counted 2312 to determine total number of resulting occurrences 2313. In this example, the variability criterion of shifted range of numbers 2311 is equal to (86-85)/85≈1.2%.

If the determined variability criterion is not acceptable (2212 "no"), for example, if the variability criterion is greater than the variability target, the at least one processing unit may determine, in step 2214, a greater number of extension bits. Subsequently, the process may be repeated from step 2206. In the example of FIG. 23, if the variability target would be equal to 1%, the at least one processing unit may select an increased number of extension bits equal to 9. Repeating the above steps, this greater number of extension bits results in a shifted range of numbers with a variability criterion equal to 1/170≈0.6%.

Optionally, the at least one processing unit may be further configured at step 2216 to map 2316 the shifted range of numbers to a plurality of storage locations. Example mapping is shown in FIG. 23 with the desired range {0, 1, 2} respectively mapped to sub-locations {00, 01, 015}.

A process similar to process 2200 for providing a random number within a range of desired numbers may be executed by the at least one processing unit. Accordingly, in some embodiments, the at least one processing unit may be configured to determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number. In some embodiments, the shifted number may be greater than or equal to zero and less than the predetermined number.

Accordingly, in some embodiments, a system may include at least one processing unit configured to determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number.

Using the parameters shown in FIG. 23 as an example, an extended number equal to 151 (10010111) may be determined, and this number may then be multiplied by 3 to generate an expanded number equal to 453. This expanded number may then be shifted to determine a shifted number equal to 1, which is included in a range of numbers 2311.

The shifted number may be included in a range of numbers, and this range of numbers may be associated with a given distribution and may comprise a plurality of different numbers, such as, for example, all integers from zero through the predetermined number minus one. The range of numbers may be generated by executing process 2200. Accordingly, in some embodiments, the shifted number may be included in a predetermined range of numbers.

In some embodiments, the at least one processing unit may be further configured to output the shifted number. Outputting the shifted number may include providing the shifted number to another processing unit, transmitting the shifted number to another device, or outputting the shifted number to a display device. Alternatively, in some other embodiments, the at least one processing unit may be further configured to map the shifted number to a storage location.

In some embodiments, the predetermined number may be a natural number, and may optionally correspond to a quantity of different numbers included in a range of numbers. For example, referring to FIG. 23, the range of numbers may correspond to shifted range of numbers 2311, which comprises numbers {0 . . . 2}. The predetermined number in this case is therefore equal to 3. In some other embodiments, the predetermined number may be based on a quantity of storage locations.

In some embodiments, the number of base bits may be determined based on a binary logarithm of the predetermined number. For example, based on the predetermined number being equal to 3, the at least processing unit may determine that the number of base bits is $\lfloor \log 2(3) \rfloor + 1 = 2$ bits.

In some embodiments, the number of extension bits may be determined based on a variability target. As discussed above, in some embodiments, the shifted number may be greater than or equal to zero and less than the predetermined number. In other embodiments, the shifted number may be included in any range of numbers. For example, the at least one processing unit may determine the number of extension bits, such that a range of numbers from which the shifted number may be derived has a known variability criterion below a variability target. In some embodiments, the variability target may be equal to or below a predetermined percentage. For example, the variability target may be equal to 1, 1.5, 2, or 6%. Referring to FIG. 23, the at least one processor may select a number of extension bits equal to 6 based on the premise that the variability criterion of the range of numbers 2301 is below 1.5%. In some embodiments, the shifted number may be included in a range of numbers, and the at least one processing unit may be further configured to determine a variability criterion associated with the range of numbers As discussed above, in some embodiments, the range of numbers correspond to a predetermined range of numbers (e.g., all integers from zero through the predetermined number minus one). For example, the at least one processing unit may calculate a percentage change between the lowest and highest probability of obtaining a number in a particular range of numbers.

In some embodiments, when the variability criterion is greater than a predetermined variability target, the at least processing unit may be further configured to: determine a greater number of extension bits that are greater than the number of extension bits; determine a greater number of combination bits based on the number of base bits and the greater number of extension bits; determine an updated extended number based on the greater number of combination bits; multiply the updated extended number by the predetermined number to determine an updated expanded number; and shift the updated expanded number by the higher combination bit number to determine an updated shifted number. In some embodiments, the updated shifted number may be greater than or equal to zero and less than the predetermined number. In other embodiments, the updated shifted number may be included in any range of numbers. By using a greater number of extension bits, an updated range of numbers that includes the shifted number may have a variability criterion lower than the variability criterion of the range of numbers. For example, referring to FIG. 23, if the variability target is equal to 1%, the at least one processing unit may select a number of extension bits equal to 9. This greater number of extension bits results in an updated shifted numbers comprised in an updated range of numbers with a lower variability criterion equal to $1/170 \approx 0.6\%$. The updated range of numbers may be generated by executing process 2200.

In some embodiments, determining the number of combination bits may include concatenating the number of base bits and the number of extension bits. In the example of FIG. 23, by concatenating the 2 base bits with the 6 extension bits, a number of combination bits equal to 8 bits may be obtained. In some embodiments, the extended number may include a natural number formable by the number of combination bits, e.g., in the case of natural numbers, the extended number may be equal to any natural number from zero to two to the power the number of combination bits minus one. Referring to FIG. 23, the extended number may be equal to any natural number from 0 to 255.

In some embodiments, determining the extended value may include using a hash function. In the context of this disclosure, a hash function refers to a mathematical function that takes an input (or "message") and produces a fixed-size output (often called a "hash value" or "digest"). The output may correspond to a unique representation of the input, meaning that any small change to the input will result in a completely different hash value. In some embodiments, the size of the output of the hash function may be equal to the number of combination bits. Additionally or alternatively, the hash function may be based on at least one value. For example, using a hash function on a value may give as an output the following 8-bit string 10010111, which ultimately is translated in an extended number equal to 151.

In some embodiments, the at least one processing unit may be further configured to determine a plurality of shifted numbers. For example, the at least one processing unit may be configured to perform the aforementioned steps involving the number of base bits, the number of extension bits, the extended number, and the expanded number multiple times. The steps may be performed serially or in parallel for each desired shifted number. In some embodiments, of the plurality of shifted numbers may be associated with a corresponding predetermined number. For example, a first shifted number, associated with a first predetermined number, and a second shifted number, associated with a second predetermined number may be determined by the at least one processing unit. The first and second predetermined number being different or equal. Additionally, in some embodiments, the at least one processing unit may be further configured to determine the plurality of shifted numbers in parallel.

In some embodiments, the at least one processing unit may be further configured to allocate a value to at least one of a plurality of storage locations based on the shifted number. In the context of this disclosure, allocating a value may refer to the process of reserving a specific amount of memory or storage space to hold and store the value. In some embodiments, allocating a value may involve computing a hash function.

In some embodiments, the plurality of storage location may be included in the system, or the plurality of storage location may be external to the system. Further details regarding value allocation are provided in the sections below.

Value Allocation to Storage Locations

Figure 24:
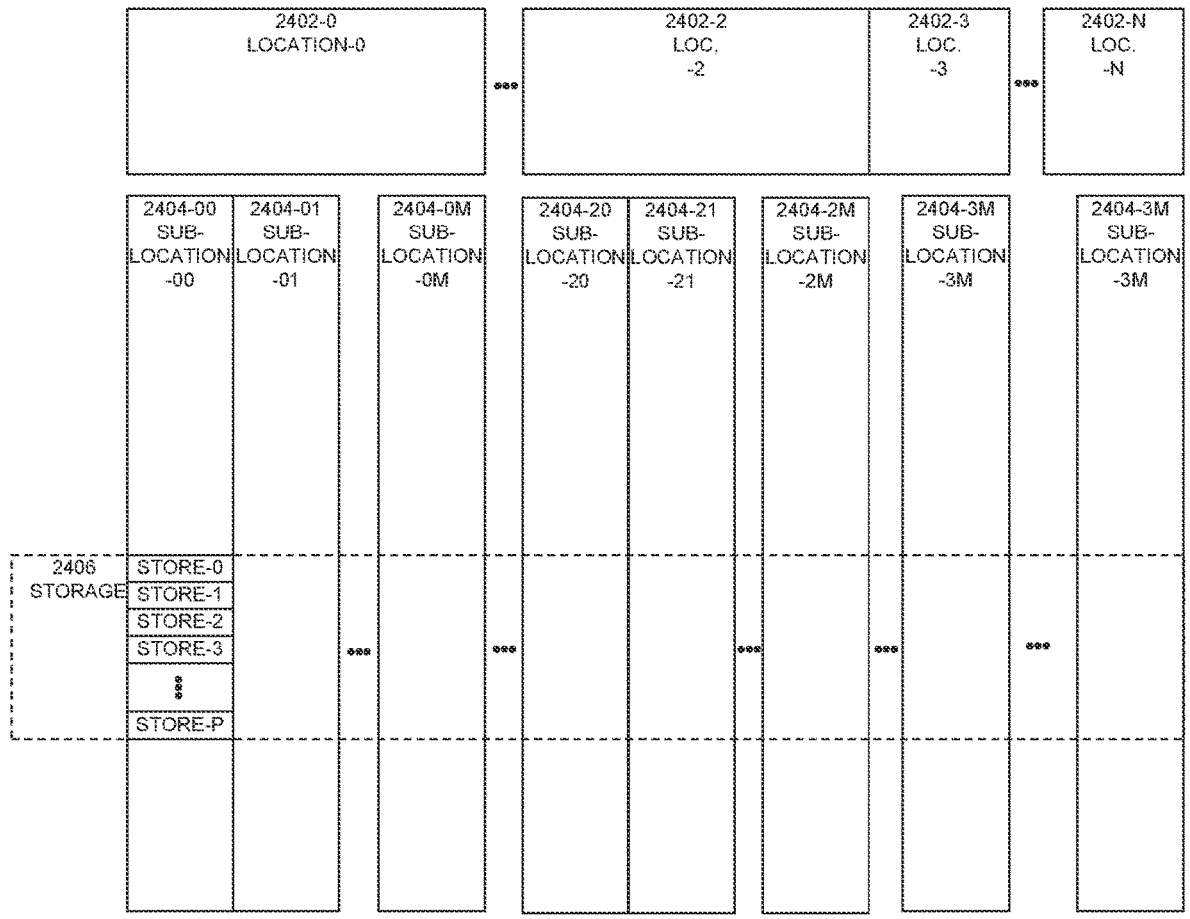
FIG. 24 is an example of a configuration of a storage unit including a plurality of storage locations, consistent with the disclosed embodiments.

FIG. 24 is an example of a configuration of a storage unit 2400 including a plurality of storage locations. In this configuration, the plurality of locations may be split into three groups: locations 2402 (shown as locations-0, -2, -3, -N), sub-locations 2404 (shown as: sub-locations-00 2404-00, -01 2404-01, -0M 2404-0M for location-0 2402-0; sub-locations-20 2404-20, -21 2404-21, -2M 2404-2M, for location-2 2402-2; sublocation-3M 2404-3M for location-3 2402-3; and sub-location 2404-NM location-N 2402-N), and storage 2406 (shown store-0, -1, -2, -3, -P). Three indicators may be used to identify one of the plurality of storage locations of storage unit 2400.

Figure 25:
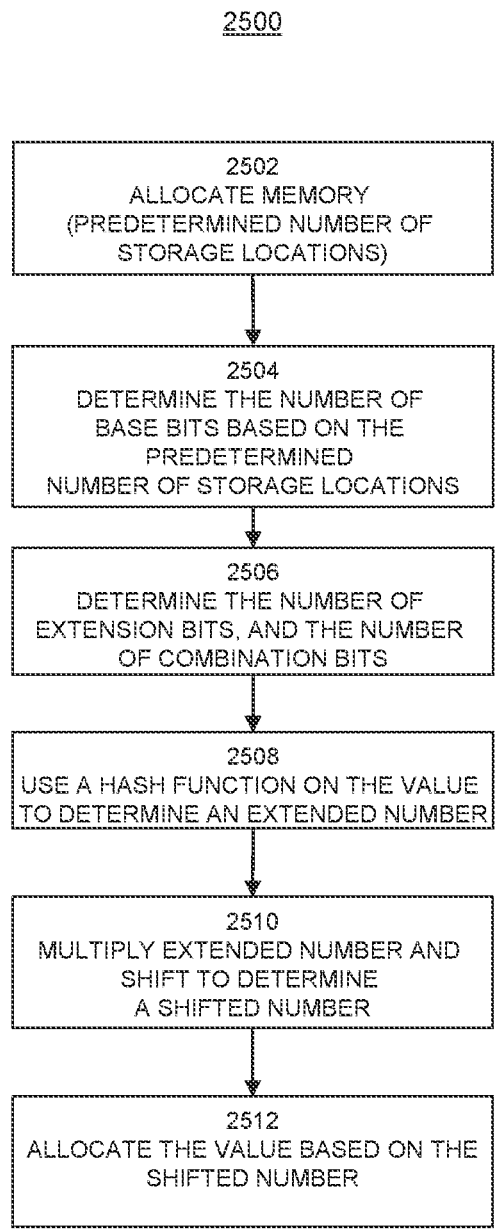
FIG. 25 is a flowchart of an exemplary process for allocating a value to at least one of a plurality of storage locations, consistent with the disclosed embodiments

FIG. 25 is a flowchart of an exemplary process 2500 for allocating a value to at least one of a plurality of storage locations. In accordance with some embodiments, process 2500 may be executed by the at least one processing unit. At step 2502, the at least one processing unit may be configured to allocate memory, e.g., determine a predetermined number of storage locations. Referring to FIGS. 23 and 24, the at least one processing unit may allocate memory for 3 sub-locations in location-0 2402-0. The predetermined number of storage locations that are determined may not correspond to the number of storage locations available in a storage unit, and storage locations may not be adjacent. In the current example, location 2402-0 comprise 16 sub-locations per location (M=15), the predetermined number of storage location is equal to 3 sub-location-2 through sub-location-14 are not used.

At step 2504, similar to step 2202, the at least one processing may determine the number of base bits based on the predetermined number of storage locations. For example, using a binary logarithm formula, for 3-sublocations the number of base bits is $\lfloor \log 2(3) \rfloor + 1 = 2$ bits. At step 2506, similar to step 2204, the at least one processing unit may determine a number of extension bits and a number of combination bits based on the number of base bits and the number of extension bits. For example, for a number of base bits equal to 2, a number of extension bits equal to 6 and a number of combination bits equal to 8 may be used.

At step 2508, the at least one processing unit may use a hash function on the value to determine an extended number. In some embodiments, the size of the output of the hash function is equal to the number of combination bits. For example, using a hash function on a value may give as an output the following 8-bit string 10010111, which ultimately is translated in an extended number equal to 151.

At step 2510, similar to steps 2208 and 2210, the at least one processing unit may multiply the extended number by the predetermined number of locations to determine an expanded number, and shift the expanded number to determine a shifted number. The shifted number may be included in a range of numbers. For example, the extended number equal to 151 may be multiplied by 3 to generate an expanded number equal to 453, this expanded number is then shifted to determine a shifted number equal to 1, this shifted number is included in range of numbers 2311.

At step 2512, the at least one processing unit may allocate the value to at least one of a plurality of storage locations based on the shifted number. In some embodiments, the shifted number may be included in a range of numbers and the at least one processing unit may be further configured to allocate the value based on a mapping of each number of the range of numbers to one of the plurality of storage locations. More specifically, in some embodiments, mapping may further include associating each number of the range of numbers with an identifier of one of the plurality of storage locations. For example, as illustrated in FIG. 23, each different number of the range {0, 1, 2} is mapped (2316) as an identifier of one of the predetermined number of sub-locations of storage unit 2400 to be used {00, 01, 015} (e.g., mapped locations 2317). For example, if the shifted number is equal to 1, then the value will be allocated in sub-location 2404-01.

As described above, the at least one processing unit may be configured to determine a plurality of shifted numbers in parallel. Accordingly, with reference to FIG. 24, a first shifted number may be generated for locations 2402, a second shifted number for sub-locations 2404, and a third shifted number for storages 2406. In some embodiments, the at least one processing unit may be configured to determine the plurality of parallel shifted numbers generated using a large random number and allocating portions of the large random number. In this case, "large" refers to a number of bits equal to or greater than the sum of all the numbers of combining bits needed to generate each shifted number.

FIG. 26 is an example of a large random number used to generate a plurality of shifted numbers. A hash may be generated based on a value, where the hash corresponds to the number of bits that are needed to allocate the value in a storage unit. In the example illustrated here, a value is used to generate a hash of 32 bits {0 . . . 31}. Bits may be allocated as follows: {0 . . . 4} location; {5 . . . 7} location extension; {8 . . . 9} sub-location; {10 . . . 15} sub-location extension; {16 . . . 26} storage; {27 . . . 31} storage extension.

Example Hardware Implementations

In some embodiments, the at least one processing unit may be included in an accelerator processor. For example, the at least one processing unit may be included in, or include, one or more layers of the data analytics accelerator 900. In some embodiments, the at least one processing unit may comprise one or more arithmetic logic units. In the context of this disclosure, an arithmetic logic unit may include any type of hardware components configured to perform arithmetic operations, for example, on data (e.g., binary data) such as addition, subtraction, multiplication, and division, as well as logical operations such as AND, OR, and NOT. Additionally, in some embodiments, the one or more one or more arithmetic logic units may be configured to perform at least one of: multiplication operations or bit-shifting operations, such as in steps 2208 and 2210 illustrated in FIG. 22, or in step 2510 illustrated in FIG. 25. In some embodiments, the at one processing unit may include one or more shift registers. In the context of this disclosure, a shift register may refer to any sequential logic circuit configure to store and transfer binary data in a serial manner.

In an embodiment, a system comprises at least one processing unit configured to: determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number, wherein the shifted number is greater than or equal to zero and less than the predetermined number.

In some embodiments, the at least one processing unit is further configured to output the shifted number. In some embodiments, the at least one processing unit is further configured to map the shifted number to a storage location. In some embodiments, the predetermined number is based on a quantity of storage locations. In some embodiments, determining the extended number includes using a hash function. In some embodiments, the hash function is based on at least one value.

In some embodiments, the shifted number is included in a range of numbers, and the at least one processing unit is further configured to determine a variability criterion associated with the range of numbers. In some embodiments, when the variability criterion is greater than a predetermined variability target, the at least processing unit is further configured to: determine a greater number of extension bits that are greater than the number of extension bits; determine a greater number of combination bits based on the number of base bits and the greater number of extension bits; determine an updated extended number based on the greater number of combination bits; multiply the updated extended number by the predetermined number to determine an updated expanded number; and shift the updated expanded number by the higher combination bit number to determine an updated shifted number, wherein the updated shifted number is greater than or equal to zero and less than the predetermined number.

In some embodiments, the number of extension bits is determined based on a variability target. In some embodiments, the variability target is equal to or below a predetermined percentage. In some embodiments, the predetermined percentage is 2 percent. In some embodiments, the predetermined number is a natural number. In some embodiments, the extended number includes a natural number formable by the number of combination bits.

In some embodiments, determining the number of combination bits includes concatenating the number of base bits and the number of extension bits. In some embodiments, the number of base bits is determined based on a binary logarithm of the predetermined number.

In some embodiments, the at least one processing unit is further configured to allocate a value to at least one of a plurality of storage locations based on the shifted number.

In some embodiments, allocating the value includes computing a hash function. In some embodiments, the plurality of storage locations are included in the system. In some embodiments, the plurality of storage locations are external to the system.

In some embodiments, the shifted number is included in a range of numbers and the at least one processing unit is further configured to allocate the value based on a mapping of each number of the range of numbers to one of the plurality of storage locations.

In some embodiments, the mapping further includes associating each number of the range of numbers with an identifier of one of the plurality of storage locations.

In some embodiments, the at least one processing unit is further configured to determine a plurality of shifted numbers. In some embodiments, each of the plurality of shifted numbers is associated with a corresponding predetermined number. In some embodiments, the at least one processing unit is further configured to determine the plurality of shifted numbers in parallel.

In some embodiments, the at least one processing unit includes one or more arithmetic logic units. In some embodiments, the one or more arithmetic logic units are configured to perform at least one of multiplication operations or bit shifting operations. In some embodiments, the at least one processing unit includes one or more shift registers. In some embodiments, an accelerator processor includes the at least one processing unit.

In an embodiment, a system comprises at least one processing unit configured to: determine a number of base bits based on a predetermined number; determine a number of extension bits; determine a number of combination bits based on the number of base bits and the number of extension bits; determine an extended number based on the number of combination bits; multiply the extended number by the predetermined number to determine an expanded number; and shift the expanded number by the number of combination bits to determine a shifted number.

Distributed Storage Agents

As described herein, the disclosed systems and methods may reduce the amount of data transferred over a network, the workload of a CPU, and memory use in data analytics applications. In some embodiments, a system and method for data retrieval and storage may include one or more distributed storage agents. As described in further detail below, this data retrieval and storage method may improve the functioning of computer systems, including, but not limited to decreasing processing time, increasing efficiency, and saving power, at least in part by facilitating implementation of an innovative concurrency architecture featuring low variance query concurrency. The disclosed systems and methods may also be used to facilitate implementation of a streaming query engine, for example, of a structured query language (SQL) hardware engine.

Some current techniques for data storage and retrieval may include pulling data, in which a processor issues a command and communicates with a remote storage location. The remote storage location may exchange control signals with the processor and pull data based on the command. Current techniques may also include storing the data in addressable memory. However, these techniques may present various problems in terms of speed, efficiency, and other aspects of data retrieval. For example, current techniques may present issues in terms of allocation of appropriate computer resources. More specifically, due to the location of processors needed to access data, current techniques may require a relatively large number of processors and/or processing capabilities. In some cases, current techniques may also cause delays in processing. For example, when a processor needs to make a request for data to which the processor does not have direct access, the processor must wait for the data to be returned (e.g., from another processor and/or storage) to the processor. Alternatively, or additionally, delays may arise due to variations in processing time. For example, when a query is sent for execution there may be other queries, processes, etc., in a queue causing the query to wait a variable and indeterminate amount of time before executing, or to wait or have less resources available during execution.

At least the above problems can be solved at least in part using embodiments involving an apparatus including one or more storage modules, one or more compute nodes, and a plurality of agent modules, as described in further detail below. Each of the compute nodes may be operationally connected to one or more of the storage modules. Further, each of the plurality of agent modules may be configured for pushing data from one or more of the connected storage modules to one or more of the compute nodes. Using the embodiments described herein, the disclosed techniques may use less bandwidth, have lower latency, provide known and/or determinable execution times, and provide different granularity as compared to current implementations.

Figure 27:
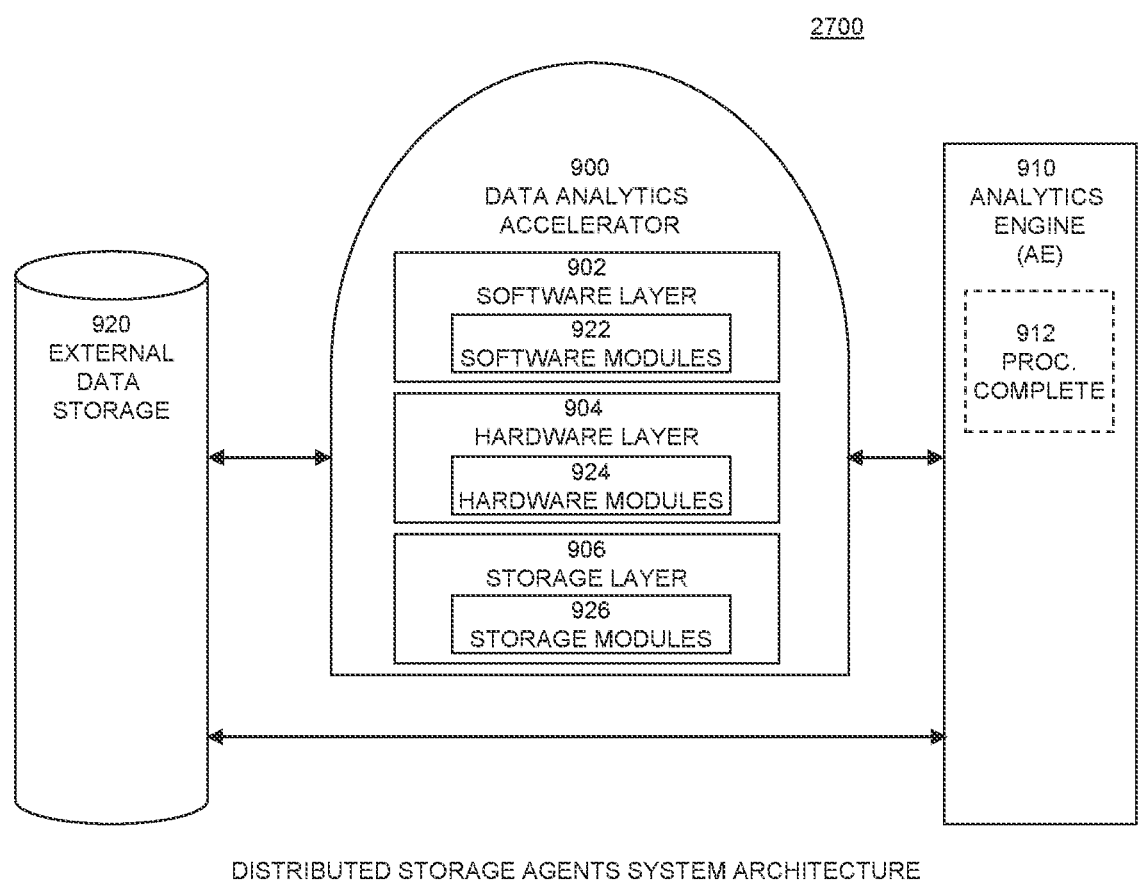
FIG. 27 is a high-level example of a data analytics architecture, consistent with the disclosed embodiments.

FIG. 27 is a high-level example of a data analytics architecture 2700, consistent with the disclosed embodiments. Data analytics architecture 2700 may be the same as or similar to the data analytics architecture described above with respect to FIG. 9. In data analytics architecture 2700, acceleration, such as acceleration through the data analytics accelerator 900, can be achieved at least in part by applying innovative operations between the external data storage 920 and the analytics engine 910 (e.g., a CPU). In some embodiments, these operations may optionally be followed by completion processing 912. Various additional details regarding the overall system architecture are provided above.

In some embodiments, the disclosed embodiments may include a distributed storage agents system, as describe further below. The distributed storage agents system may enable efficient data retrieval operations and may correspondingly speed up various processes, decrease power consumption, lowering query variance time, and support streaming processing without using storage (addressable) memory. The distributed storage agents system may be implemented as a portion of one or more of the software layer 902, software modules 922, hardware layer 904 hardware modules 924, which may interact with the storage layer 906 and the storage modules 926.

Figure 28A:
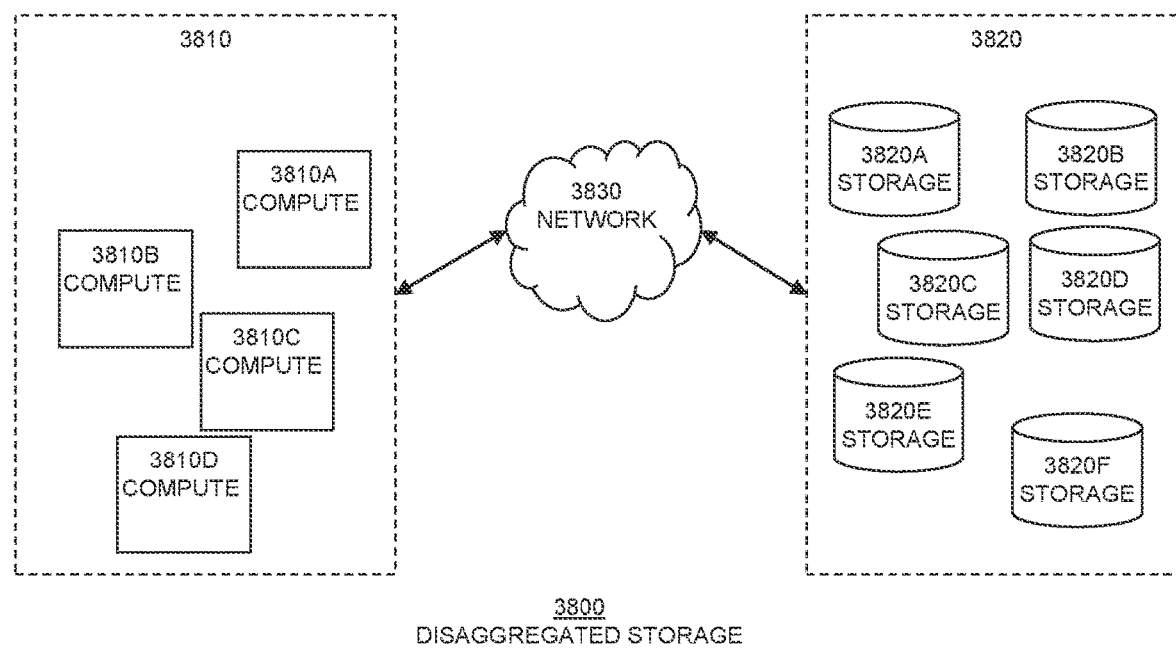
FIG. 28A is an example of disaggregated storage.

FIG. 28A is an example of a disaggregated storage. Disaggregated storage 3800 may allow compute resources 3810 (shown as exemplary compute modules 3810A, 3810B, 3810C, and 3810D) to be physically separated, in this case using a network 3830, from storage resources 3820 (shown as exemplary storage 3820A to 3820F). Storage area network (SAN) and network-attached storage (NAS) refer to storage accessed over a computer network.

Figure 28B:
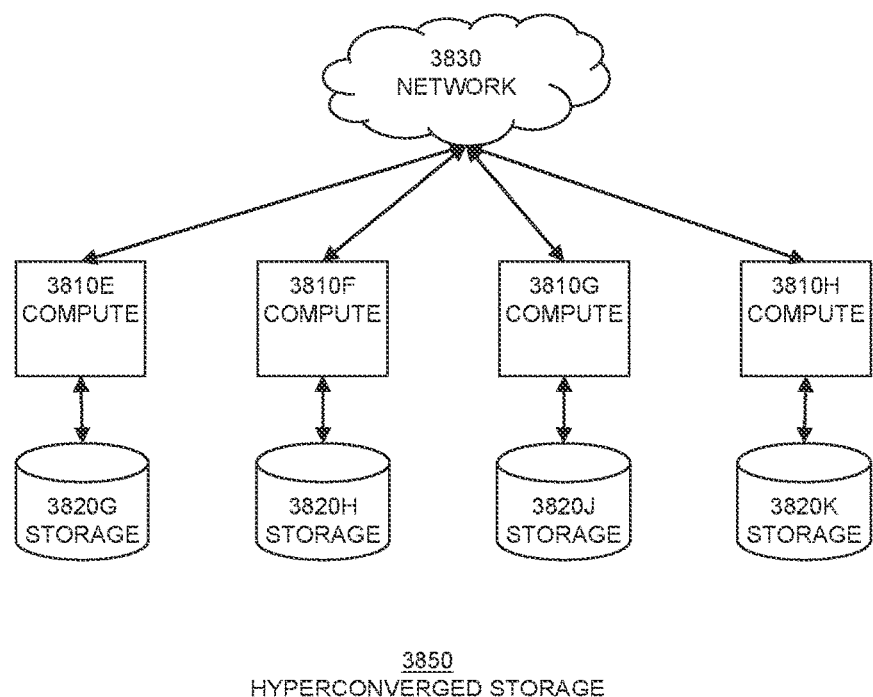
FIG. 28B is an example of hyperconverged storage.

FIG. 28B is an example of a hyperconverged storage. Hyperconverged storage 3850 may be one facet of hyperconverged infrastructure (HCI), in which storage (3820G to 3820K) is bundled with compute modules (3810E to 3810H) and networking 3830 in a single virtualized system. Direct-attached storage (DAS) is digital storage directly attached to the computer accessing the storage. Also known in the field as local storage. DAS may include one or more storage units such as hard drives, solid-state drives, and optical disc drives within an enclosure including processing.

As described above, the disaggregated and hyperconverged storage architectures shown in FIGS. 28A and 28B, respectively, may present various problems associated with allocation of computer resources, the number and location of processors, and processing delays. To address these and other deficiencies, a distributed storage agents system may be implemented, which may provide a "push"-based data storage and retrieval architecture.

Figure 29:
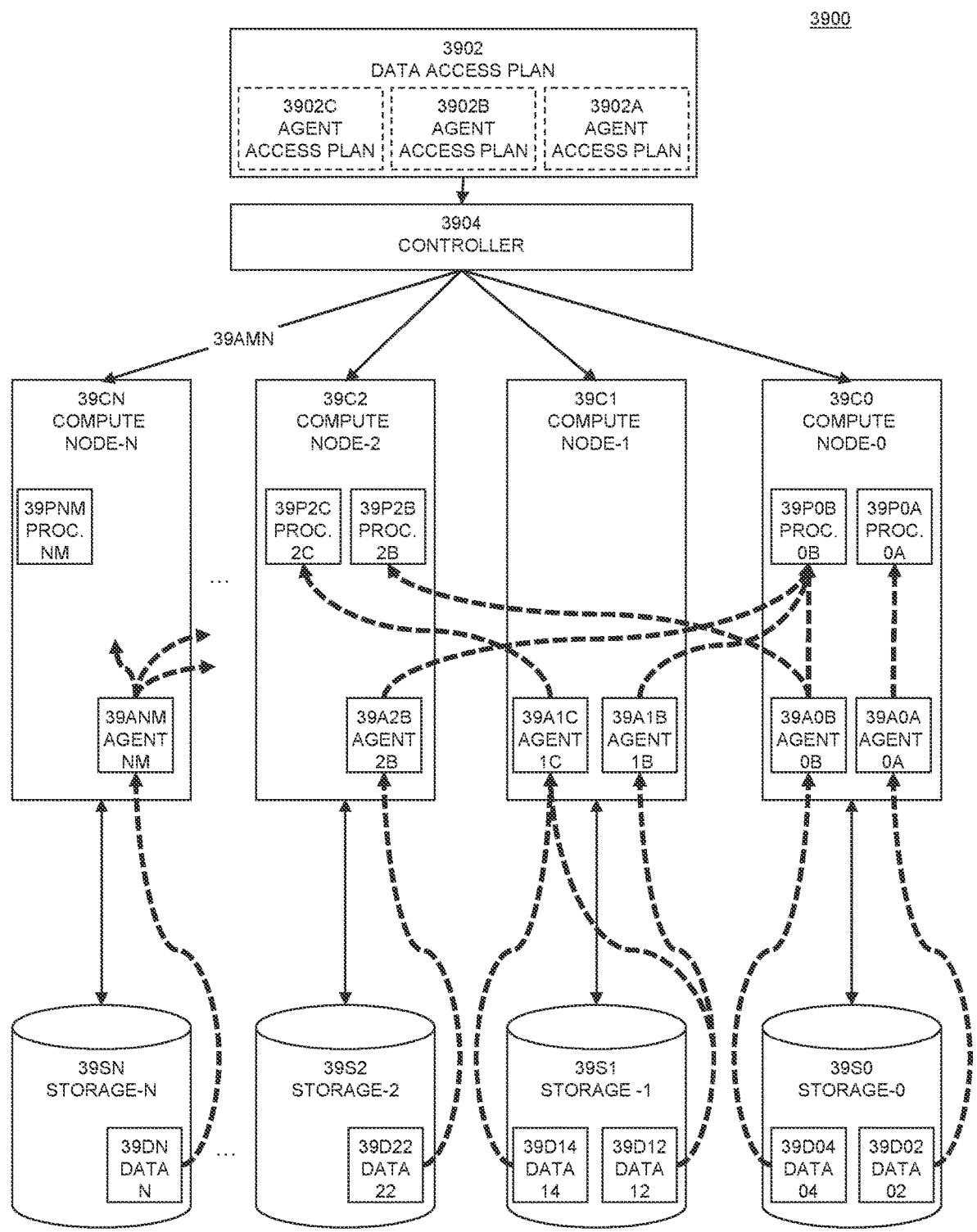
FIG. 29 is a diagrammatic representation of an exemplary implementation of a system for data storage and retrieval, consistent with the disclosed embodiments.

FIG. 29 is a diagrammatic representation of an exemplary implementation of a system 3900 for data storage and retrieval, consistent with the disclosed embodiments. An apparatus (e.g., system 3900) for data retrieval may include one or more storage modules 39S0, 39S1, and 39S2 (which may include additional storage modules through 39Sn), collectively referred to as storage modules 39S. Consistent with the disclosed embodiments, storage modules 39S may include various data stored therein. For example, storage module 39S0 may include data 39D02 and 39D04, storage module 39S1 may include data 39D12 and 39D14, storage module 39S2 may include data 39D22, and storage module 39SN may include data 39DN. This data may collectively be referred to herein as data 39D.

System 3900 may further include one or more compute nodes 39C03 39C1, and 39C2 (which may include additional compute nodes through 39CN), collectively referred to as compute nodes 39C. Each of the compute nodes 39C may be operationally connected to one or more of the storage modules 39S, as shown. For example, storage module 39S0 may be operationally connected to compute node 39C03 storage module 39S1 may be operationally connected to compute node 39C1, storage module 39S2 may be operationally connected to compute node 39C2, and storage module 39SN may be operationally connected to compute node 39CN. In some embodiments, the one or more compute nodes 39C03 39C1, 39C2, and 39CN may be operationally connected with each other, for example, through a network (not shown in FIG. 39). For example, various communications may occur through network connection 4220 described below. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. In some embodiments, one or more of compute nodes 39C may be directly connected, for example, through a hardwired connection.

System 3900 may further include one or more agent modules, such as agent modules 39A0A, 39A0B, 39A1B, 39A1C, and 39A2B (which may include additional agent modules through 39Anm), collectively referred to as agent modules 39A. Each of the plurality of agent modules 39A may be configured for pushing data 39D from one or more of the connected storage modules 39S to one or more of the compute nodes 39D. A plan 3902 may be provided to an optional controller 3904 which can generate one or more of the agent modules 39Anm.

In some embodiments, system 3900 may include one or more processing modules 39P0A, 39P0B, 39P2B, and 39P2C (which may include additional processing modules through 39PNM), collectively referred to as processing modules 39P. Each of the processing modules 39P may be configured on an associated one of the compute nodes. For example, compute node 39C0 may include processing modules 39P0A and 39P0B, compute node 39C2 may include processing modules 39P2B and 39P2C, and compute node 39CN may include processing modules 39PNM, as shown. Processing modules 39P may not necessarily be pieces of hardware but may be logical elements associated with a compute node for processing data. For example, in some embodiments, compute nodes 39C may include one or more hardware processing devices, and processing modules 39P may be instantiated on or across one or more of compute nodes 39C. In some embodiments, one or more of the agent modules 39A may be configured to push data 39D to one or more processing modules 39P. This data may be "pushed" in that the data may be provided by the agent modules 39A on an event-driven basis, rather than request-driven. For example, data 39D may be provided by agent modules 39A as the data becomes available (or based on timing or other events), rather than waiting for a particular request for the data from one of processing modules 39P. In some embodiments, one or more of the processing modules 39P may be configured to input at least a subset of the data pushed to the associated compute node.

In the context of the present disclosure, "storage modules" may also be referred to as "storage nodes." Similarly, "processing modules" may also be referred to as "processing nodes" or "processing." "Agent modules" may also be referred to as "agents." The term "data access plan" may also be referred to as a "plan." In the context of this description, as is known in the art, "n" is an integer designating a particular unit of one or more similar elements. In the context of this description, "m" is an integer designating a particular plan of one or more plans. One skilled in the art will be familiar with the use and implementations of these terms and notation.

Storage modules 39S may be direct attached storage, however, this implementation is not limiting, and other storage implementations are possible. Compute nodes may be configured to run zero, one, or two or more agents. Compute nodes may be configured to run other and/or additional processes from the agents.

As can be seen from the following description, a variety of combinations of the number and location of data 39D, agents 39A, processing 39P, and compute nodes 39C are possible. For example, compute nodes 39C may have zero, one, or two or more each of processing modules 39P and agents 39A.

Consistent with the disclosed embodiments, data may be transferred among the various agent modules 39A and processing modules 39B in various combinations. For example, an agent module may push data from an associated storage module to one or more processing modules on the same compute node as the agent, to a processing module on a different compute node from the agent, or both. For example, as indicated in FIG. 29, an exemplary flow of data may include data 39D02 ("data 02") being retrieved from storage 39S0 ("storage-0") via agent 39A0A ("agent-0A"), and pushed by agent-0A to processing module 39P0A ("processing-0A") on compute node 39C0 ("compute node-0"). This flow may represent a portion of data (e.g., a single portion of data) being pushed via a single agent to processing on the same compute node (as the agent).

Alternatively, or additionally, data may be pushed via a single agent to processing on a compute node that is different than the compute node of the agent. For example, as shown in FIG. 29, data 39D04 ("data 04") may be retrieved from storage-0 via agent module 39A0B ("agent 0B"), and may be pushed to one or both of processing module 39P0B ("processing-0B") on compute node 39C0 and processing module 39P2B ("processing-2B") on compute node 39C2 ("compute node-2"). Accordingly, this flow may represent an example of a portion of data being pushed via a single agent for processing both on the same compute nodes (i.e., the same compute node as the agent/where the agent is deployed) and processing on a different compute node (i.e., a compute node other than where the agent is deployed). The various forms of retrieval described above with respect to agents 39A0A and 39A0B may be referred to as a "one-to-one" configuration, as a single piece of data is being accessed by a single agent.

In some embodiments, a portion of data may be accessed and/or handled by multiple agents. As described above, the agents may push the data for processing on the same compute nodes as the agents, or processing on different compute nodes. For example, as shown in FIG. 29, data 39D12 ("data 12") may be retrieved from storage 39S1 by both agent 39A1B ("agent 1B") and agent module 39A1C ("agent 1C"). Agent 1B may push data 12 to processing-0B processing module 39P0B ("processing-0B") on compute node-0 and agent-1C may push data 12 to processing module 39P2C ("processing-2C") on compute node-2. Accordingly, this flow may represent an example of a portion of data being pushed via two agents to processing that is not on the same compute node (as the agents). These forms of retrieval may be referred to as a "one-to-many" configuration, as a portion of data is being accessed by multiple agents.

As another example flow, agent 1C may retrieve data 39D14 ("data 14") from storage-1 (storage module 39S1) and push data 14 to processing-2C on compute node 39C2. Accordingly, in some embodiments, a single agent may handle multiple portions of data.

As another example, data 39D22 ("data 22") may be retrieved from storage 39S2 ("storage-2") via agent-2B agent module 39A2B ("agent-2B") to processing-0B (processing module 39P0B) on compute node-0 (compute node 39C0). This flow may represent an example of a portion of data being pushed via a single agent to a processing module on a different compute node from the agent.

Consistent with the present disclosure, a given processing module may receive data from multiple agents, each of which may be on different compute nodes. For example, consistent with the various flows described above, processing-0B may receive data 04 via agent-0B, data 12 via agent 1B, and data 22 via agent-2B. This is an example of a "many-to-one" configuration, as the same processing module receives data from multiple agents. In general data 39Dn ("data n") from storage 39Sn ("storage-n") may be retrieved via agent module 39Anm ("agent nm") and may be pushed to processing module 39Pnm ("processing nm") on compute node 39Cn. In some embodiments, one or more portions of data may be broadcast from an agent to multiple processing modules. For example, agent 39Anm may transmit data to many different processing modules within system 3900. In some embodiments, data may not be transmitted to a particular destination, but may be transmitted broadly to a wide range of destinations, which may use the data as needed.

Referring also back to FIG. 27, the storage modules 39S may be implemented as storage modules 926 in the storage layer 906 and alternatively or in addition may be associated with the external storage 920. The compute nodes 39C may be implemented as hardware modules 924 in the hardware layer 904. Each compute node 39C may include one or more hardware processors for running processing modules and agent modules. The processing modules 39P may be implemented as software modules 922 in the software layer 902. The data access plan 3902 may originate from the analytics engine 910.

As indicated above, system 3900 may include a data access plan 3902. As used herein, a data access plan may refer to any form of information that may define various parameters for retrieval and storage of data within system 3900 (and/or system 2700). Data access plan 3902 may include an array, a table, a list, a text string, a schedule, a data structure, or any other form of data consistent with the disclosed embodiments. In some embodiments, data access plan 3902 may include one or more instructions for agents to access data from one or more storage locations and transmit the data to one or more destinations. For example, data access plan 3902 may include instructions for one or more of agent modules 39A to retrieve data 39D from various storage module 39S and push the retrieved data to one or more processing modules 39P according to one or more of the various flows described above. The data access plan may include one or more types of information selected from, for example, location information where the data is located on the storage modules, timing information when the data is needed by each of the processing modules, and location information where the data is to be pushed. Optionally, the data access plan may include information on the processing to be performed by one or more of the processing modules.

In some embodiments, the data access plan 3902 may include one or more agent access plans 3902A, 3902B, and 3902C. An agent access plan may correspond to some or all of data access plan 3902. Accordingly, an agent access plan may include one or more instructions for agents to access data from one or more storage locations and transmit the data to one or more destinations. Agent access plans 3902A, 3902B, and 3902C may be stored in a location that is accessible to one or more agents. For example, access plan 3902A may be stored in a manner that is accessible to agent module 39A0A (and/or agent module 39A0B), such as within agent module 39A0A, compute node 39C03 or the like. Similarly, access plan 3902B may be stored in a manner that is accessible to agent module 39A1B (and/or agent module 39A1C), access plan 3902C may be stored in a manner that is accessible to agent module 39A2B, and so on. Accordingly, each of the agent modules may include one or more types of information selected from, for example, location information where the data is located on the storage modules, timing information when the data is needed by each of the processing modules, and location information where the data is to be pushed. In some embodiments, one or more of the agent modules 39A may be configured with timing information, as described in further detail below, and may be further configured for determining in advance, based at least in part on the timing information, when to access the respective data 39D and when to push the respective data 39D.

In some embodiments, agent access plans 3902A, 3902B, and 3902C may include all or substantially all of data access plan 3902. Accordingly, an agent access plan may refer to a copy of data access plan 3902 made available to one or more agent modules. Alternatively, or additionally, an agent access plan my include a portion of data access plan 3902. For example, each agent access plan may include a portion of data access plan 3902 that is relevant to a particular agent module. For example, this may include instructions or other information indicating which data 39D accessible by the agent 39A is needed at which processing module 39P. In some embodiments, this may further include information indicating a timing of when the data will be needed. For example, agent access plan 3902A may include information indicating a need for data 39D04 by processing modules 39P0B and 39P2B. In some embodiments, the agent access plan may be tailored for a particular agent in that the agent does not include other information from data access plan 3902 that may not be relevant. For example, agent access plan 3902A may exclude information indicating a need for data 39D12 by processing module 392C, and this information may instead be included in a separate agent access plan accessible to agent module 39A1C (e.g., agent access plan 3902B). Alternatively, one or more agents may include information for one or more other agents, as described below.

Controller 3904 may be configured to distribute data access plan 3902 to compute nodes 39C such that agent access plans 3902A, 3902B, and 3902C are accessible by agents 39A. In some embodiments, controller 3904 may be configured to generate agent access plans 3902A, 3902B, and 3902C based on data access plan 3902. For example, this may include generating copies of data access plan 3902 and distributing the copies to compute nodes 39C. In embodiments where one or more of access plans 3902A, 3902B, and 3902C include a subset of data access plan 3902, controller 3904 may be configured determine portions of data access plan 3902 applicable to each agent module 39A and generate access plans 3902A, 3902B, and 3902C accordingly.

Alternatively, or additionally, agent access plans 3902A, 3902B, and 3902C may be generated by one or more agent modules 39A. For example, controller 3904 may distribute at least a portion of data access plan 3902 to one or more agent modules 39A that may be configured to generate the agent access plans. For example, controller 3904 may distribute data access plan 3902 to agent module 39A2B, which may be configured to generate agent access plan 3902C based on data access plan 3902. In some embodiments, data access plan 3902 may include instructions for generating one or more agent access plans.

In some embodiments, the agent modules 39A may be generated based at least in part on one or more data access plans 3902. For example, data access plan 3902 may include instructions for instantiation of the at least one agent module 39A based on at least a portion of the data access plan 3902. Accordingly, controller 3904 may initiate instantiation of one or more of agent access modules 39A based on data access plan 3902.

By providing agent access plans 3902A, 3902B, and 3902C, each agent may have access to the (entire) data access plan in advance of operation (of the agent). Accordingly, each of agent modules 39A may be enabled to access and/or make optimizations in the agents' data access (agent access plan). One or more agents may include information for one or more other agents, thus facilitating a single agent having a view across data retrieval and processing requirements for the system 2700. Correspondingly, an agent may plan data retrieval in coordination with data retrieval and/or processing requirements of other agents and processors. Some implementations may implement requests, such as lower-level read requests, according to upper/higher-level instructions. Thus, the agents may provide forward visibility (in time) to allow each agent to optimize access to storage devices and optimize pushing of data to one or more of the compute nodes.

As indicated above, each agent module may include at least a portion of the data access plan 3902. The portion of the data access plan may include a subset of the data access plan. In some embodiments, each agent module may include the entirety of the data access plan 3902. Each agent module may include an agent access plan based on at least a portion of the data access plan. The agent access plans may be based on the same, different, or overlapping portions of the data access plan. The agent access plan may be generated by the agent based on the agent's portion of the data access plan. Alternatively, the agent access plan may be generated by an element other than the agent and provided to the agent. For example, the controller 3904 may generate one or more agent access plans and each agent is configured with a corresponding one or more of the agent access plans. As the agent access plan is based on the data access plan, the agent access plan may include information such as location and timing, as described in reference to the data access plan. Optionally, an agent access plan may include information on other agents and other agent access plans. An agent access plan may run on one compute node or a subset of the compute nodes, for example two or more compute nodes.

In some embodiments, an agent access plan (and/or a data access plan) may include information regarding data stored in the at least one memory to be pushed to a destination. For example, agent access plan 3902A may include information regarding data 39D02 and 39D04. In some embodiments, this may include an identifier of the at least one memory. Continuing with the previous example, this may include an identifier of storage module 39S0. In some embodiments, the agent access plan may further include an identifier of a specific storage location (e.g., within storage module 39S0). For example, the identifier may include a start address indicating a location within storage module 39S0 where data 39D02 begins. The identifier may further include one or more of an end address, a data size, or any other information that may define data 39D02. Agent access plan 3902A may further include an identifier of a storage location for data 39D04, which may be different than the identifier of data 39D02.

According to some embodiments, an agent access plan (and/or data access plan) may include information regarding a destination for one or more portions of data. For example, agent access plan 3902A may include information identifying processing module 39P0A as a destination for data 39D02, as indicated in FIG. 29. A destination may be identified in an agent access plan in a variety of ways. In some embodiments, the agent access plan may include an identifier of the destination. For example, agent access plan 3902A may include an identifier associated with processing module 39P0A. Alternatively, or additionally, an agent access plan may include other identifiers, such as an identifier of a compute node or other information that may at least partially define a destination.

In some embodiments, an agent access plan (and/or data access plan) may include timing information, as indicated above. In this context, timing information may refer to information indicating a timing associated with transmitting data by an agent module 39A. Accordingly, data access plan 3902 (and agent access plans 3902A, 3902B, and 3902C) may include information coordinating when data 39D is accessed and/or pushed by various agents 39A. In some embodiments, the timing information may include an indicator of an initiation time to initiate retrieval of the at least a portion of the data from the at least one memory. For example, agent access plan 3902A may include an indication of when agent module 39A0A should retrieve data 39D02, when agent module 39A0B should retrieve data 39D04, and so on. Accordingly, agent module 39A0A may be triggered to retrieve data 39D02 from storage module 39S0 based on the timing information.

In some embodiments, the timing information may include an indicator of an arrival time at which data is to arrive at the destination. For example, this may include a timing at which data 39D04 is to arrive at processing module 39P2B. Accordingly, agent module 39A0B may account for a transmission time between when data 39D04 is transmitted by agent module 39A0B and when the data is received at processing module 39P2B when determining when to retrieve and/or transmit data 39D04.

Alternatively or additionally, the timing information may include an indicator of a transmission time to cause transmission of the at least a portion of the data to a destination. For example, agent access plan 3902A may include an indication of when agent module 39A0A should push data 39D02 to processing module 39P0A. Similarly, agent access plan 3902A may include an indication of when agent module 39A0B should push data 39D04 to processing module 39P0B. As indicated above, data access plan 3902 may further include instructions for agent module 39A0B to push data 39D04 to processing module 39P2C. In some embodiments, this transfer may occur at a different time. For example, processing module 39P0B may require data 39D04 at a different time than processing module 39P2C. Accordingly, agent access plan 3902A may include separate timing information for pushing data 39D04 to processing module 39P0B and for pushing data 39D04 to processing module 39P2C.

The various timings described above may be represented in an agent access plan (and/or data access plan) in various ways. In some embodiments, indications of timing may be absolute times. For example, this may include times relative to a common reference clock. Alternatively or additionally, the times may be relative to a reference time. For example, the various timings described above may be expressed as an elapsed time prior to or after a particular reference time. In some embodiments, the reference time may be an absolute time, such as AM Coordinated Universal Time (UTC). Alternatively or additionally, a reference time may include a time at which a particular event occurs. For example, agent access plan 3902A may indicate that data 39D04 should arrive at processing module 39P0B a specified time after data 39D12 arrives at processing module 39P0B. For example, processing module 39P0B may perform operations sequentially using data 39D12 and data 39D04, and the timing information may account for a speed at which processing module 39P0B is able to (or expected to) process data 39D12. As another example, agent access plan 3902C may indicate that data 39D22 should be retrieved at a certain time before data 39D12 arrives at processing module 39P0B. For example, this may allow a certain time for processing module 39P0B to process data 39D22 prior to receiving data 39D12.

In some embodiments, one or more timings may be determined by agents 39A. For example, data access plan 3902 may indicate a sequence of processing to be performed by processing modules 39C. Agents 39A may analyze data access plan 3902 and determine timings for when data should be retrieved, transmitted, and/or received in order for data access plan 3902 to be implemented. Accordingly, generating an agent access plan may include determining one or more of the timings described above based on data access plan 3902, While various example timings are provided herein, one skilled in the art would recognize a wide range of possible timings that may be defined, even in the various flows shown in FIG. 39. Accordingly, data access plan 3902 (and/or agent access plans 3902A, 3902B, and 3902C) may include information orchestrating complex timings of when data is retrieved, transmitted, and/or received within system 3900. This may allow data to be processed in a highly efficient manner as processing modules 39C may receive data on an as-needed basis, which may reduce delays in processing times as compared to traditional systems. For example, agent modules 39A may anticipate when individual portions of data 39D are needed by which processing modules 39P throughout a complex series of processing events, and may retrieve and transmit the data accordingly. Further, the agent modules 39A may push the data to various processing modules without waiting for a request for the data from the processing modules.

Based on the data access plan (and/or agent access plan), the agent modules may be configured for initiating transfer of the data from the storage modules to the one or more compute nodes. The transfer of data may include streaming the data to the one or more compute nodes. The transfer of data may be in an order determined by the data access plan. Alternatively, the transfer of data may be in in an order other than an order in the data access plan. Similarly, the streaming of data from the storage modules by the agent modules may be in an order determined by the data access plan. Alternatively, the streaming of data may be in in an order other than an order in the data access plan.

Consistent with the disclosed embodiments, either or both of agent modules 39A and compute nodes 39C may be configured with flow control of the transfer of data. In some embodiments, the transfer of data 39C from storage modules 39S to compute nodes 39C may be flow-controlled by the compute nodes. For example, the agent modules may include location information (for example, location(s) to push the data) but may lack timing information. The agent modules may start pushing data as soon as and as fast as possible to the designated location (processing modules 39P) and each data transfer connection (for example, stream) is flow-controlled by the respective compute modules to avoid overflow of the compute modules.

Alternatively or additionally, the transfer of data 39D from storage modules 39S to compute nodes 39C may be flow-controlled by agent modules 39A. For example, the agent modules may push data to the compute notes (the processing modules), and when finished pushing, may send a flow-control/synchronization/end of data signal to the compute node. The compute node may therefore determine all necessary data has been received. The pushing of the data may be in an order determined by the data access plan or the agent data plan.

Each data stream may be flow-controlled so that the consumer (processing module) avoids getting overflowed with too much data. For example, as described above, agent 39A1C may be configured with an agent access plan to stream multiple data locations, data 39D12 and data 39D14. Agent 39A1C thus may read directly from the attached storage 39S1 and stream the data (data 39D12 and data 39D14) to the appropriate modules (in the current example, processing module 39P2C. However, because agent module 39A1C has access to and thus "knows" the plan ahead of time, the agent can implement optimized access to the storage (in this case storage module 39S1) to more efficiently read the required data (in this case data 39D12 and data 39D14), as compared to, e.g., the default access. For example, agent access plan 3902B may have a default order of data 39D12 followed by data 39D14. Instead of reading data 39D12 and 39D14 in this default order, agent module 39A1C may read data 39D14 first, followed by data 39D12, if this alternative order of reading is more efficient. For example, reading data 39D14 first may be faster, may require lower power, may be associated with lower latency, or various other improvements in efficiency relative to the default order. Accordingly, the agent (agent module 39A1C) may read the data to a memory dedicated to the agent in one order (data 39D14 followed by data 39D12) for increased efficiency and may then push the data in another order (data 39D12 followed by data 39D14).

In some embodiments, one or more of the agent modules 39A may be instantiated by the controller 3904, as described above. In some embodiments, controller 3904 may further transfer the instantiated agent modules 39A from controller 3904 to one or more of compute nodes 39C. The compute nodes 39C may thus receive one or more of the agent modules 39A from controller 3904. In some embodiments, compute nodes 39C may receive and install one or more of agent modules 39A. Alternatively or additionally, one or more of the agent modules 39A may be instantiated by the compute nodes. In some embodiments, an instantiating module (not shown in the figures) may be configured for instantiating one or more of the agent modules based on the data access plan. Accordingly, agent modules 39A may be instantiated by a component separate form compute nodes 39C or controller 3904.

In some embodiments, at least a portion of the storage modules 39S may be connected locally to the compute nodes 39C and at least a portion of the storage modules 39S may be disaggregated from the compute nodes 39C. The number of storage modules may be a plurality of storage modules or a multitude of storage modules. Similarly, the number of compute nodes may be a plurality of compute nodes or a multitude of compute nodes.

Figure 30:
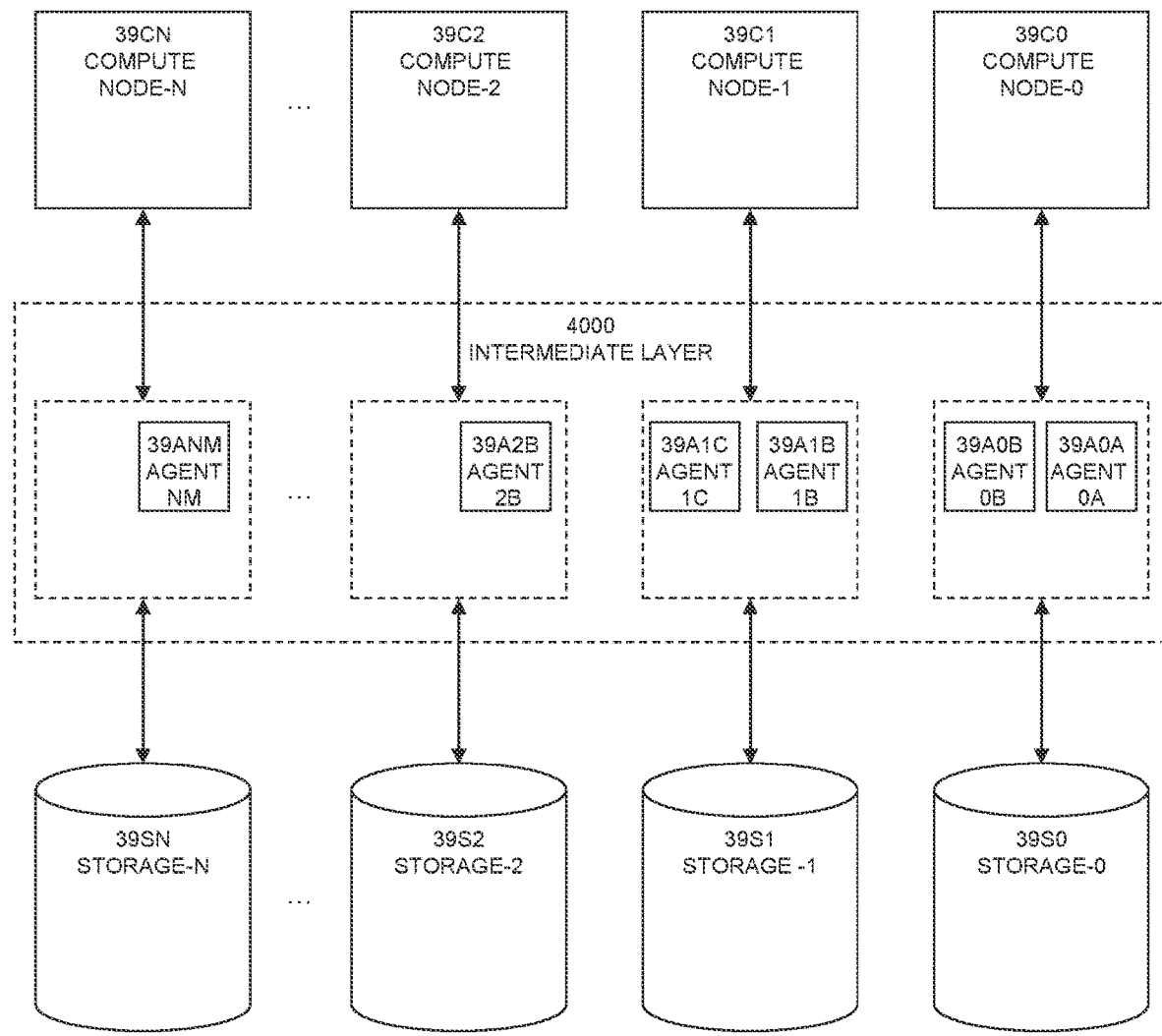
FIG. 30 is an example of an alternative agent location configuration, consistent with the disclosed embodiments.

FIG. 30 is an example of an alternative agent location configuration, consistent with the disclosed embodiments. While agent modules 39A are shown in FIG. 29 as being located in compute nodes 39C, agent modules 39A may be located in various other portions of system 3900, such that they have access to data 39D and may transmit data 39D to one or more processing modules 39P, as described above. For example, in some embodiments, agent modules 39A may be located in storage modules 39S. Alternatively or additionally, one or more of agent modules 39A may be located in a separate layer from compute nodes 39C or storage modules 39S.

As shown in FIG. 30, agent modules 39A may be located on a separate intermediate layer 4000. The intermediate layer 4000 may be a layer of nodes between the compute nodes 39C and storage modules 39S. Accordingly, each of agent modules 39A may be configured at a location selected from, for example, on the compute nodes 39C, on the storage nodes 39S, and on a node of intermediate layer 4000 other than the compute nodes and the storage nodes.

Figure 31:
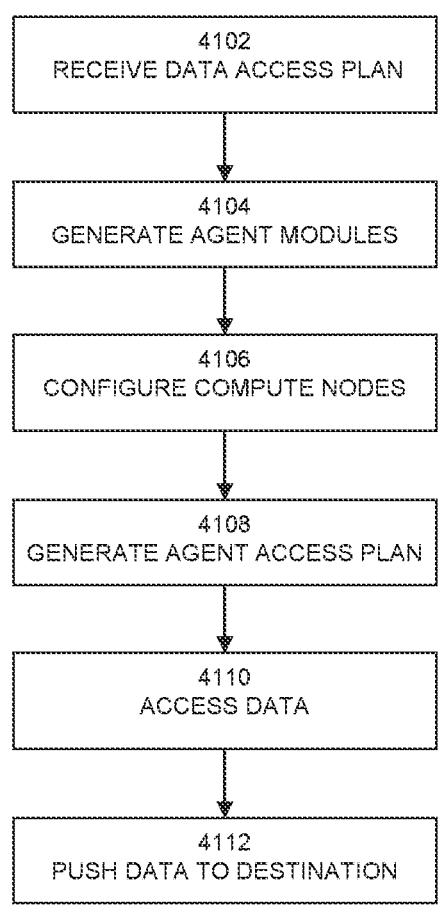
FIG. 31 is a flowchart showing an example process for data retrieval, consistent with the disclosed embodiments.

FIG. 31 is a flowchart showing an example process 4100 for data retrieval, consistent with the disclosed embodiments. Process 4100 may be used to push data to various processing modules 39P, as described above. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause a processor to perform process 4100. Further, process 4100 is not necessarily limited to the steps shown in FIG. 31, and any steps or processes of the various embodiments described throughout the present disclosure may also be included in process 4100, including those described above with respect to FIGS. 27, 28A, 28B, 29, and 30.

In step 4102, method 4100 includes receiving one or more data access plans. For example, this may include receiving data access plan 3902. As described above, the data access plan may include one or more instructions for agents to access data from one or more storage locations and transmit the data to one or more destinations. In some embodiments, the data access plan may include information for generating a plurality of additional agent access plans for a plurality of agent modules.

In step 4104, method 4100 includes generating one or more agent modules. For example, one or more agent modules 39A may be generated in step 4104, as described above. In some embodiments the agent modules may be generated based on the data access plan. For example, data access plan 3902 may include information for generating agent modules 39A, as described above.

In step 4106, method 4100 includes configuring one or more compute nodes. In some embodiments, this may include configuring the compute nodes with the one or more agent modules. For example, agent modules 39A may be configured 410 on one or more compute nodes 39C, as described above. Alternatively or additionally, the agent modules may be configured on one or more storage modules (e.g., storage module 39S), on a node layer (e.g., intermediate layer 4000), or the like. In some embodiments, the one or more compute nodes may include at least one processor.

In step 4108, method 4100 includes generating one or more agent access plans. For example, step 4108 may include generating agent access plans 3902A, 3902B, and 3902C, as described above. For example, one or more agent access plans may be generated and one or more agent modules 39A may be configured with one or more of the agent access plans. In some embodiments, the agent access plan may be based on at least a portion of a data access plan. For example, as described above, agent access plans 3902A, 3902B, and 3902C may be generated based on data access plan 3902. Accordingly, the data access plan may include information for generating a plurality of agent access plans for a plurality of agent modules. As described above, the agent modules and agent access plans may be generated in various ways. In some embodiments, the at least one agent module may be configured to generate the agent access plan based on at least a portion of the data access plan. In some embodiments, a controller (e.g., controller 3904) may be configured to initiate instantiation of the at least one agent module based on at least a portion of the data access plan.

In step 4110, method 4100 includes accessing data, which may be accessed according to the one or more agent access plans (or data access plan). For example, agent modules 39A may access data 39D from storage module 39S based on agent access plans 3902A, 3902B, and 3902C (or at least a portion of the data access plan 3902). Accordingly, the at least one agent module may be configured to retrieve the at least a portion of the data, which may be stored in at least one memory.

In step 4112, method 4100 includes causing at least a portion of data to be pushed to a destination. For example, this may include transmitting the data accessed in step 4110 according to the agent access plan. Accordingly, the at least one agent module may be configured to transmit the at least a portion of the data stored in the at least one memory to the destination. In some embodiments, the at least a portion of the data is streamed to the destination.

Note that the order of the steps of the method 4100 is not limiting. For example, in step 4104 one or more agent modules may be generated including agent access plans. In another example, in parallel with existing agent modules accessing data (step 4110), new agent modules may be generated (step 4104) and configured on one or more existing or new compute nodes. In some embodiments, the destination may include at least one processing module.

For example, the accessed data may be pushed to one or more processing modules 39P, as described above. Alternatively or additionally, the destination may include a compute node. For example, the destination may be the at least one compute node comprising the at least one agent module. For example, as indicated in FIG. 29, agent module 39A0A may be configured to push data 39D02 to processing module 39P0A, which may be associated with the same compute node 39C0 as agent module 39A0A. Alternatively or additionally, data may be pushed to a different compute node, as described above. Accordingly, the at least one compute node includes may include a first compute node and a second compute node, wherein the first compute node comprises the at least one agent module. The destination may include the second compute node. In some embodiments, the second compute node may include at least one processor, which may be configured to input the at least a portion of the data pushed by the at least one agent module. For example, compute node 39C2 may input data 39D04 pushed by agent module 29A0B, as described above.

The various compute nodes and associated memories may be configured in various ways. In some embodiments, the first compute node may be associated with the at least one memory. For example, compute node 39C0 may be associated with storage module 39S0, as described above. In some embodiments, the first compute node may be locally connected to the at least one memory. Alternatively or additionally, the first compute node may be communicatively connected to the at least one memory over one or more networks. In some embodiments, the first compute node may be locally connected to the second compute node. Alternatively or additionally, the first compute node may be communicatively connected to the second compute node over one or more networks. In some embodiments, the first compute node may be included in a first server, and the second compute node may be included in a second server. In some embodiments, the at least one memory may be included in the first compute node.

As described above, the agent access plan may include a plurality of instructions. For example, the plurality of instructions may be configured to cause the at least a portion of data stored in the at least one memory to be pushed to the destination. In some embodiments, the access plan may be included in the at least one agent module. Accordingly, the at least one agent module may include a plurality of instructions.

As described in further detail above, the agent access plan may include information indicating how data should be transferred by the at least one agent module. For example, the agent access plan includes an identifier of the at least one memory. In some embodiments, the agent access plan may include an identifier of a storage location included in the at least one memory. For example, the identifier of the storage location included in the least one memory may include at least a start address. The identifier of the storage location in the least one memory may further include one or both of an end address and a data size. In some embodiments, the agent access plan may include an identifier of the destination.

In some embodiments, the agent access plan may include a sequence for transferring the at least a portion of the data stored in the at least one memory to the destination. For example, the agent module may be configured to transfer multiple data portions of data to the destination and the agent access plan may define a sequence in which to transfer the data portions.

According to some embodiments, the agent access plan may include timing information, as described above. For example, the agent access plan includes an indicator of a time for transferring the at least a portion of the data stored in the at least one memory to the destination. Accordingly, the timing information may include an indicator of a transmission time to cause transmission of the at least a portion of the data to the destination. As another example, the timing information may include an indicator of an initiation time to initiate retrieval of the at least a portion of the data from the at least one memory. As a further example, the timing information may include an indicator of an arrival time at which the at least a portion of the data is to arrive at the destination. In some embodiments, the timing information may be relative to a reference time, as described above. Accordingly, one or more of the initiation time, the transmission time, and the arrival time described above may be relative to a reference time. Additional details regarding the agent access plan and the information that may be included therein are provided above with respect to FIG. 29.

Figure 32:
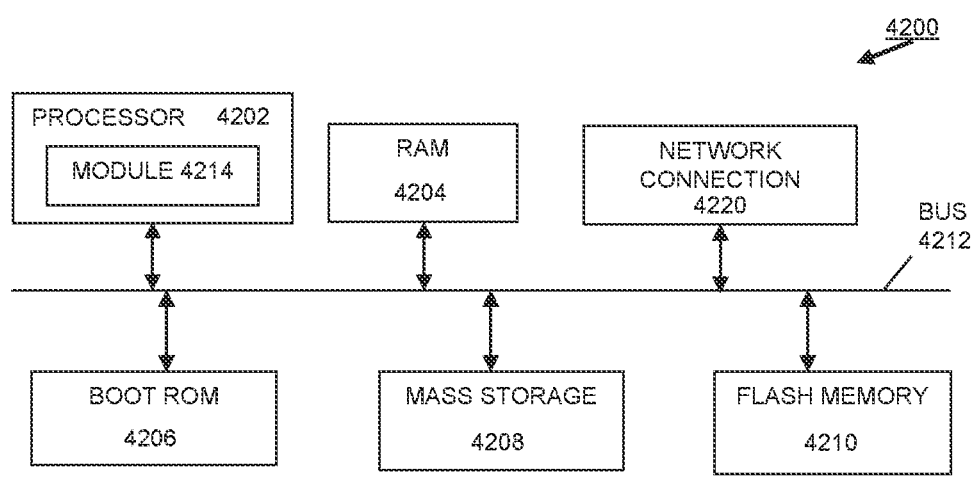
FIG. 32 is a high-level partial block diagram of an exemplary system configured to implement the data retrieval process of the disclosed embodiments.

FIG. 32 is a high-level partial block diagram of an exemplary system 4200 configured to implement the data retrieval process of the disclosed embodiments. For example, the various components of system 3900 may be included in system 4200. System (processing system) 4200 may include a processor 4202 (one or more) and various exemplary memory devices. In this example, system 4200 includes a random access memory (RAM) 4204, a boot read only memory (ROM) 4206, a mass storage device (hard disk) 4208, and a flash memory 4210, all communicating via a common bus 4212. Processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). The processor 4202 may be formed of one or more processors, for example, hardware processors, including microprocessors, for performing functions and operations detailed herein. The processors may correspond to processors used in servers, computers, and other computerized devices. For example, the processors may include x86 Processors from AMD and Intel, Xenon® and Pentium® processors from Intel, as well as any combinations thereof. Any instruction set architecture may be used in processor 4202 including but not limited to reduced instruction set computer (RISC) architecture and/or complex instruction set computer (CISC) architecture. Processor 4204 may include one or more modules, such as module (processing module) 4214, as shown.

Mass storage device 4208 is a non-limiting example of a non-transitory computer-readable storage medium bearing computer-readable code for implementing the data retrieval methodology described herein. Other examples of such non-transitory computer-readable storage media include read-only memories such as discs (e.g., CDs) bearing such code.

System 4200 may have an operating system stored on the memory devices, the ROM may include boot code for the system, and the processor may be configured for executing the boot code to load the operating system to RAM 4204, executing the operating system to copy computer-readable code to RAM 4204 and execute the code.

Network connection 4220 may provide communications to and from system 4200. For example, a single network connection may provide one or more links, including virtual connections, to other devices on local and/or remote networks. Alternatively, system 4200 can include more than one network connection (not shown), each network connection providing one or more links to other devices and/or networks.

System 4200 can be implemented as a server or client respectively connected through a network to a client or server.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the disclosed embodiments.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the disclosed embodiments, which are, for clarity, described in the context of separate embodiments, can also be provided in combination in a single embodiment. Conversely, various features of the disclosed embodiments, which are, for brevity, described in the context of a single embodiment, can also be provided separately or in any suitable sub-combination or as suitable in any other described embodiment of the disclosed embodiments. Certain features described in the context of various embodiments are not to be considered essential features of those embodiments, unless the embodiment is inoperative without those elements.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4 K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system, comprising:
    at least one memory; and
    at least one compute node comprising at least one agent module, wherein the at least one agent module is configured to cause at least a portion of data stored in the at least one memory to be pushed to a destination in accordance with an agent access plan,
    wherein the agent access plan includes an indicator of a time for transferring the at least a portion of the data stored in the at least one memory to the destination.

2. The system of claim 1, wherein the at least one compute node includes at least one processor.

3. The system of claim 1, wherein the at least one agent module is further configured to retrieve the at least a portion of the data stored in the at least one memory.

4. The system of claim 1, wherein the at least one agent module is further configured to transmit the at least a portion of the data stored in the at least one memory to the destination.

5. The system of claim 1, wherein the destination includes the at least one compute node.

6. The system of claim 1, wherein the destination includes at least one processing module.

7. The system of claim 1, wherein the at least one compute node includes a first compute node and a second compute node, wherein the first compute node comprises the at least one agent module, and wherein the destination includes the second compute node.

8. The system of claim 7, wherein the first compute node is locally connected to the at least one memory.

9. The system of claim 1, wherein the at least one agent module includes a plurality of instructions.

10. The system of claim 1, wherein the at least a portion of the data is streamed to the destination.

11. The system of claim 1, wherein the agent access plan is included in the at least one agent module.

12. The system of claim 1, wherein the agent access plan includes a plurality of instructions.

13. The system of claim 12, wherein the plurality of instructions are configured to cause the at least a portion of data stored in the at least one memory to be pushed to the destination.

14. The system of claim 1, wherein the agent access plan includes a sequence for transferring the at least a portion of the data stored in the at least one memory to the destination.

15. The system of claim 1, wherein the agent access plan is based on at least a portion of a data access plan, and wherein the data access plan includes information for generating a plurality of additional agent access plans for a plurality of additional agent modules.

16. The system of claim 15, wherein the at least one agent module is configured to generate the agent access plan based on at least a portion of the data access plan.

17. The system of claim 15, further comprising a controller configured to initiate instantiation of the at least one agent module based on at least a portion of the data access plan.

18. The system of claim 1, wherein the agent access plan includes an identifier of the at least one memory.

19. The system of claim 1, wherein the agent access plan includes an identifier of the destination.

20. The system of claim 1, wherein the agent access plan includes timing information that includes an indicator of an arrival time at which the at least a portion of the data is to arrive at the destination.

21. The system of claim 10, wherein the at least a portion of the data is stored at the destination.

* * * * *